US012489499B2

(12) United States Patent
Seok

(10) Patent No.: US 12,489,499 B2
(45) Date of Patent: *Dec. 2, 2025

(54) RECEIVER ADDRESS FIELD FOR MULTI-USER TRANSMISSIONS IN WLAN SYSTEMS

(71) Applicant: Atlas Global Technologies LLC, Austin, TX (US)

(72) Inventor: Yongho Seok, Irvine, CA (US)

(73) Assignee: Atlas Global Technologies LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,703

(22) Filed: Jun. 7, 2024

(65) Prior Publication Data

US 2024/0356602 A1 Oct. 24, 2024

Related U.S. Application Data

(63) Continuation of application No. 18/154,234, filed on Jan. 13, 2023, now Pat. No. 12,021,587, which is a (Continued)

(51) Int. Cl.
*H04B 7/06* (2006.01)
*H04B 7/0452* (2017.01)

(Continued)

(52) U.S. Cl.
CPC ......... *H04B 7/0617* (2013.01); *H04B 7/0452* (2013.01); *H04W 74/04* (2013.01); *H04W 72/21* (2023.01); *H04W 84/12* (2013.01)

(58) Field of Classification Search
None
See application file for complete search history.

(56) References Cited

U.S. PATENT DOCUMENTS 8,923,172 B2 12/2014 Wentink et al.
9,154,404 B2 10/2015 Lu et al.

(Continued)

OTHER PUBLICATIONS

Non-Final Office Action from U.S. Appl. No. 15/360,887 dated Mar. 20, 2018, 15 pages.

(Continued)

*Primary Examiner* — Phirin Sam
(74) *Attorney, Agent, or Firm* — Nutter McClennen & Fish LLP

(57) ABSTRACT

A method may include transmitting a downlink frame that is eliciting a response from a plurality of stations, the downlink frame including a first address field, receiving an uplink frame in response to the downlink frame, the uplink frame including a second address field, and receiving the uplink frame on a resource allocated by resource allocation information included in the downlink frame for an uplink multi-user transmission. The second address field is set to a value of the first address field when the downlink frame is of a first type or a value of an address associated with a station (STA) when the downlink frame is of a second type. The AP simultaneously receives uplink frames in response to the first type of downlink frame, where the AP simultaneously receives uplink data frames.

11 Claims, 50 Drawing Sheets

Related U.S. Application Data continuation of application No. 17/108,930, filed on Dec. 1, 2020, now Pat. No. 11,581,927, which is a continuation of application No. 16/201,980, filed on Nov. 27, 2018, now Pat. No. 10,879,977, which is a continuation of application No. 15/360,887, filed on Nov. 23, 2016, now Pat. No. 10,153,820.

(60) Provisional application No. 62/271,157, filed on Dec. 22, 2015, provisional application No. 62/260,218, filed on Nov. 25, 2015.

(51) Int. Cl.

| | |
|---|---|
| ***H04W 72/21*** | (2023.01) |
| ***H04W 74/04*** | (2009.01) |
| ***H04W 84/12*** | (2009.01) |

(56) References Cited

U.S. PATENT DOCUMENTS

| | | | | |
|---|---|---|---|---|
| 9,635,647 | B2 | 4/2017 | Amini et al. | |
| 9,942,920 | B2 | 4/2018 | Huang et al. | |
| 10,014,917 | B2 | 7/2018 | Chu et al. | |
| 10,080,222 | B1 * | 9/2018 | Chu | H04L 5/0053 |
| 10,085,168 | B2 | 9/2018 | Grandhi | |
| 10,128,925 | B2 | 11/2018 | Chun et al. | |
| 10,129,930 | B2 | 11/2018 | Patil et al. | |
| 10,153,820 | B2 | 12/2018 | Seok | |
| 10,154,482 | B2 | 12/2018 | Kim et al. | |
| 10,194,468 | B2 | 1/2019 | Kneckt et al. | |
| 10,250,304 | B2 | 4/2019 | Choi et al. | |
| 10,285,202 | B2 | 5/2019 | Chu et al. | |
| 10,299,295 | B2 | 5/2019 | Ghosh et al. | |
| 10,314,066 | B2 | 6/2019 | Cherian et al. | |
| 10,321,358 | B2 | 6/2019 | Kim et al. | |
| 10,334,571 | B2 | 6/2019 | Chu et al. | |
| 10,440,751 | B2 | 10/2019 | Kim et al. | |
| 10,499,333 | B2 | 12/2019 | Asterjadhi et al. | |
| 10,499,418 | B2 | 12/2019 | Merlin et al. | |
| 10,536,948 | B2 | 1/2020 | Asterjadhi et al. | |
| 10,879,977 | B2 | 12/2020 | Seok | |
| 11,165,542 | B2 | 11/2021 | Pereira et al. | |
| 11,581,927 | B2 | 2/2023 | Seok | |
| 12,021,587 | B2 * | 6/2024 | Seok | H04B 7/0452 |
| 2007/0127375 | A1 | 6/2007 | Bae et al. | |
| 2010/0046471 | A1 | 2/2010 | Hattori et al. | |
| 2011/0044298 | A1 | 2/2011 | Wentink et al. | |
| 2012/0087300 | A1 * | 4/2012 | Seok | H04W 76/10 370/315 |
| 2014/0064246 | A1 | 3/2014 | Baillargeon | |
| 2014/0348148 | A1 | 11/2014 | You et al. | |
| 2014/0365682 | A1 * | 12/2014 | Morris | H04L 45/745 709/238 |
| 2015/0139159 | A1 | 5/2015 | Amini et al. | |
| 2015/0341966 | A1 * | 11/2015 | Seok | H04W 76/10 370/315 |
| 2016/0014804 | A1 | 1/2016 | Merlin et al. | |
| 2016/0037553 | A1 | 2/2016 | Attar et al. | |
| 2016/0100408 | A1 | 4/2016 | Hedayat | |
| 2016/0105838 | A1 | 4/2016 | Wang et al. | |
| 2016/0205588 | A1 * | 7/2016 | Liu | H04L 69/22 370/392 |
| 2016/0242177 | A1 | 8/2016 | Seok | |
| 2016/0330757 | A1 | 11/2016 | Cherian et al. | |
| 2016/0366701 | A1 | 12/2016 | Chu et al. | |
| 2016/0374081 | A1 | 12/2016 | Asterjadhi et al. | |
| 2016/0374093 | A1 | 12/2016 | Asterjadhi et al. | |
| 2017/0006635 | A1 | 1/2017 | Huang et al. | |
| 2017/0079011 | A1 | 3/2017 | Kenney et al. | |
| 2017/0118113 | A1 * | 4/2017 | Vemulapalli | G06F 13/102 |
| 2017/0127310 | A1 | 5/2017 | Grandhi | |
| 2017/0127404 | A1 | 5/2017 | Merlin et al. | |
| 2017/0150492 | A1 | 5/2017 | Ozaki | |
| 2017/0170932 | A1 | 6/2017 | Chu et al. | |
| 2017/0245306 | A1 * | 8/2017 | Kim | H04W 92/10 |
| 2017/0257888 | A1 | 9/2017 | Kneckt et al. | |
| 2017/0272138 | A1 | 9/2017 | Chun et al. | |
| 2017/0311258 | A1 | 10/2017 | Asterjadhi et al. | |
| 2017/0317728 | A1 | 11/2017 | Choi et al. | |
| 2017/0338910 | A1 | 11/2017 | Chun et al. | |
| 2018/0063824 | A1 | 3/2018 | Kim et al. | |
| 2018/0098378 | A1 | 4/2018 | Patil et al. | |
| 2018/0167929 | A9 | 6/2018 | Chu et al. | |
| 2018/0167978 | A1 | 6/2018 | Ghosh et al. | |
| 2018/0206206 | A1 | 7/2018 | Tie et al. | |
| 2018/0263047 | A1 | 9/2018 | Kim et al. | |
| 2018/0310336 | A1 | 10/2018 | Su et al. | |
| 2018/0359802 | A1 | 12/2018 | Cho et al. | |
| 2019/0386794 | A1 | 12/2019 | Pereira et al. | |
| 2021/0083739 | A1 * | 3/2021 | Seok | H04B 7/0452 |

OTHER PUBLICATIONS

Notice of Allowance from U.S. Appl. No. 15/360,887, dated Jul. 27, 2018, 8 pages.

East Search History for U.S. Appl. No. 16/201,980, dated Sep. 27, 2019, 1 page.

Non-Final Office Action from U.S. Appl. No. 16/201,980 dated Oct. 3, 2019, 7 pages.

East Search History for U.S. Appl. No. 16/201,980, dated Feb. 12, 2020, 5 pages.

Non-Final Office Action from U.S. Appl. No. 16/201,980 dated Feb. 18, 2020, 15 pages.

Notice of Allowance from U.S. Appl. No. 16/201,980, dated Aug. 17, 2020, 8 pages.

PALM Search Result from U.S. Appl. No. 17/108,930, downloaded Mar. 23, 2022, 3 pages.

InnovationQ Plus Search Result from U.S. Appl. No. 17/108,930, downloaded Mar. 24, 2022, 3 pages.

PE2E Search Result from U.S. Appl. No. 17/108,930, downloaded Mar. 24, 2022, 1 page.

Non-Final Office Action from U.S. Appl. No. 17/108,930 dated Mar. 29, 2022, 7 pages.

PE2E Search Result from U.S. Appl. No. 17/108,930, downloaded Sep. 29, 2022, 2 pages.

Notice of Allowance from U.S. Appl. No. 17/108,930, dated Oct. 13, 2022, 8 pages.

LAN/MAN Standards Committee of the IEEE Computer Society, "IEEE P802.11 ah?/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

LAN/MAN Standards Committee of the IEEE Computer Society, "IEEE Standard for information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for information technology—Telecommunications and information exchange between systems Local and metropolitan area networks—Specific requirements, Part 11: Wireless LAN Medium Access Control (MAC) and Physical Layer (PHY) Specifications," 2012.

Notice of Allowance from U.S. Appl. No. 18/154,234 mailed Feb. 12, 2024, 9 pages.

Non-Final Office Action from U.S. Appl. No. 18/154,234 mailed Jul. 20, 2023, 11 pages.

* cited by examiner

HE PPDU FORMAT

| Octets: 2 | 2 | 6 | 6 | 4 |
|---|---|---|---|---|
| Frame Control | Duration | RA | TA | FCS |

| Frame Control | Duration/ID | RA | TA | Bar Control | Per-User Block ACK Request | Per-User Sub-channel Assignment |
|---|---|---|---|---|---|---|
| 2 octets | 2 octets | 6 octets | 6 octets | 2 octets | Variable (Repeated for each users) | |

| Frame Control | Duration/ID | RA | TA | Common Sub-channel Assignment Info | Per-User Sub-channel Assignment Info 1 | Per-User Sub-channel Assignment Info n |
|---|---|---|---|---|---|---|
| 2 octets | 2 octets | 6 octets | 6 octets | 2 octets | Variable | |

FIG. 43

| Assigned RU Type | Assigned RU Position | Assigned RU Tone |
|---|---|---|
| A bits | B bits | C bits |

(NOTE - A+B+C is less than or equal to 8 bits)

FIG. 45

| | Common Sub-channel Assignment Info | | | | |
|---|---|---|---|---|---|
| | UL MU Duration | Total LTFs | LTF Duration | Guard Interval | STBC |
| Bits: | 9 | 3 | 1 | 2 | 1 |

FIG. 46A

| Per-User Sub-channel Assignment Info | | | | | | | | | |
|---|---|---|---|---|---|---|---|---|---|
| Assigned RU Type (=0) | Assigned RU Position | Assigned RU Tone | AID | ••• | RU Coding | Assigned RU Tone | AID | ••• | RU Coding |
| 1 | 3 | 3 | 12 | ••• | 1 | 3 | 12 | ••• | 1 |

FIG. 46B

| Per-User Sub-channel Assignment Info | | | | | | | | | |
|---|---|---|---|---|---|---|---|---|---|
| Assigned RU Type (=1) | Assigned RU Position | Assigned RU Tone | AID | ••• | RU Coding | Assigned RU Tone | AID | ••• | RU Coding |
| 1 | 3 | 4 | 12 | ••• | 1 | 4 | 12 | ••• | 1 |

FIG. 46C

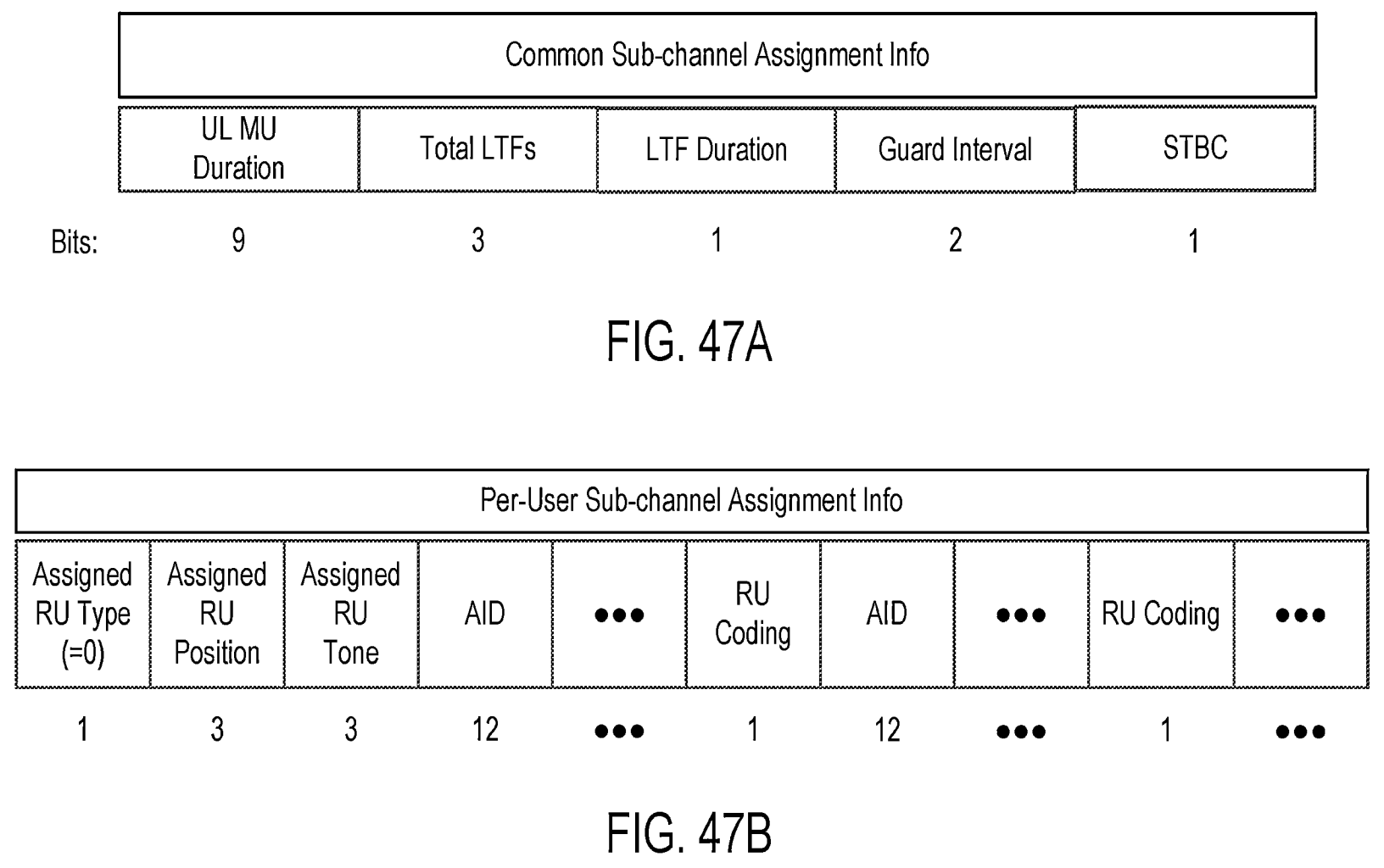

| | Common Sub-channel Assignment Info | | | | |
|---|---|---|---|---|---|
| | UL MU Duration | Total LTFs | LTF Duration | Guard Interval | STBC |
| Bits: | 9 | 3 | 1 | 2 | 1 |

FIG. 47A

| Per-User Sub-channel Assignment Info | | | | | | | | | |
|---|---|---|---|---|---|---|---|---|---|
| Assigned RU Type (=0) | Assigned RU Position | Assigned RU Tone | AID | ••• | RU Coding | AID | ••• | RU Coding | ••• |
| 1 | 3 | 3 | 12 | ••• | 1 | 12 | ••• | 1 | ••• |

FIG. 47B

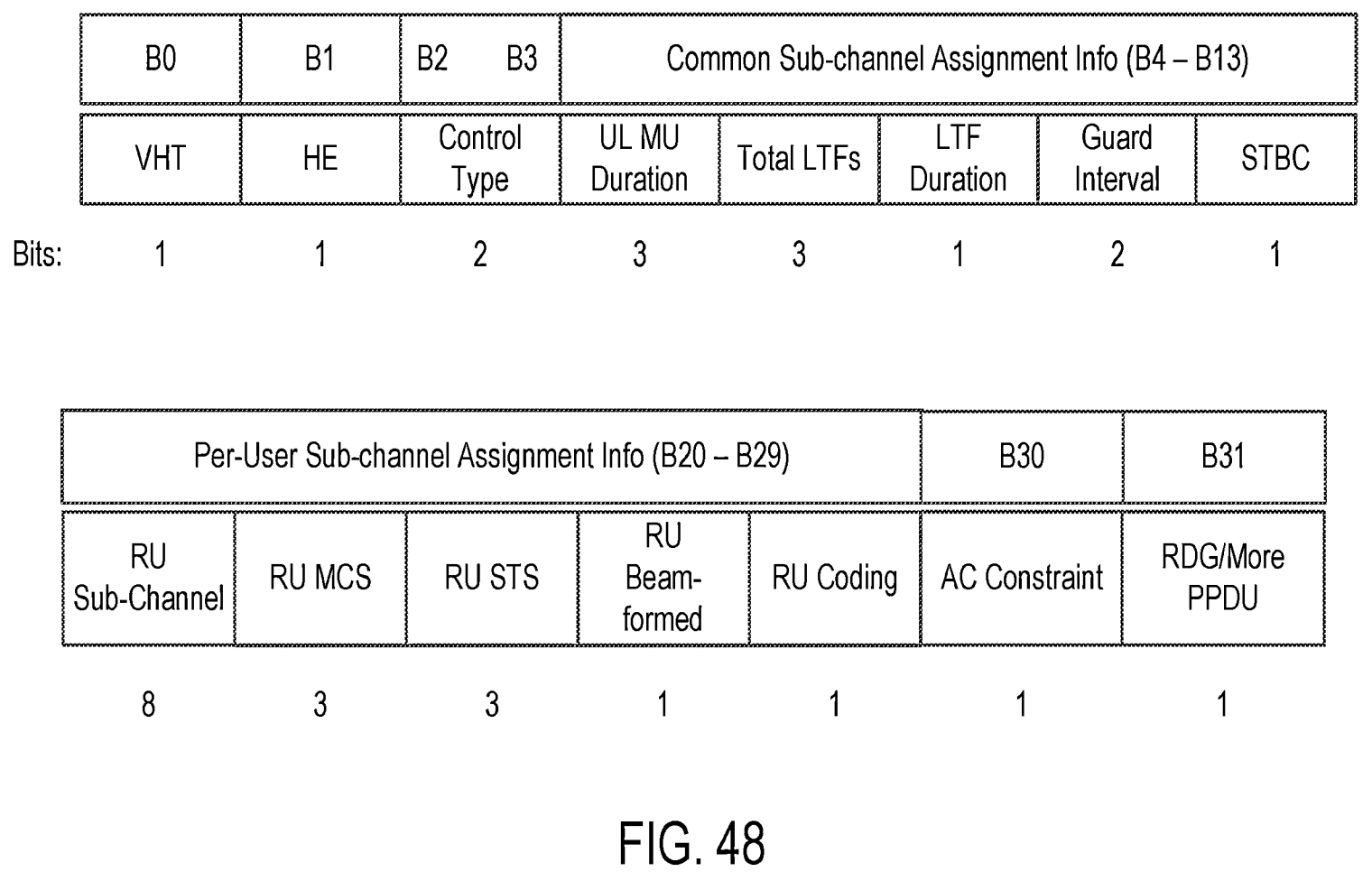

| | B0 | B1 | B2 B3 | Common Sub-channel Assignment Info (B4 – B13) | | | | |
|---|---|---|---|---|---|---|---|---|
| | VHT | HE | Control Type | UL MU Duration | Total LTFs | LTF Duration | Guard Interval | STBC |
| Bits: | 1 | 1 | 2 | 3 | 3 | 1 | 2 | 1 |

| Per-User Sub-channel Assignment Info (B20 – B29) | | | | | B30 | B31 |
|---|---|---|---|---|---|---|
| RU Sub-Channel | RU MCS | RU STS | RU Beam-formed | RU Coding | AC Constraint | RDG/More PPDU |
| 8 | 3 | 3 | 1 | 1 | 1 | 1 |

FIG. 48

RECEIVER ADDRESS FIELD FOR MULTI-USER TRANSMISSIONS IN WLAN SYSTEMS

CROSS REFERENCE TO RELATED APPLICATION(S)

This application is a continuation of application Ser. No. 18/154,234, filed on Jan. 13, 2023, which is a continuation of application Ser. No. 17/108,930, filed on Dec. 1, 2020, now U.S. Pat. No. 11,581,927, which is a continuation of application Ser. No. 16/201,980, filed on Nov. 27, 2018, now U.S. Pat. No. 10,879,977, which is a continuation of application Ser. No. 15/360,887, filed on Nov. 23, 2016, now U.S. Pat. No. 10,153,820, which claims the benefit of U.S. Provisional Application No. 62/260,218, filed on Nov. 25, 2015 and U.S. Provisional Application No. 62/271,157, filed on Dec. 22, 2015, the entirety of each of which is incorporated herein by reference for all purposes.

FIELD

The present invention is directed to wireless communication systems and methods, and more particularly to, for example, without limitation, a receiver address field for multi-user transmissions in wireless local area network (WLAN) systems.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

SUMMARY

In accordance with embodiments of the present invention, a method may include transmitting a downlink frame that is eliciting a response from a plurality of stations, the downlink frame including a first address field, receiving an uplink frame in response to the downlink frame, the uplink frame including a second address field, and receiving the uplink frame on a resource allocated by resource allocation information included in the downlink frame for an uplink multi-user transmission. The second address field is set to a value of the first address field when the downlink frame is of a first type or a value of an address associated with a station (STA) when the downlink frame is of a second type. The AP simultaneously receives uplink frames in response to the first type of downlink frame, where the AP simultaneously receives uplink data frames.

In accordance with another embodiment of the present invention, a non-transitory machine readable medium that stores instructions, which when executed by a processor of an access point (AP), cause the AP to transmit a downlink frame that is eliciting a response from a plurality of stations, the downlink frame including a first address field, receive an uplink frame in response to the downlink frame, the uplink frame including a second address field, and receive the uplink frame on a resource allocated by resource allocation information included in the downlink frame for an uplink multi-user transmission. The AP simultaneously receives uplink frames in response to the first type of downlink frame, where the AP simultaneously receives uplink data frames. The second address field is set to a value of the first address field when the downlink frame is of a first type or a value of an address associated with a station (STA) when the downlink frame is of a second type.

Additional features and advantages of embodiments of the present invention will become more readily apparent from the following description, particularly when taken together with the accompanying drawings.

BRIEF DESCRIPTION OF THE DRAWINGS

FIG. 43 illustrates an example of a frame having sub-channel assignment information in accordance with embodiments of the present invention.

FIG. 45 illustrates an example of a general framework of a nested structure of an RU Sub-Channel sub-field in accordance with embodiments of the present invention.

FIG. 46A illustrates an example of a Common Sub-Channel Assignment Info field in accordance with embodiments of the present invention.

FIGS. 46B and 46C illustrate examples of a Per-User Sub-Channel Assignment Info field in accordance with embodiments of the present invention.

FIG. 47A illustrates an example of a Common Sub-Channel Assignment Info field in accordance with embodiments of the present invention.

FIG. 47B illustrates an example of a Per-User Sub-Channel Assignment Info field in accordance with embodiments of the present invention.

FIG. 48 illustrates an example of a high throughput (HT) Control field in accordance with embodiments of the present invention.

Figure 1:
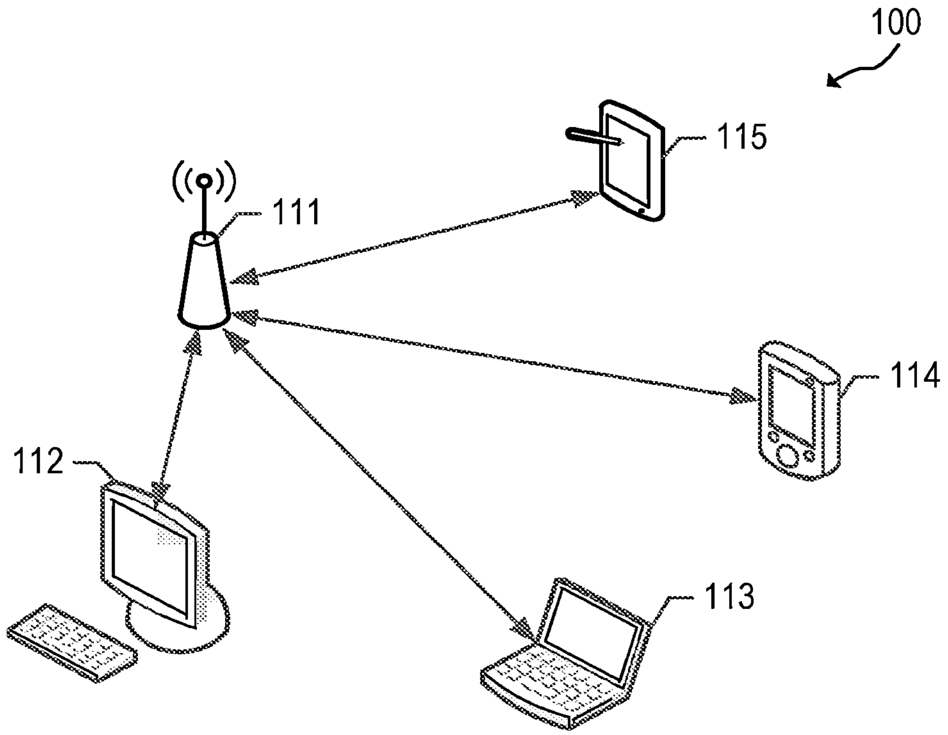
FIG. 1 illustrates a schematic diagram of an example of a wireless communication network in accordance with embodiments of the present invention.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The Institute of Electrical and Electronics Engineers (IEEE) 802.11, Task Group ax, provides a new generation of wireless local area network (WLAN). In an aspect, IEEE 802.11ax may be referred to as High Efficiency (HE) WLAN (HEW) or simply HE. IEEE 802.11ax provides a High Efficiency WLAN (HEW) PPDU format. In some aspects, the HEW PPDU formats may support Multi-User (MU) Multiple-Input and Multiple-Output (MIMO) technology and/or Orthogonal Frequency Division Multiple Access (OFDMA) technology. HEW may operate in 2.4 GHz and 5 GHz bands with a channel bandwidth of 20 MHz or higher. For instance, the channel bandwidth may be 20 MHz, 40 MHz, 80 MHz, 80+80 MHz, or 160 MHz (denoted as 20/40/80/80+80/160 MHz).

In one or more implementations, in OFDMA, an access point may allocate different portions of a channel bandwidth to different stations. In one aspect, a portion of a channel bandwidth is allocated to a station. In one aspect, a portion of a channel bandwidth may be a resource unit (RU) or a resource allocation block. In another aspect, a portion of a channel bandwidth may be one or more resource units. In yet another aspect, a portion of a channel bandwidth may be one or more blocks of a channel bandwidth. Each resource unit includes multiple tones. In an aspect, a resource unit may be referred to as a block, a sub-band, a band, a frequency sub-band, a frequency band, or variant thereof (e.g., frequency block). A tone may be referred to as subcarrier. Each tone may be associated with or otherwise identified by a tone index or a subcarrier index. A tone index may be referred to as a subcarrier index.

In one or more aspects, the resource units that may be allocated for a channel bandwidth may be provided by an OFDMA numerology. In an aspect, the OFDMA numerology may be referred to as an OFDMA structure or a numerology. The numerology provides different manners by which to allocate resources for a channel bandwidth (e.g., 20 MHz, 40 MHz, 80 MHZ, 80+80 MHz, or 160 MHz channel bandwidth) into individual resource units. In other words, the numerology provides potential resources for OFDMA for stations that support the IEEE 802.11ax specification.

In one or more aspects, a sub-channel assignment mechanism is disclosed for uplink (UL) multi-user (MU) transmission. The mechanism may provide, for example, how to signal a frequency of a resource unit assigned for a UL MU transmission. In one or more implementations, an aggregated media access control protocol data unit (A-MPDU) format may include a frame having sub-channel assignment information. In an aspect, a trigger frame may be included in an A-MPDU. For instance, an HE single MPDU may include a trigger frame for supporting a UL MU response.

In one or more implementations, when a UL MU responder has an authority to select the contents of an A-MPDU carried in the UL MU response frame, UL MU scheduling at the access point (AP) may be affected by the A-MPDU contents. For example, if a UL MU responder transmits a frame of Data Enabled Immediate Response context, the AP needs to assign one or more sub-channel(s) to the previous UL MU responder in order to reply with the immediate response. Accordingly, the UL MU scheduling algorithm utilized on the AP side may be affected by the A-MPDU contents carried in the UL MU response frame. In an aspect, A-MPDU contents may be included in a response frame to a trigger frame. In this regard, the present disclosure provides rules regarding whether a frame soliciting an immediate response can be included in the A-MPDU contents carried in the UL MU response frame.

The present disclosure also describes a multi-user (or multi-station) block acknowledgement operation. For example, a Block Acknowledgement Request (BAR) may be transmitted in a UL MU physical layer convergence procedure (PLCP) protocol data unit (PPDU) for explicitly requesting a Block Acknowledgement (Block ACK or BA) frame with an explicit parameter, such as a starting sequence number.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
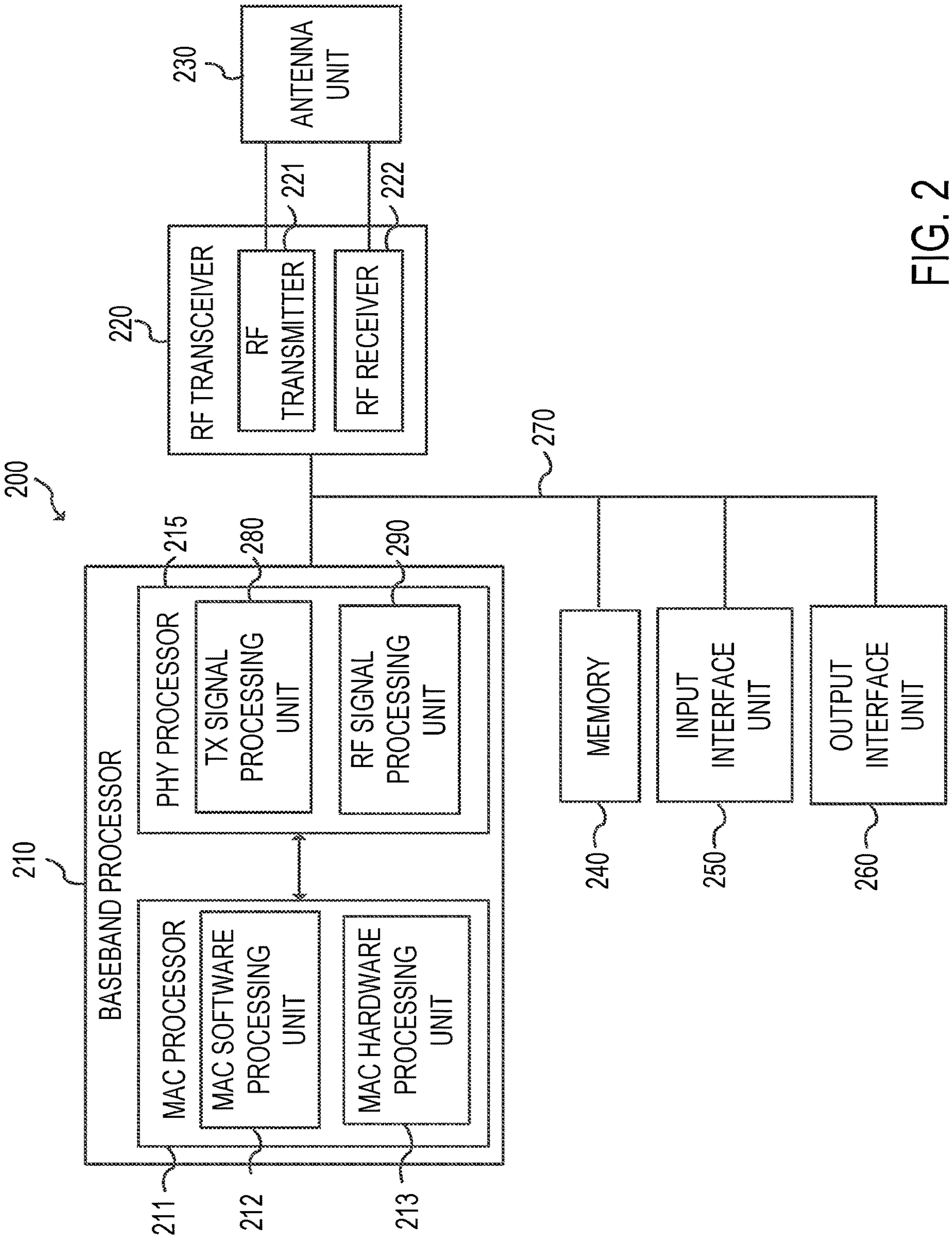
FIG. 2 illustrates a schematic diagram of an example of a wireless communication device in accordance with embodiments of the present invention.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multicore processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen. One or more implementations can be realized in part or in whole using a computer readable medium. In one aspect, a computer-readable medium includes one or more media. In one or more aspects, a computer-readable medium is a tangible computer-readable medium, a computer-readable storage medium, a non-transitory computer-readable medium, a machine readable medium, a memory, or some combination of the foregoing (e.g., a tangible computer readable storage medium, or a non-transitory machine-readable storage medium). In one aspect, a computer is a machine. In one aspect, a computer-implemented method is a machine implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
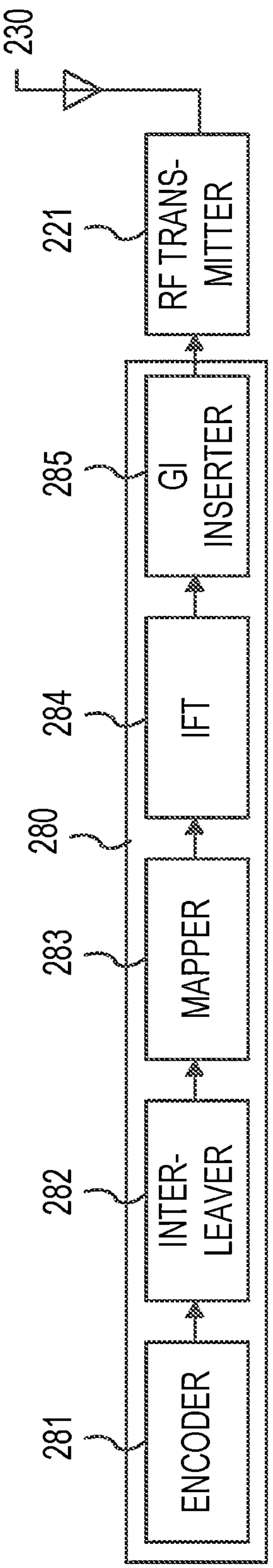
FIG. 3A illustrates a schematic block diagram of an example of a transmitting signal processor in a wireless communication device in accordance with embodiments of the present invention.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams (Nss). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams (NsTS) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
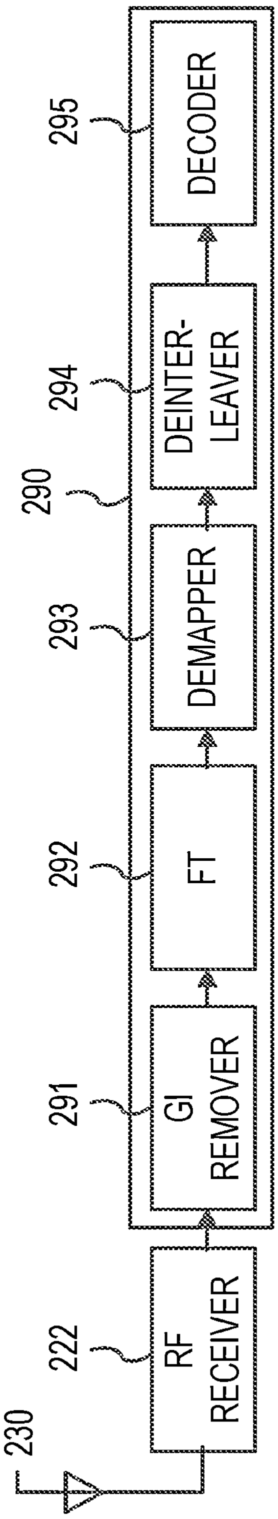
FIG. 3B illustrates a schematic block diagram of an example of a receiving signal processor in a wireless communication device in accordance with embodiments of the present invention.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
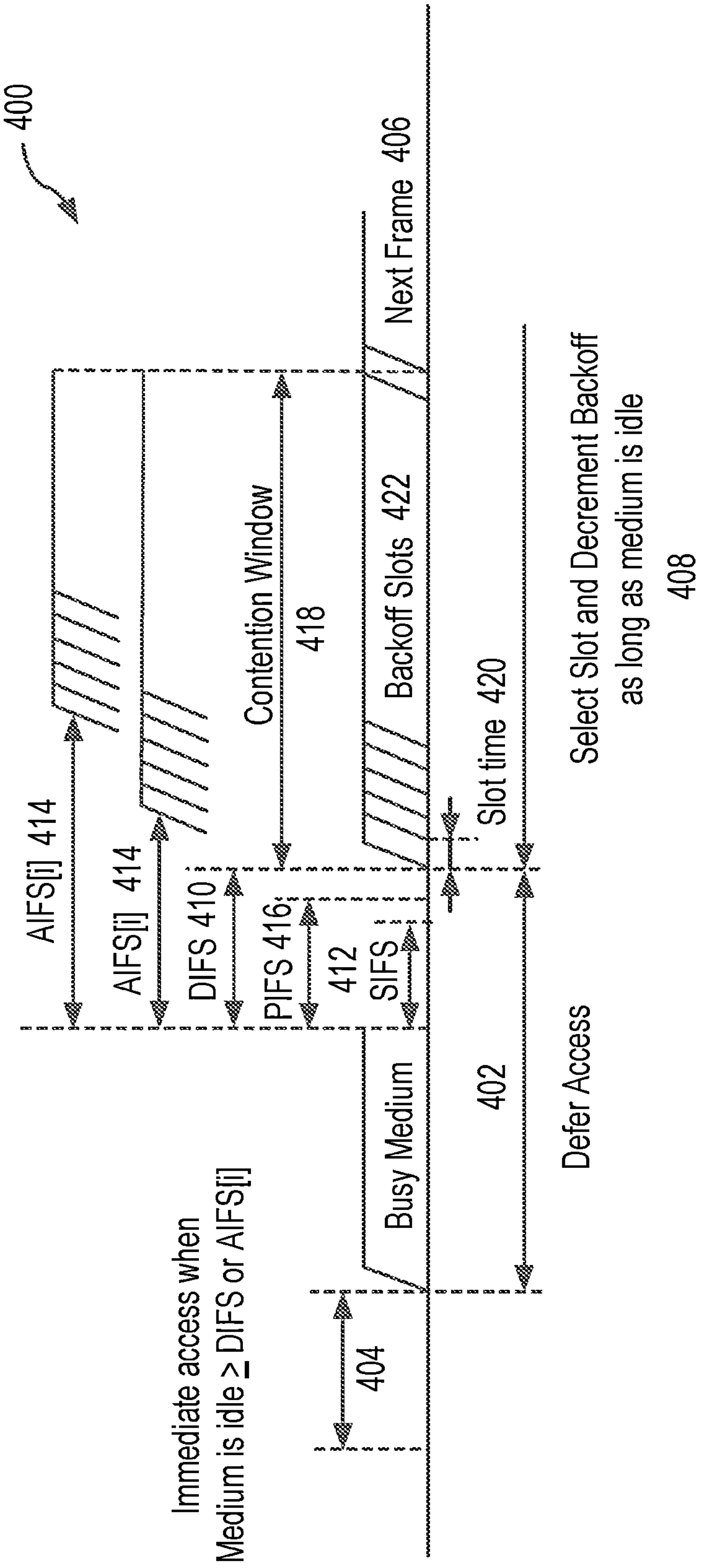
FIG. 4 illustrates an example of a timing diagram of interframe space (IFS) relationships in accordance with embodiments of the present invention.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. For example, the SIFS may be 16 microseconds. The type and subtype of frame may be identified by a type field and a subtype field in a frame control field of the frame. In an aspect, a microsecond may be denoted as μs or us.

On the other hand, a Quality of Service (QOS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
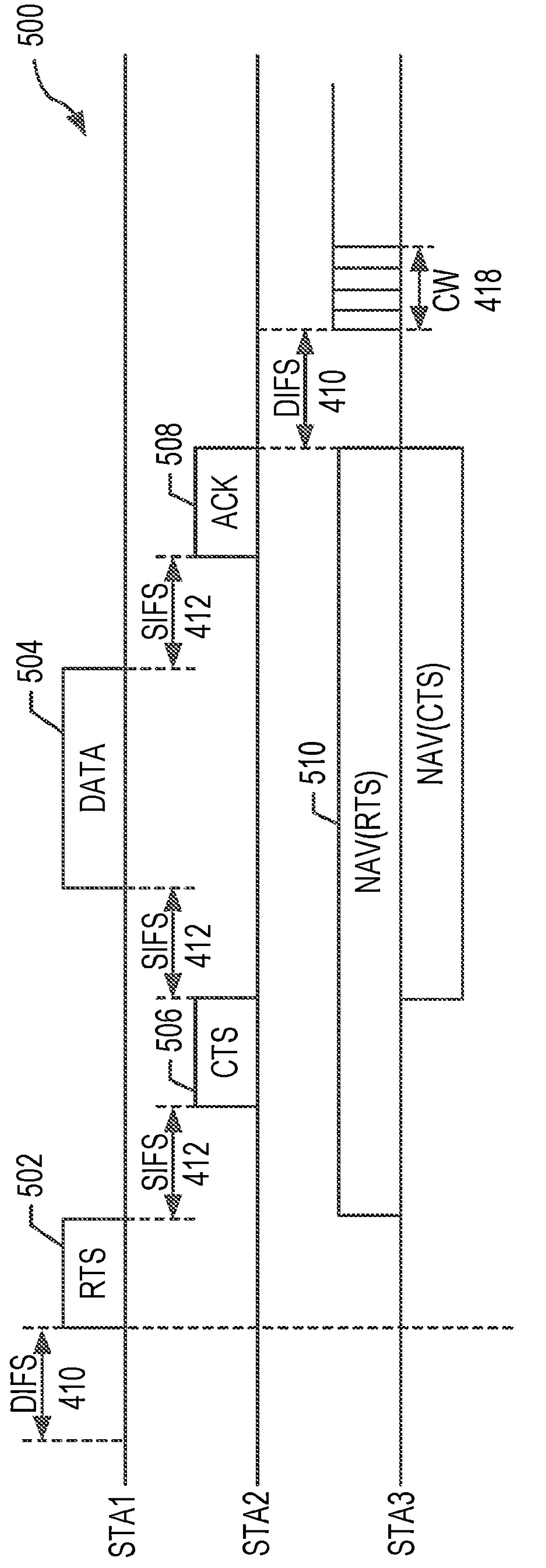
FIG. 5 illustrates an example of a timing diagram of a carrier sense multiple access/collision avoidance (CSMA/CA) based frame transmission procedure for avoiding collision between frames in a channel in accordance with embodiments of the present invention.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NA V timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgement of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
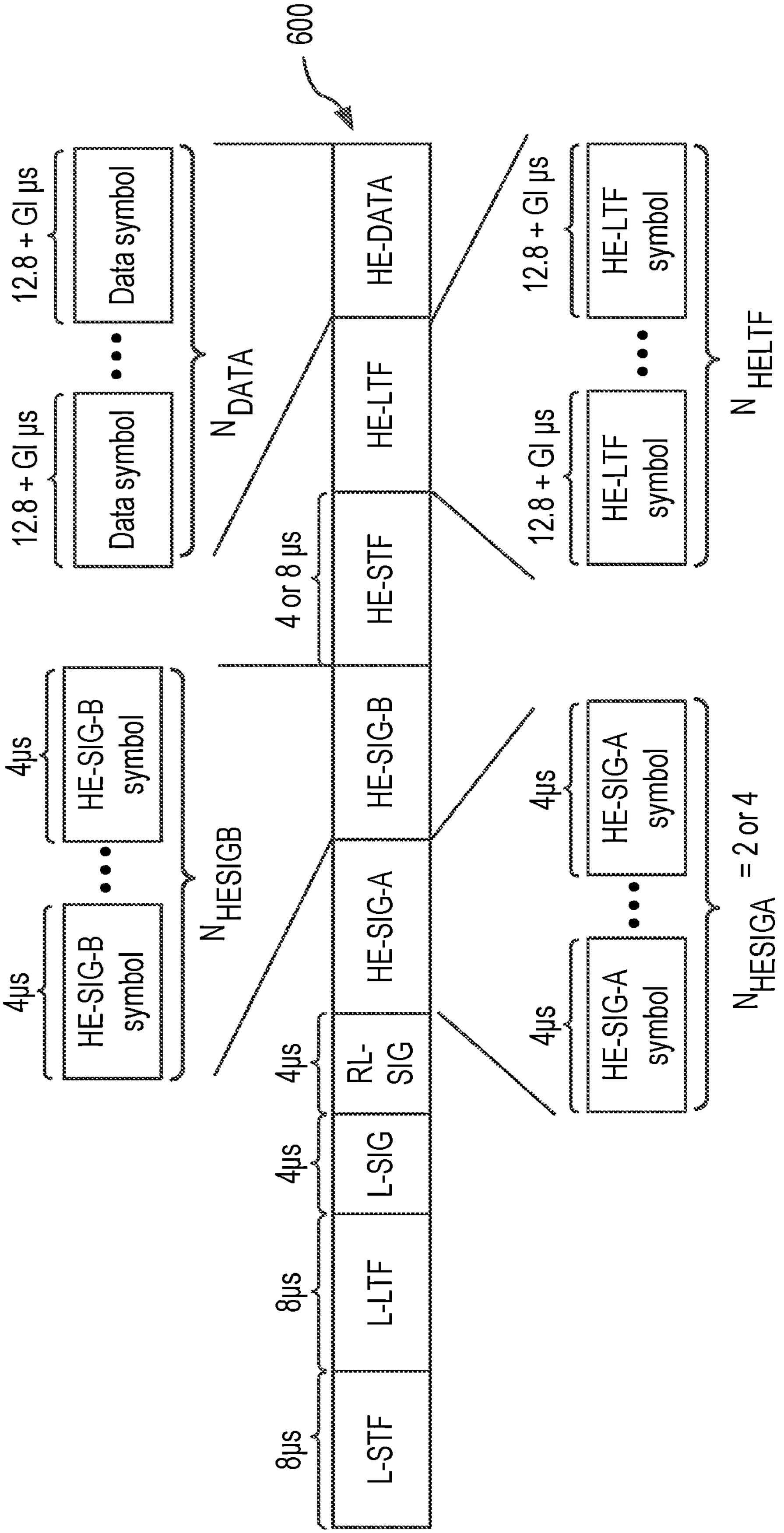
FIG. 6 illustrates an example of a high efficiency (HE) frame in accordance with embodiments of the present invention.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include NHESIGA symbols, the HE-SIG-B field may include NHESIGB symbols, the HE-LTF field may include NHELTF symbols, and the HE-DATA field may include No ATA symbols. In an aspect, the HE-DATA field may also be referred to as a payload field, data, data signal, data portion, payload, PSDU, or Media Access Control (MAC) Protocol Data Units (MPDU) (e.g., MAC frame). A frame may sometimes refer to a PPDU. A frame may sometimes refer to an MPDU or an A-MPDU.

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

The table below provides examples of characteristics associated with the various components of the HE frame 600.

| Element | Definition | Duration | DFT Period | GI | Subcarrier Spacing | Description |
|---|---|---|---|---|---|---|
| Legacy (L)-STF | Non-high throughput (HT) Short Training Field | 8 μs | — | — | Equivalent to 1,250 kHz | L-STF of a non-trigger-based PPDU has a periodicity of 0.8 μs with 10 periods |
| L-LTF | Non-HT Long Training Field | 8 μs | 3.2 μs | 1.6 μs | 312.5 kHz | |
| L-SIG | Non-HT SIGNAL Field | 4 μs | 3.2 μs | 0.8 μs | 312.5 kHz | |

-continued

| Element | Definition | Duration | DFT Period | GI | Subcarrier Spacing | Description |
|---|---|---|---|---|---|---|
| RL-SIG | Repeated Non-HT SIGNAL Field | 4 μs | 3.2 μs | 0.8 μs | 312.5 kHz | |
| HE-SIG-A | HE SIGNAL A Field | $N_{HESIGA}$ * 4 μs | 3.2 μs | 0.8 μs | 312.5 KHz | HE-SIG-A is duplicated on each 20 MHz segment after the legacy preamble to indicate common control information $N_{HESIGA}$ means number of OFDM symbols of the HE-SIG-A filed and is equal to 2 or 4 |
| HE-SIG-B | HE SIGNAL B Field | $N_{HESIGA}$ * 4 μs | 3.2 μs | 0.8 μs | 312.5 KHz | $N_{HESIGA}$ means number of OFDM symbols of the HE-SIG-B filed and is variable DL MU packet contains HE-SIG-B Single user (SU) packets and UL trigger based packets do not contain HE-SIG-B |
| HE-STF | HE Short Training Field | 4 or 8 μs | — | — | Non trigger-based PPDU (equivalent to) 1,250 kHz Trigger-based PPDU (equivalent to) 625 kHz | HE-STF of a non-trigger-based PPDU is not sent in response to a trigger frame. The HE-STF of a trigger-based PPDU has a periodicity of 1.6 μs with 5 periods. A trigger-based PPDU is a UL PPDU sent in response to a trigger frame. |
| HE-LTF | HE Long Training Field | $N_{HELTF}$ * (DFT period + GI) μs | 2xLTF: 6.4 μs. 4xLTF: 12.8 μs. | Supports 0.8, 1.6, and 3.2 μs | 2xLTF (equivalent to) 156.25 kHz. 4xLTF: 78.125 kHz. | HE PPDU may support 2xLTF mode and 4x LTF mode. In the 2xLTF mode, HE-LTF symbol excluding GI is equivalent to modulating every other tone on an OFDM symbol of 12.8 μs excluding GI, and then removing the second half of the OFDM symbol in time domain. $N_{HELTF}$ means the number of HE-LTF symbols and is equivalent to 1, 2, 4, 6, 8. |
| HE-DATA | HE DATA Field | NDATA * (DFT period + GI) μs | 12.8 μs | Supports 0.8, 1.6, and 3.2 μs | 78.125 kHz | $N_{DATA}$ means the number of HE DATA symbols. |

Referring to FIG. 6, the HE frame 600 contains a header and a data field. The header includes a legacy header comprised of the legacy short training field (L-STF), the legacy long training field (L-LTF), and the legacy signal (L-SIG) field. These legacy fields contain symbols based on an early design of an IEEE 802.11 specification. Presence of these symbols may facilitate compatibility of new designs with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHZ, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. The L-LTF field may be utilized for channel estimation, fine frequency-offset correction, and symbol timing. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of a HE-SIG-A field and a HE-SIG-B field. The HE header may be referred to as a non-legacy header. These fields contain symbols that carry control information associated with each PLCP service data unit (PSDU) and/or radio frequency (RF), PHY, and MAC properties of a PPDU. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable (e.g., can vary from frame to frame). In an aspect, the HE-SIG-B field is not always present in all frames. To facilitate decoding of the HE frame 600 by a receiver, the size of (e.g., number of symbols contained in) the HE-SIG-B field may be indicated in the HE-SIG-A field. In some aspects, the HE header also includes the repeated L-SIG (RL-SIG) field, whose content is the same as the L-SIG field.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, the HE-LTF field may occupy less than the entire channel bandwidth. In one aspect, the HE-LTF field may be transmitted using a code-frequency resource. In one aspect, a HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using a HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload or PSDU.

In one or more aspects, additional one or more HE-LTF fields may be included in the header. For example, an additional HE-LTF field may be located after a first HE-LTF field. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Figure 7:
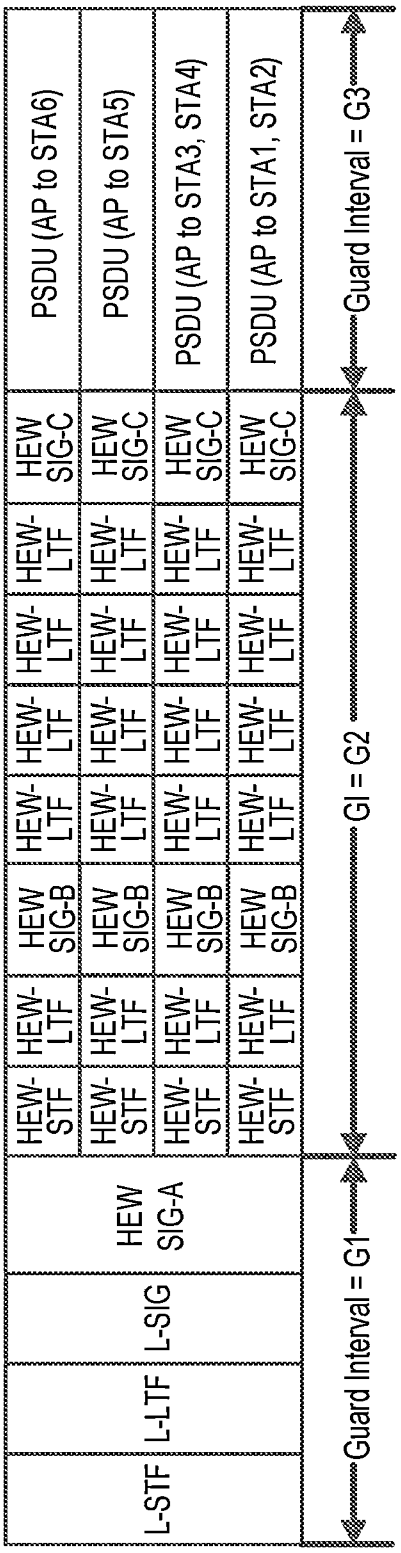
FIGS. 7-19 illustrate examples of an HE physical layer convergence procedure (PLCP) protocol data unit (PPDU) in accordance with embodiments of the present invention.

FIG. 7 illustrates an example of an HEW PPDU. The L-STF field may be utilized to perform frequency offset estimation and phase offset estimation for preamble decoding at a legacy station (STA) (e.g., a station that is in compliance with IEEE 802.11 a, g, n, and/or ac (hereinafter IEEE 802.11a/b/g/n/ac)). The L-LTF field may be utilized to perform channel estimation for preamble decoding at a legacy STA. The L-SIG field may be utilized for the preamble decoding at the legacy STA and may provide protection against PPDU transmission by a third party (e.g., a third party station is not allowed to transmit during a certain period based on the value of a LENGTH field included in the L-SIG field).

The HE-SIG-A field (or HEW SIG-A field) may include HEW PPDU modulation parameters or the like for HEW preamble decoding at an HEW STA (e.g., a station that is in compliance with IEEE 802.11ax). In an aspect, an HEW STA may be referred to as an HE STA, HE-based STA, STA, user, terminal, or variant thereof. The parameters in the HEW SIG-A field may include very high throughput (VHT) PPDU modulation parameters, as listed in the tables below, so as to realize backward compatibility with legacy STAs (e.g., IEEE 802.11ac terminals).

The tables below illustrate fields, bit positions, number of bits, and descriptions included in each of two parts, VHT-SIG-A1 and VHT-SIG-A2, of the VHT-SIG-A field defined in the IEEE 802.11ac standard. For example, a bandwidth (BW) field occupies two least significant bits (LSBs), B0 and B1, of the VHT-SIG-A1 field and has a size of 2 bits. If the 2 bits are set to 0, 1, 2, or 3, the BW field indicates 20 MHz, 40 MHz, 80 MHz, or 160 MHz and 80+80 MHz. For details of the fields included in the VHT-SIG-A field, refer to the IEEE 802.11ac-2013 technical specification (hereafter IEEE 802.11ac specification), which is incorporated herein by reference. In some aspects, in the HE PPDU frame format, the HE-SIG-A field may include one or more of the fields included in the VHT-SIG-A field, and the HE-SIG-A field may provide/facilitate backward compatibility with IEEE 802.11ac stations.

The table below illustrates fields, bit positions, number of bits, and descriptions included in VHT-SIG-A1.

| Bit | Field | Number of Bits | Description |
|---|---|---|---|
| B0-B1 | BW | 2 | Set to 0 for 20 MHz, 1 for 40 MHz, 2 for 80 MHz, and 3 for 160 MHz and 80 + 80 MHz |
| B2 | Reserved | 1 | Reserved. Set to 1. |

-continued

| Bit | Field | Number of Bits | Description |
|---|---|---|---|
| B3 | STBC | 1 | For a VHT SU PPDU: Set to 1 if space time block coding is used and set to 0 otherwise. For a VHT MU PPDU: Set to 0. |
| B4-B9 | Group ID | 6 | Set to the value of the TXVECTOR Parameter GROUP_ID. A value of 0 or 63 indicates a VHT SU PPDU; otherwise, indicates a VHT MU PPDU. |
| B10-B21 | NSTS/ Partial AID | 12 | For a VHT MU PPDU: NSTS is divided into 4 user B21 Partial AID positions of 3 bits each. User position p, where 0 ≤ p ≤ 3, uses bits B(10 + 3p) to B(12 + 3p). The number of space-time streams for user u are indicated at user position p = USER_POSITION[u] where u = 0, 1, . . . , NUM USERS − 1 and the notation A[b] denotes the value of array A at index b. Zero space-time streams are indicated at positions not listed in the USER_POSITION array. Each user position is set as follows: Set to 0 for 0 space-time streams. Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time stream Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a (Group ID and partial AID in VHT PPDUs) of the IEEE 802.11ac specification). |
| B22 | TXOP_PS_NOT_ALLOWED | 1 | Set to 0 by VHT AP if it allows non-AP VHT STAs - in TXOP power save mode to enter Doze state during - a TXOP. Set to 1 otherwise. The bit is reserved and set to 1 in VHT PPDU s transmitted by a non-AP VHT STA. |
| B23 | Reserved | 1 | Set to 1. |

The table below illustrates fields, bit positions, number of bits, and descriptions included in VHT-SIG-A2.

| Bit | Field | Number Of Bits | Description |
|---|---|---|---|
| B0 | Short GI | 1 | Set to 0 if short guard interval is not used in the Data field. Set to 1 if short guard interval is used in the Data field. |
| B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3 (TXTIME and PSDU_LENGTH calculation) of the IEEE 802.11ac specification |
| B2 | SU/MU[0] Coding | 1 | For a VHT SU PPDU, B2 is set to 0 for BCC, 1 for LDPC. For a VHT MU PPDU, if the MU[0] NSTS field is nonzero, then B2 indicates the coding used for user u with USER POSITION[u] = 0; set to 0 for BCC and 1 for LDPC. If the MU[0] NSTS field is 0, then this field is reserved and set to 1. |
| B3 | LDPC Extra | 1 | Set to 1 if the LDPC PPDU encoding process (if an SU PPDU), or at least one LDPC user's PPDU |

-continued

| Bit | Field | Number Of Bits | Description |
|---|---|---|---|
| | OFDM Symbol | | encoding process (if a VHT MU PPDU), results in an extra OFDM symbol (or symbols) as described in 22.3.10.5.4 (LDPC coding) and 22.3.10.5.5 (Encoding process for VHT MU PPDUs) of the IEEE 802.11ac specification. Set to 0 otherwise. |
| B4-B7 | SU VHT-MCS/MU[1-3] Coding | 4 | For a VHT SU PPDU: VHT-MCS index<br>For a VHT MU PPDU:<br>If the MU[1] NSTS field is nonzero, then B4 indicates coding for user u with USER POSITION[u] = 1; set to 0 for BCC, 1 for LDPC. If the MU[1] NSTS field is 0, then B4 is reserved and set to 1.<br>If the MU[2] NSTS field is nonzero, then B5 indicates coding for user u with USER POSITION[u] = 2; set to 0 for BCC, 1 for LDPC. If the MU[2] NSTS field is 0, then B5 is reserved and set to 1.<br>If the MU[3] NSTS field is nonzero, then B6 indicates coding for user u with USER POSITION[u] = 3; set to 0 for BCC, 1 for LDPC. If the MU[3] NSTS field is 0, then B6 is reserved and set to 1.<br>B7 is reserved and set to 1. |
| B8 | Beamformed | 1 | For a VHT SU PPDU:<br>Set to 1 if a Beamforming steering matrix is applied to the waveform in an SU transmission as described in 20.3 .11.10.1 (Spatial mapping) of the IEEE 802.11n specification. Set to 0 otherwise.<br>For a VHT MU PPDU:<br>Reserved and set to 1.<br>NOTE - If equal to 1 smoothing is not recommended. |
| B9 | Reserved | 1 | Reserved and set to 1. |
| B10-B17 | CRC | 8 | CRC as calculated in 20.3.9.4.4 (CRC calculation for HT-SIG) of the IEEE 802.11n specification with c7 in B10. Bits 0-23 of HT-SIG 1 and bits 0-9 of HT-SIG2 are replaced by bits 0-23 of VHT-SIG-A1 and bits 0-9 of VHT-SIG-A2, respectively. |
| B18-B23 | Tail | 6 | Used to terminate the trellis of the convolutional decoder. Set to 0. |

In some aspects, the HEW PPDU format may be utilized to support MU MIMO-OFDMA. In such aspects, information about sub-channels allocated to respective HEW STAs may be included in the HEW SIG-A field. In an aspect, information about a sub-channel allocated to an HEW STA may be configured by including a Sub-channel Allocation Structure (SAS) field in the HEW SIG-A field.

In an aspect, the SAS field may include a plurality of sub-channel bandwidth units. For example, if a sub-channel bandwidth unit is 3 bits, 0 may indicate 5 MHz, 1 may indicate 10 MHz, 2 may indicate 20 MHz, 3 may indicate 40 MHz, 4 may indicate 80 MHz, and 5 may indicate 160 MHz. In this case, if a sub-channel allocation structure is configured by dividing an up to 160-MHz channel into sub-channels of at least 5 MHz each, the SAS field needs a total of 96 bits (=3×32). In order to reduce the signaling overhead of the SAS field, a sub-channel allocation structure may be determined independently for each 20-MHz channel, and if a different SAS field may be included in an HEW SIG-A on a 20-MHz channel basis, only 12 bits (=3×4) are required.

Figure 8:
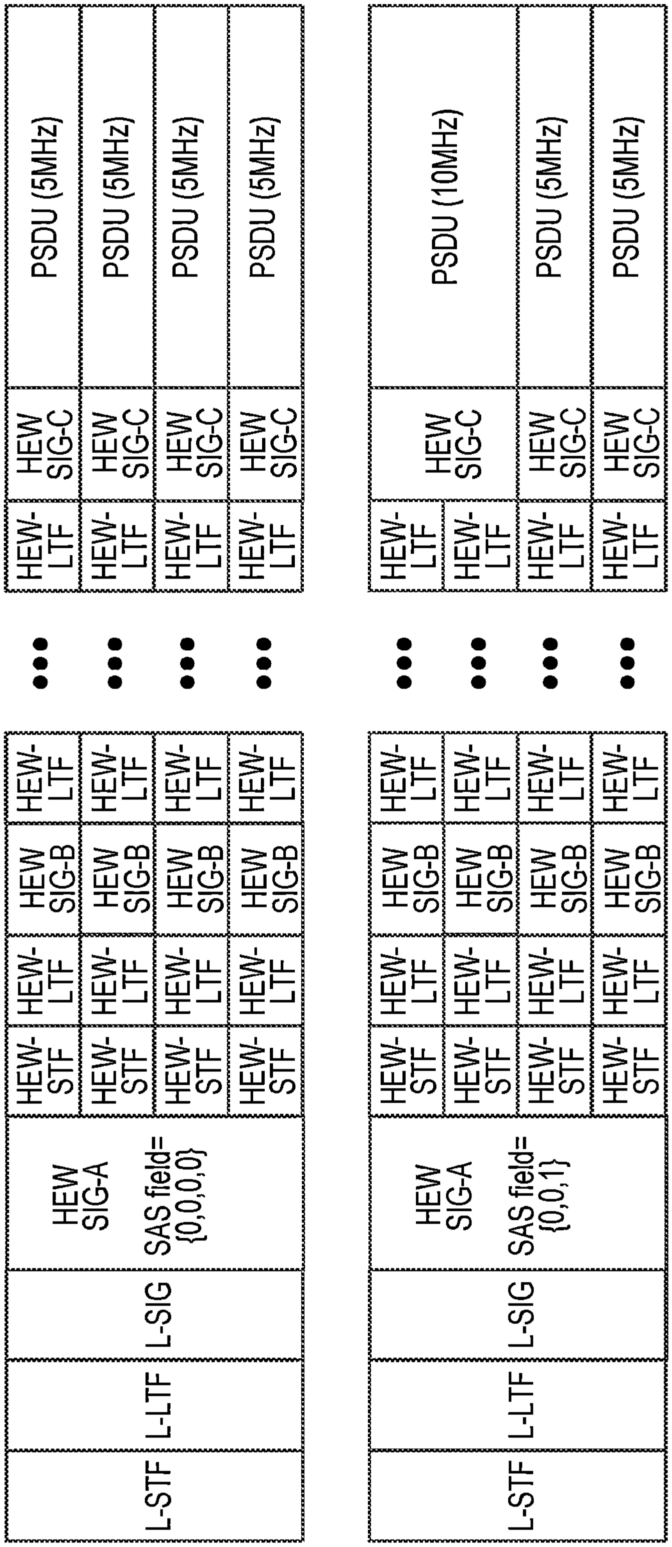

FIG. 8 illustrates an example of a 40-MHz HEW PPDU. In this example, the SAS fields in the HEW SIG-A fields are set to {0, 0, 1} and {0, 0, 0, 0} for 20-MHz channels of the 40-MHz HEW PPDU. As provided previously as an example, 0 may indicate 5 MHz and 1 may indicate 10 MHz, in which case the SAS fields of FIG. 8 indicate that 5 MHz, 5 MHz, 10 MHZ, 5 MHZ, 5 MHZ, 5 MHz, and 5 MHz sub-channels are defined from 20-MHz channels. Upon receipt of the 40-MHz HEW PPDU, a STA may receive the HEW-STF, HEW-LTF, and HEW SIG-B fields on the respective 5 MHz, 5 MHz, 10 MHz, 5 MHZ, 5 MHz, 5 MHZ, and 5 MHz sub-channels, and may determine a sub-channel to be received by determining destination STAs of the respective sub-channels.

In an aspect, in such an HEW PPDU transmission, sub-channels allocated to the respective HEW STAs are sequential to each other and, as a result, empty sub-channels, which are not allocated, are not present within a single 20 MHz channel. Furthermore, in an aspect, sub-channels allocated to the respective HEW STAs are implemented only in a single channel on a 20 MHz channel basis. Consequently, in each of multiple 20 MHz channels, the allocation of partially overlapping sub-channels is prohibited. This means that, since the upper and lower 20-MHz channels are partially overlapped with each other, sub-channels are not allocated in FIG. 8.

In an aspect, upon receipt of the HEW-STF, HEW-LTF, and HEW SIG-B fields on the respective sub-channels, a STA may determine a sub-channel to be received as a destination STA based on the Partial AID and Group ID fields included in the HEW SIG-B fields.

Figure 9:
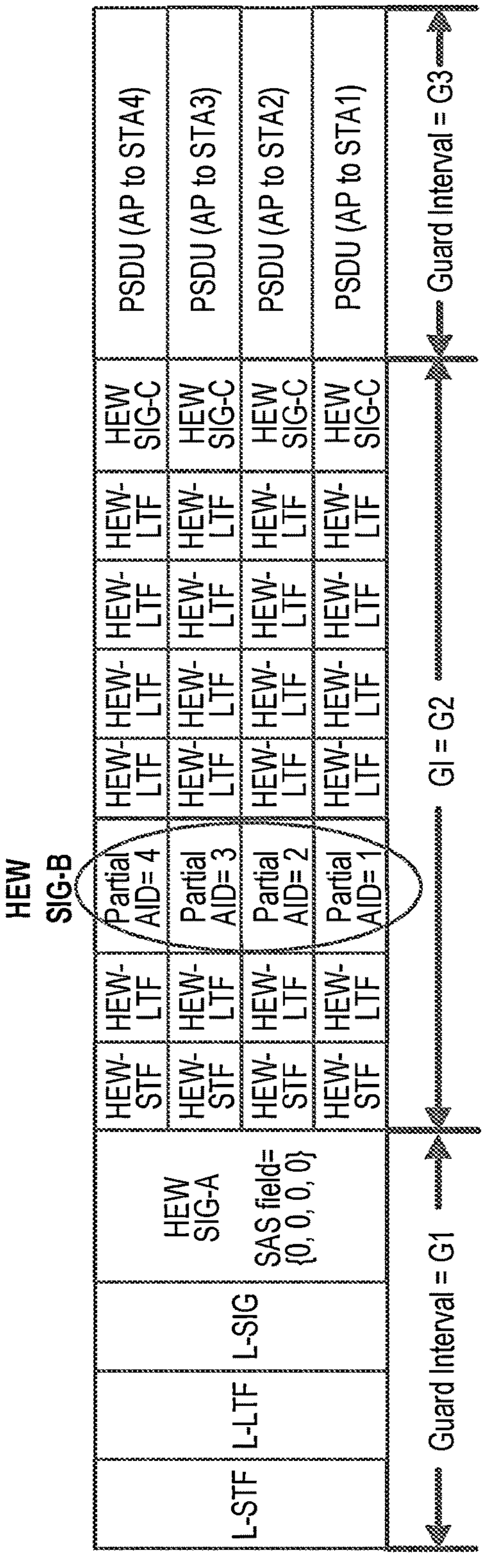

FIG. 9 illustrates an example of an HEW PPDU. The HEW PPDU may be associated with four 5-MHz sub-channels. Partial AIDs may be included in HEW SIG-B fields of respective sub-channels to indicate (e.g., provide identifiers (IDs) that identify) destination STAs. In FIG. 9, the Partial AIDs are set to 1, 2, 3, and 4 in the HEW PPDU. If the Partial AIDs of STA1, STA2, STA3, and STA4 are 1, 2, 3, 4, respectively, STA1, STA2, STA3, and STA4 receive PSDUs directed to them on sub-channels with the Partial AID values in the PSDUs matching their respective Partial AID.

Figure 10:
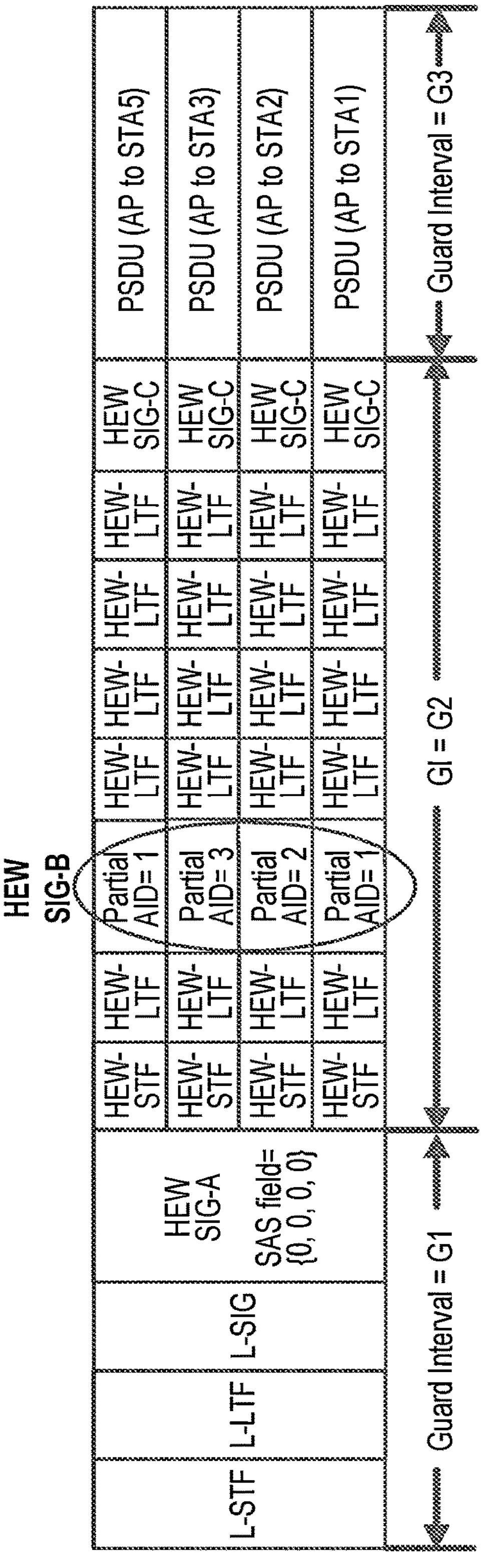

In an aspect, Partial AIDs are not unique for STAs. In such an aspect, STAs having the same Partial AID should not exist among the destination STAs of the HEW PPDU. FIG. 10 illustrates an example of an HEW PPDU in which two Partial AIDs included in the HEW SIG-B fields of respective sub-channels are equal. The HEW PPDU is associated with four 5-MHz sub-channels. In FIG. 10, the Partial AIDs are set to 1, 2, 3, and 1, respectively. If the Partial AIDs of STA1, STA2, STA3, and STA4 are 1, 2, 3, 1, respectively, STA2 and STA3 may receive PSDUs directed to them on sub-channels with the Partial AID values of the PSDUs matching their respective Partial AID. However, in an aspect, each of STA1 and STA4 does not identify a sub-channel to be received because there are multiple sub-channels with Partial AIDs matching the station's Partial AID (e.g., multiple sub-channels with Partial AID of 1). In other words, in this aspect, although the AP transmits PSDUs to different destination STAs on different sub-channels, the destination STAs that have the same Partial AID (e.g., STA1 and STA4 in FIG. 10) does not identify sub-channels to be received.

Figure 11:
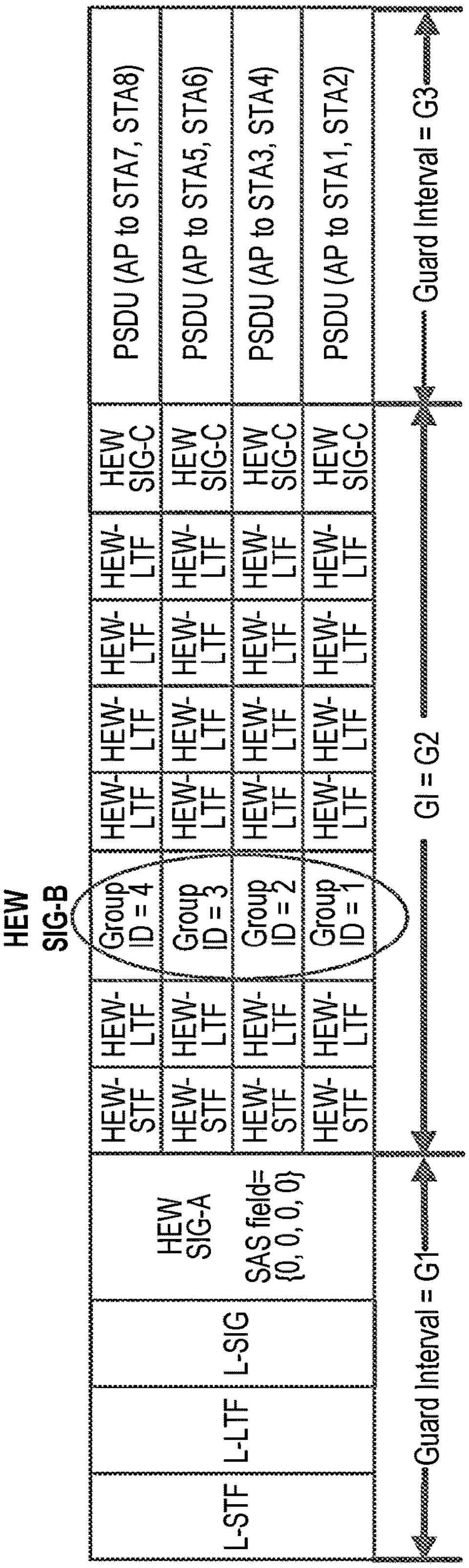

FIG. 11 illustrates an example of an HEW PPDU in which Group IDs included in the HEW SIG-B field of each respective sub-channel, which are IDs indicating destination STAs of the respective sub-channels, are set to 1, 2, 3, and 4. This case may correspond to transmission of an MU-MIMO frame in an HEW PPDU. In this case, the STAs having membership of Group ID 1 are STA1 and STA2, STAs having membership of Group ID 2 are STA3 and STA4, STAs having membership of Group ID 3 are STA5 and STA6, and STAs having membership of Group ID 4 are STA7 and STA8. Each of STA1, STA2, STA3, STA4, STA5, STA6, STA7, and STA8 may compare the Group ID values contained in the HEW SIG-B fields with its Group ID membership status. If the STA has membership of a Group ID, the STA receives a PSDU on a sub-channel carrying the Group ID.

Figure 12:
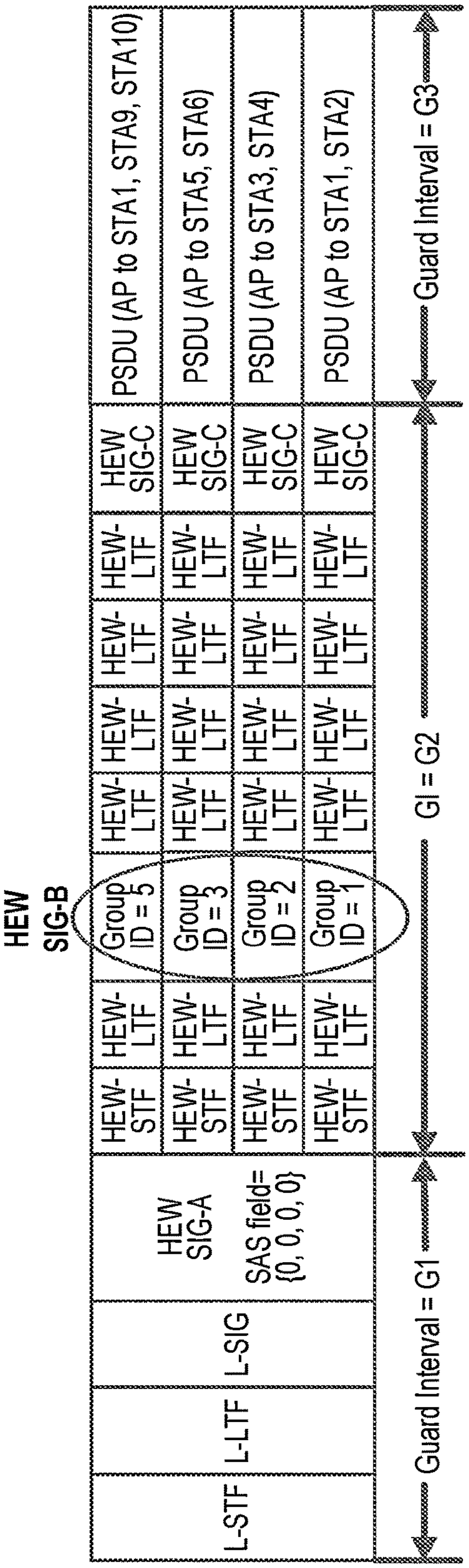

In an aspect, STAs may have membership of multiple Group IDs. FIG. 12 illustrates an example of such an HEW PPDU. In FIG. 12, STAs having membership of Group ID 1 are STA1 and STA2, STAs having membership of Group ID 2 are STA3 and STA4, STAs having membership of Group ID 3 are STA5 and STA6, and STAs having membership of Group ID 5 are STA1, STA9, and STA10. Thus, STA1 has membership of Group ID 1 and Group ID 5. In FIG. 12, among the STAs having membership of Group ID 5, the AP transmits an MU-MIMO frame to STA9 and STA10 (e.g., the stations having membership of Group ID 5 except for STA1). Each of STA2, STA3, STA4, STA5, STA6, STA9, and STA10 may compare the Group ID value of each HEW SIG-B field with its Group ID membership status. If the STA has membership of a Group ID, the STA receives a PSDU on a sub-channel carrying the Group ID. In an aspect, although the AP may transmit PSDUs to different destination STAs on different sub-channels, a STA having membership of different Group IDs included in the HEW SIG-B fields (e.g., STA1 in FIG. 12), the STA does not identify a sub-channel to be received. Therefore, in this aspect, Group IDs to which a STA commonly belongs (among multiple Group IDs indicating destination STAs in the HEW SIG-B fields of an HEW PPDU) should not be included as IDs indicating destination STAs of MU-MIMO transmission in the HEW PPDU. In FIG. 12, such Group IDs include Group ID 1 and Group ID 5. These two Group IDs should not be scheduled simultaneously for MU-MIMO frame transmission in an HEW PPDU.

Figure 13:
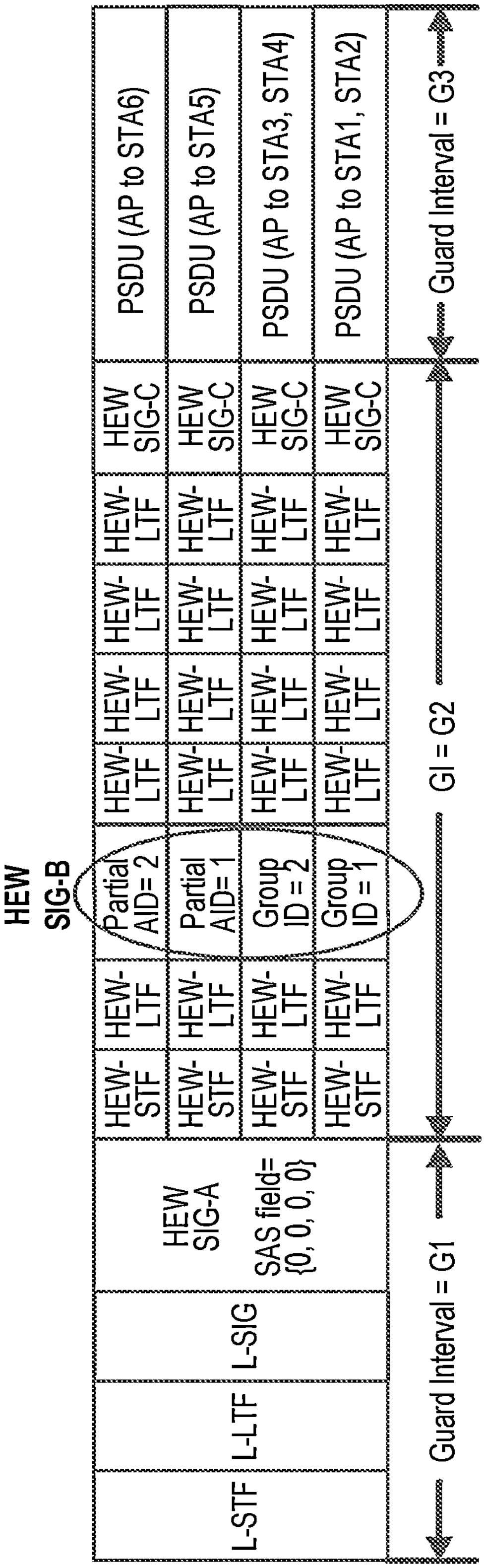

FIG. 13 illustrates an example of an HEW PPDU in which both an SU-MIMO frame and an MU-MIMO frame are transmitted. The HEW PPDU has four 5-MHz sub-channels. In FIG. 13, Group IDs included in the HEW SIG-B fields of the lower two sub-channels are set to 1 and 2, respectively, and Partial AIDs included in the HEW SIG-B fields of the upper two sub-channels are set to 1 and 2, respectively. In this case, an MU-MIMO frame is transmitted on the lower two sub-channels to STAs having membership of Group ID 1 (STA1 and STA2), and STAs having membership of Group ID 2 (STA3 and STA4). Each of STA3 and STA4 may compare the Group IDs values of the HEW SIG-B fields with its Group ID membership status. If the STA has membership of a Group ID, the STA may receive a PSDU on a sub-channel carrying the Group ID.

Also, in this case, an SU-MIMO frame may be transmitted on the upper two sub-channels. For example, if the Partial AIDs of STA1, STA2, STA3, STA4, STA5, and STA6 are 1, 2, 3, 4, 1, and 2, respectively, STA5 and STA6 receive PSDUs destined/intended for them on sub-channels with Partial AIDs values in the HEW SIG-B fields matching their Partial AIDs. In this example, STA1 and STA2 may face a problem. STA1 and STA2 are aware that the Partial AID values of the HEW SIG-B fields included in the corresponding sub-channels are equal to their Partial AIDs in the PSDUs transmitted to STA5 and STA6 by the AP. However, since STA1 and STA2 have membership of Group ID on the lower sub-channels with Group ID 1 carrying the MU-MIMO frame transmitted, STA1 and STA2 recognize that they should receive the corresponding PSDUs. In an aspect, although the AP may transmit PSDUs to different destination STAs on different sub-channels, destination STAs having the same Partial AID of the same Group ID does not identify sub-channels to be received. In FIG. 13, such STAs are STA1 and STA2, and these two STAs may not identify sub-channels to be received. To avert this problem, in an aspect, Group IDs to which STAs having a Partial AID value equal to a corresponding Partial AID (among Partial AIDs and Group IDs included in HEW SIG-B fields of an HEW PPDU) should not be included as IDs indicating destination STAs of SU-MIMO transmission and MU-MIMO transmission in the HEW PPDU. In other words, since STA1 has membership of Group ID 1 and has Partial AID 1, an SU-MIMO frame with Partial AID 1 and an MU-MIMO frame for Group ID 1 should not be transmitted simultaneously in one HEW PPDU.

In some aspects, alternatively or in addition, an HEW PPDU may include a Partial AID and a Group ID in fields other than the HEW SIG-B field. Depending on implementation, an HEW SIG-A field and/or HEW SIG-C field may include a Partial AID and a Group ID. Further, while a Partial AID and a Group ID are given as IDs indicating destination STAs of SU-MIMO transmission and MU-MIMO transmission in one aspect, they may identify destination STAs of an OFDMA resource allocation in another aspect.

In an aspect, an HEW PPDU format may be provided that can support MU MIMO-OFDMA. In this aspect, the HEW SIG-B field may include information about the numbers of spatial streams to be transmitted to HEW STAs allocated to respective sub-channels.

Figure 14:
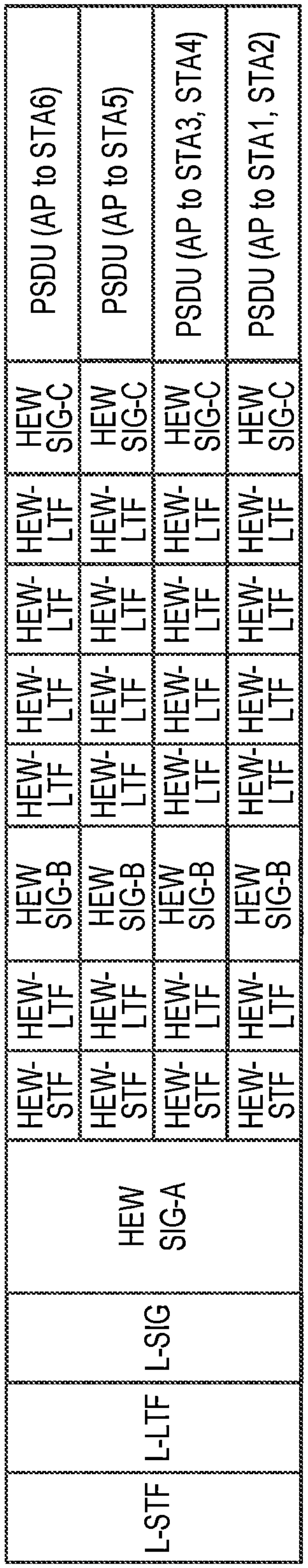

FIG. 14 illustrates an example of an HEW PPDU for MIMO-OFDMA transmission. In FIG. 14, a first 5 MHz sub-channel is allocated to STA1 and STA2 and two spatial streams are transmitted to each STA in a downlink MU- MIMO or OFDMA manner (e.g., a total of four spatial streams are transmitted on one sub-channel). For this purpose, an HEW-STF, HEW-LTF, HEW-SIG-B, HEW-LTF, HEW-LTF, HEW-LTF, HEW-LTF, and HEW SIG-C field follow the HEW-SIG-A field on the sub-channel. The HEW-STF may be used for frequency offset estimation and phase offset estimation for the 5 MHz sub-channel. The HEW-LTF may be used for channel estimation for the 5 MHz sub-channel. Since the sub-channel carries four spatial streams, as many HEW-LTFs (e.g., HEW-LTF symbols or HEW-LTF elements in an HEW-LTF section) as the number of special streams are transmitted to facilitate MIMO transmission. In other words, four HEW-LTFs are transmitted in order to enable/support MIMO transmission (e.g., MU-MIMO transmission).

In an aspect, a relationship between a total number of spatial streams transmitted on one sub-channel and a number of HEW-LTFs transmitted is listed in the table below. For instance, as shown in the table, when the total number of spatial streams to be transmitted is three, a total of four HEW-LTFs are transmitted.

| Total number of spatial streams transmitted on one sub-channel | Number of HEW-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to the table above, if one spatial stream is transmitted on one sub-channel, at least one HEW-LTF is (e.g., needs to be) transmitted on the sub-channel. If an even number of spatial streams are transmitted on one sub-channel, at least as many HEW-LTFs as the number of spatial streams are transmitted. If an odd number of spatial streams greater than one are transmitted on one sub-channel, at least as any HEW-LTFs as a number of adding 1 to the number of spatial streams are transmitted.

In FIG. 14, a second 5 MHz sub-channel is allocated to STA3 and STA4 and one spatial stream per STA is transmitted in the downlink MU-MIMO or OFDMA manner (e.g., a total of two spatial streams are transmitted on one sub-channel). In this case, two HEW-LTFs are transmitted on the second sub-channel, however, in the example of FIG. 14, the HEW-STF, HEW-LTF, HEW-SIG-B, HEW-LTF, HEW-LTF, HEW-LTF, HEW-LTF, and HEW SIG-C field follow the HEW-SIG-A field.

In the foregoing description, in an aspect, when the total number of spatial streams to be transmitted is two, a total of two HEW-LTFs are transmitted. However, in an aspect, in the second 5 MHz sub-channel transmitted to STA3 and STA4, a total of four HEW-LTFs are transmitted. In an aspect, this operation is intended to add a separate condition in relation to the HEW-LTF transmission, and is configured to cause the starting times of transmission of PSDUs that are transmitted in different sub-channels to coincide with each other. If the number of HEW-LTFs substantially required in the second 5 MHz sub-channel (e.g., only two HEW-LTFs) are transmitted, a problem may arise in that the starting times of PSDU transmission in the first 5 MHz sub-channel and in the second 5 MHz sub-channel differ from each other.

In one aspect, an HEW-LTF transmission rule may be added to obviate this problem. For all HEW STAs allocated to respective sub-channels (e.g., for SU-MIMO transmission, a single HEW STA; for MU-MIMO transmission, multiple HEW STAs that are destination terminals of MU-MIMO transmission), the number of HEW-LTFs to be transmitted through each of other sub-channels is set to the same number as the number of HEW-LTFs in the sub-channel requiring the largest number of HEW-LTFs, among all of the numbers of HEW-LTFs required depending on the numbers of spatial streams to be transmitted through respective sub-channels.

Through the application of this rule, in the above example, a third 5 MHz sub-channel may be allocated to STAs and one spatial stream may be transmitted through the corresponding sub-channel in an SU-MIMO manner. However, as shown in FIG. 14, even if it is actually sufficient to transmit only a single HEW-LTF, a total of four HEW-LTFs are transmitted to match the number of HEW-LTFs to be transmitted through other sub-channels.

Further, in the above example, a fourth 5 MHz sub-channel is allocated to STA6 and one spatial stream is transmitted through the corresponding sub-channel in the SU-MIMO manner. However, as shown in FIG. 14, even if it is actually sufficient to transmit only a single HEW-LTF, a total of four HEW-LTFs are transmitted to match the number of HEW-LTFs to be transmitted through other sub-channels.

In an aspect, in order for the HEW PPDU format to support MU-MIMO, independent signaling information may need to be transmitted through each sub-channel. In the case of MU-MIMO, different numbers of spatial streams may be transmitted to multiple HEW STAs, which are destination terminals of MU-MIMO transmission. For this purpose, in an aspect, information about the number of spatial streams to be transmitted to each of the HEW STAs is transferred. If the maximum number of spatial streams that can be transferred to a single HEW STA via MU-MIMO transmission is 4, and the maximum number of destination terminals of MU-MIMO transmission is 4, a total of 12 bits may be required for each sub-channel. When a maximum of four sub-channels can be configured in a 20 MHz channel, a total of 48 bits of signaling information may be required. Therefore, to reduce protocol overhead, such spatial stream allocation information for each sub-channel may be independently transmitted.

Figure 15:
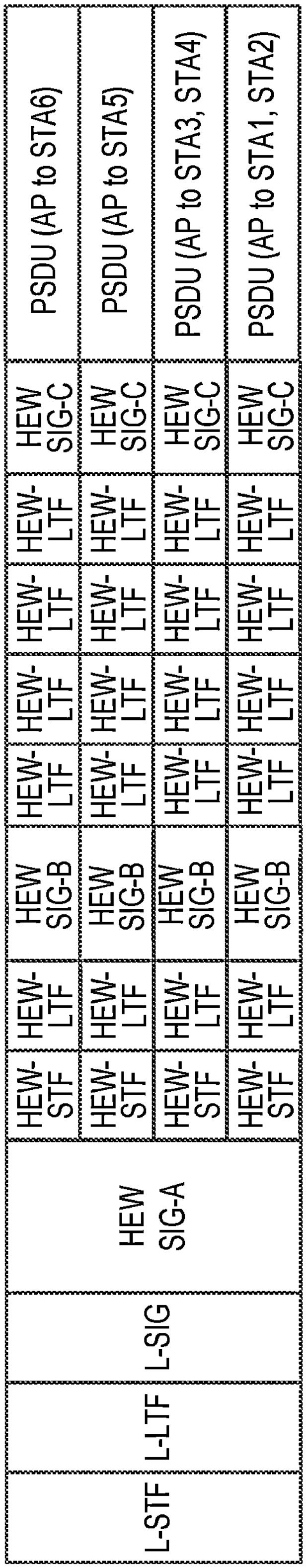

FIG. 15 illustrates an example of an HEW PPDU. The HEW SIG-B field may include spatial stream allocation information for each sub-channel, and may indicate the number of spatial streams (NsTs) to be transmitted to STAs belonging to the corresponding group (group ID) of MU-MIMO in the form of a group ID and NSTS. A signal field (e.g., HEW-SIG-C field) transmitted after the HEW-LTFs may include modulation and coding scheme (MCS) information and PSDU length information for each PSDU.

In an aspect, an HEW-SIG-B field and an HEW-SIG-A field in combination are described. However, the description applies to a modification in which the afore-described HEW-SIG-B field is separated from the HEW-SIG-A field and transmitted after an HEW-STF field and an HEW-LTF field.

Figure 16:
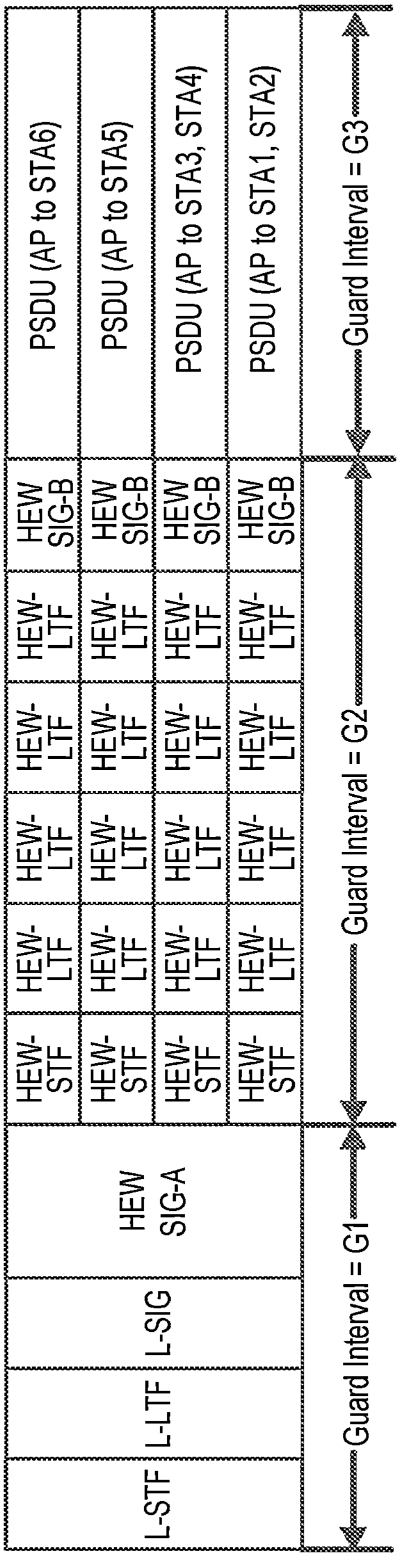

FIG. 16 illustrates an example of an HEW PPDU. In an aspect, each of the L-STF, L-LTF, L-SIG, and HEW SIG-A fields is composed of OFDM symbols having a length of 4.0 us based on 64-Fast Fourier Transform (FFT). At this time, a single OFDM symbol has a guard interval (GI) value of 0.8 μs, denoted as GI.

Each of the HEW-STF, HEW-LTF, HEW SIG-B, and PSDU that are subsequently transmitted may be composed of OFDM symbols having a length of 16 us based on 256 FFT (but the duration of an OFDM symbol may vary with the GI value). In this case, a single OFDM symbol may have two GI values for respective guard intervals. The first guard interval is the value applied to the OFDM symbols of the HEW-STF, HEW-LTF, and HEW SIG-B, denoted as G2. The second guard interval is the value applied to the OFDM symbols of the PSDU, denoted as G3. G2 and G3 may be either identical to each other or different from each other. Further, unlike G1, the values of G2 and G3 are variable depending on respective PPDU transmission vectors that are transmitted, without being fixed. For example, in an aspect, when G1 is fixed at 0.8 μs, G2 may be randomly selected from among 3.2 μs, 1.6 μs, 0.8 μs, and 0.4 μs. Similarly, G3 may also be randomly selected from among 3.2 μs, 1.6 μs, 0.8 μs, and 0.4 μs. Further, the HEW SIG-A field may include signaling information for indicating the selected G2 and G3 values. Once the G2 and G3 values are selected, they are applied in common to all OFDM symbols that are transmitted during the corresponding interval, or to all sub-channels.

In an aspect, when G2 and G3 values are different from each other, a problem may arise in that, if the transmission times of PSDUs do not coincide with each other, OFDM symbol timing, at which OFDM symbols are transmitted through respective sub-channels, is not synchronized. However, in FIG. 16, the transmission times of the PSDUs through the respective sub-channels coincide with each other, and thus no problem is caused by the G2 and G3 values.

In one aspect, a method for synchronizing OFDM symbol timing at which OFDM symbols are transmitted through respective sub-channels is provided for in the situation in which PSDU transmission times do not coincide with each other. In FIG. 16, the length of the interval to which the guard interval G2 of the HEW PPDU format is applied is designated to be variable. That is, the lengths of the transmission intervals for the HEW-STF, HEW-LTF, and HEW-SIGB fields are variable depending on the PPDU transmission vectors to be transmitted.

Figure 17:
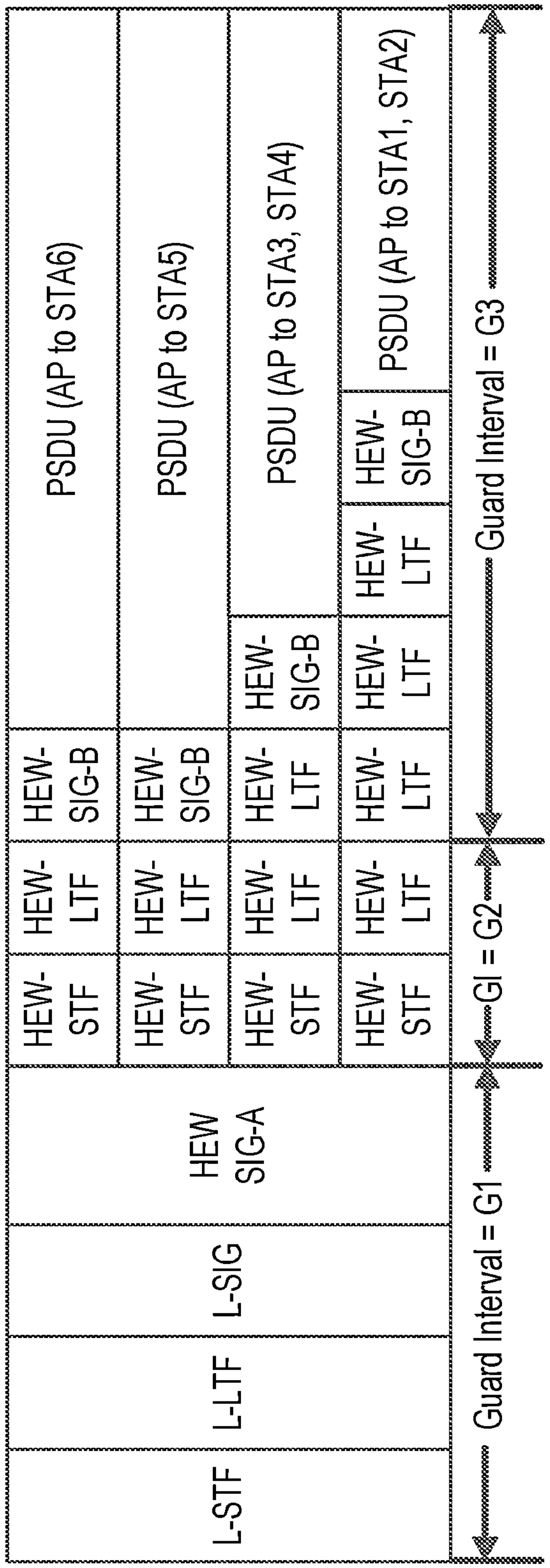

However, the interval to which the guard interval G2 of the HEW PPDU format is applied to the HEW-STF and HEW-LTF may be fixed. FIG. 17 illustrates an example of an HEW PPDU in which the guard interval G2 is fixed. Depending on the implementation, the interval to which the guard interval G2 is applied may be limited only to HEW-STF. Further, depending on the implementation, the interval may be limited to the range above HEW-STF. Furthermore, depending on the implementation, the interval to which guard interval G2 is applied may be limited to 0. After the corresponding interval to which the guard interval G2 is applied, guard interval G3 is equally applied to 0 or one or more of the HEW-LTFs, the HEW-SIG-B, and the PSDU for respective sub-channels depending on the transmission vectors for respective sub-channels.

In an aspect, to reduce the decoding complexity of the destination terminal, the guard interval value for the first OFDM symbol transmitted subsequent to the HEW SIG-A field (e.g., guard interval G2) is set to a fixed value. Unlike G1 and G2, G3 may be a variable value, rather than a fixed value, depending on the individual PPDU transmission vectors that are transmitted. For example, when GI is fixed at 0.8 μs and G2 is fixed at one of 3.2 μs, 1.6 μs, 0.8 μs, and 0.4 μs, G3 may be randomly selected from among 3.2 μs, 1.6 μs, 0.8 μs, and 0.4 μs, and signaling information for indicating the selected G3 value may be included in the HEW SIG-A field.

Figure 18:
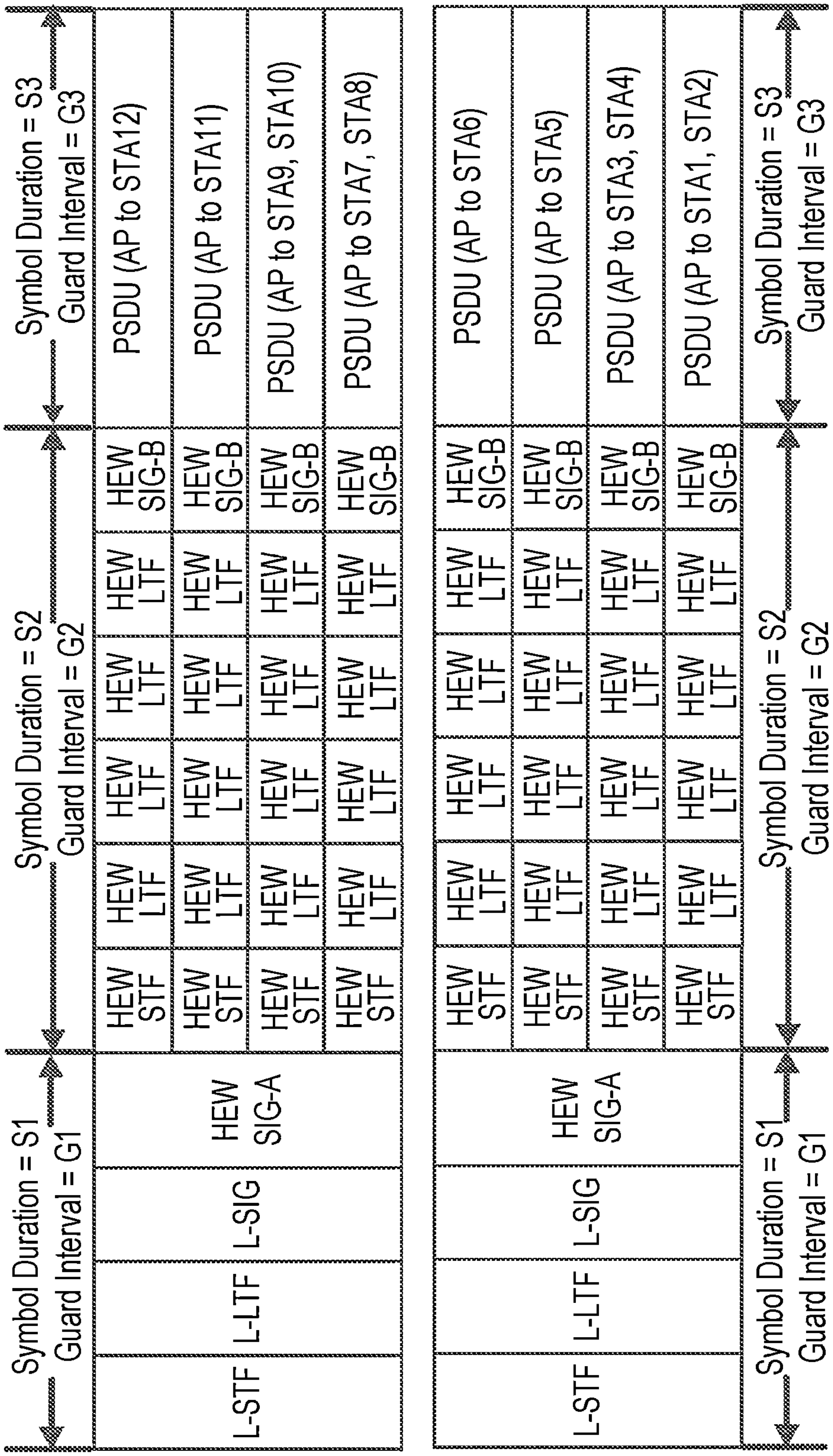

FIG. 18 illustrates an example of an HEW PPDU. In an aspect, the aforementioned HEW PPDU format for allowing PSDU transmission times to coincide with each other may be extended to the format for two or more 20 MHz channels. In an aspect, when the format is extended to 40/80/160 MHz channel bandwidth, no portion in the HEW PPDU format is revised and, for respective 20 MHz channels, OFDM symbol durations (SDs) and guard intervals are identical.

In the 20 MHz channel shown in the lower portion of FIG. 18, the OFDM symbol duration and guard interval of L-STF, L-LTF, L-SIG, and HEW SIG-A are SI and GI, respectively. In a similar manner, in this case, in the 20 MHz channel in the upper portion of FIG. 18, the OFDM symbol duration and guard interval of L-STF, L-LTF, L-SIG, and HEW-SIG-A are SI and GI, respectively.

In the 20 MHz channel in the lower portion of FIG. 18, the OFDM symbol duration and guard interval of the HEW-STF, HEW-LTF, and HEW SIG-A are S2 and G2, respectively. In a similar matter, in this case, in the 20 MHz channel in the upper portion, the OFDM symbol duration and guard interval of the HEW-STF, HEW-LTF, and HEW SIG-A are S2 and G2, respectively.

In the 20 MHz channel in the lower portion of FIG. 18, the OFDM symbol duration and guard interval of the PSDU are S3 and G3, respectively. In a similar matter, in this case, in the 20 MHz channel in the upper portion, the OFDM symbol duration and guard interval of the PSDU are S3 and G3, respectively.

If the OFDM symbol duration and guard interval are configured and used for transmission based on 64 FFT in any one 20 MHz channel, the OFDM symbol duration and guard interval are configured and used for transmission based on 64 FFT in the remaining 20 MHz channel. In an aspect, if the OFDM symbol duration and guard interval are configured and used for transmission based on 64 FFT in any one 20 MHz channel, it may not be possible to configure and use the OFDM symbol duration and guard interval for transmission based on 256 FFT in the remaining 20 MHz channel.

Depending on the implementation, the OFDM symbol duration and guard interval values in the respective 20 MHz channels (e.g., S2 and G2, S3 and G3 in FIG. 18) may be set to different values for respective 20 MHz channels. For reference, S1 and G1 are fixed for all 20 MHz channels. Even in this case, in a single 20 MHz channel, the same values are applied to S2, G2, S3, and G3 for respective sub-channels.

Figure 19:
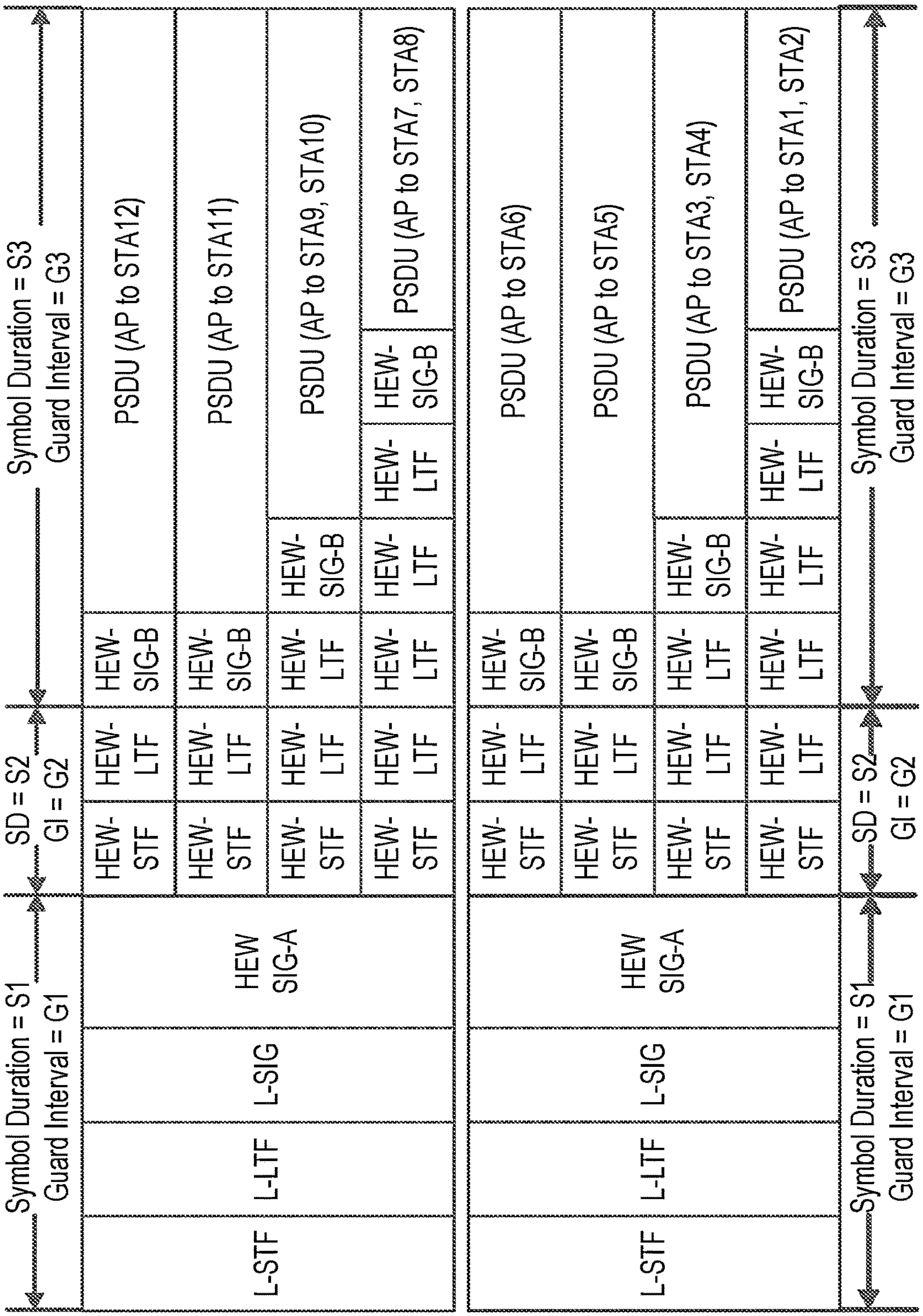

In one or more aspects, an HEW PPDU format is provided for 40/80/160 MHz channel bandwidth. FIG. 19 illustrates an HEW PPDU format. In an aspect, the aforementioned HEW PPDU format in which PSDU transmission times do not coincide with each other may be extended to the format for two or more 20 MHz channels. In an aspect, when the format is extended to 40/80/160 MHz channel bandwidth, no portion in the HEW PPDU format is revised and, for respective 20 MHz channels, OFDM symbol durations and guard intervals are identical.

In the 20 MHz channel shown in the lower portion of FIG. 19, the OFDM symbol duration and guard interval of the L-STF, L-LTF, L-SIG, and HEW SIG-A are SI and GI, respectively. In a similar manner, in this case, in the 20 MHz channel in the upper portion, the OFDM symbol duration and guard interval of the L-STF, L-LTF, L-SIG, and HEW SIG-A are SI and GI, respectively.

In the 20 MHz channel in the lower portion of FIG. 19, the OFDM symbol duration and guard interval of the HEW-STF and HEW-LTF are S2 and G2, respectively. In a similar manner, in this case, in the 20 MHz channel in the upper portion, the OFDM symbol duration and guard interval of the HEW-STF and HEW-LTF are S2 and G2, respectively.

In the 20 MHz channel in the lower portion of FIG. 19, the OFDM symbol duration and guard interval are S3 and G3, respectively, for the period during which 0 or one or more HEW-LTFs, HEW SIG-B, and PSDU are transmitted depending on the transmission vectors for respective sub-channels. In a similar manner, in this case, in the 20 MHz channel in the upper portion, the OFDM symbol duration and guard interval of the HEW-LTF, HEW SIG-B, and PSDU are also S3 and G3, respectively.

In an aspect, if the OFDM symbol duration and guard interval are configured and used for transmission based on 64 FFT in any one 20 MHz channel, the OFDM symbol duration and the guard interval are configured and used for transmission based on 64 FFT in the remaining 20 MHz channel. In an aspect, when the OFDM symbol duration and the guard interval are configured and used for transmission based on 64 FFT in any one 20 MHz channel, it may not be possible to configure and use the OFDM symbol duration and the guard interval for transmission based on 256 FFT in the remaining 20 MHz channel.

Depending on the implementation, the OFDM symbol duration values and guard interval values in the respective 20 MHz channels (e.g., S2, G2, S3, and G3 in FIG. 19) may be set to different values for respective 20 MHz channels. For reference, S1 and G1 are fixed for all 20 MHz channels. Even in this case, in a single 20 MHz channel, the same values are applied to S2, G2, S3, and G3 for respective sub-channels.

In an aspect, performance may be further improved by applying MU-MIMO technology when multiple terminals perform simultaneous transmission to a single AP. Uplink MU-MIMO technology is applicable to the case where the AP is capable of simultaneously receiving multiple spatial streams through multiple antennas.

Figure 20:
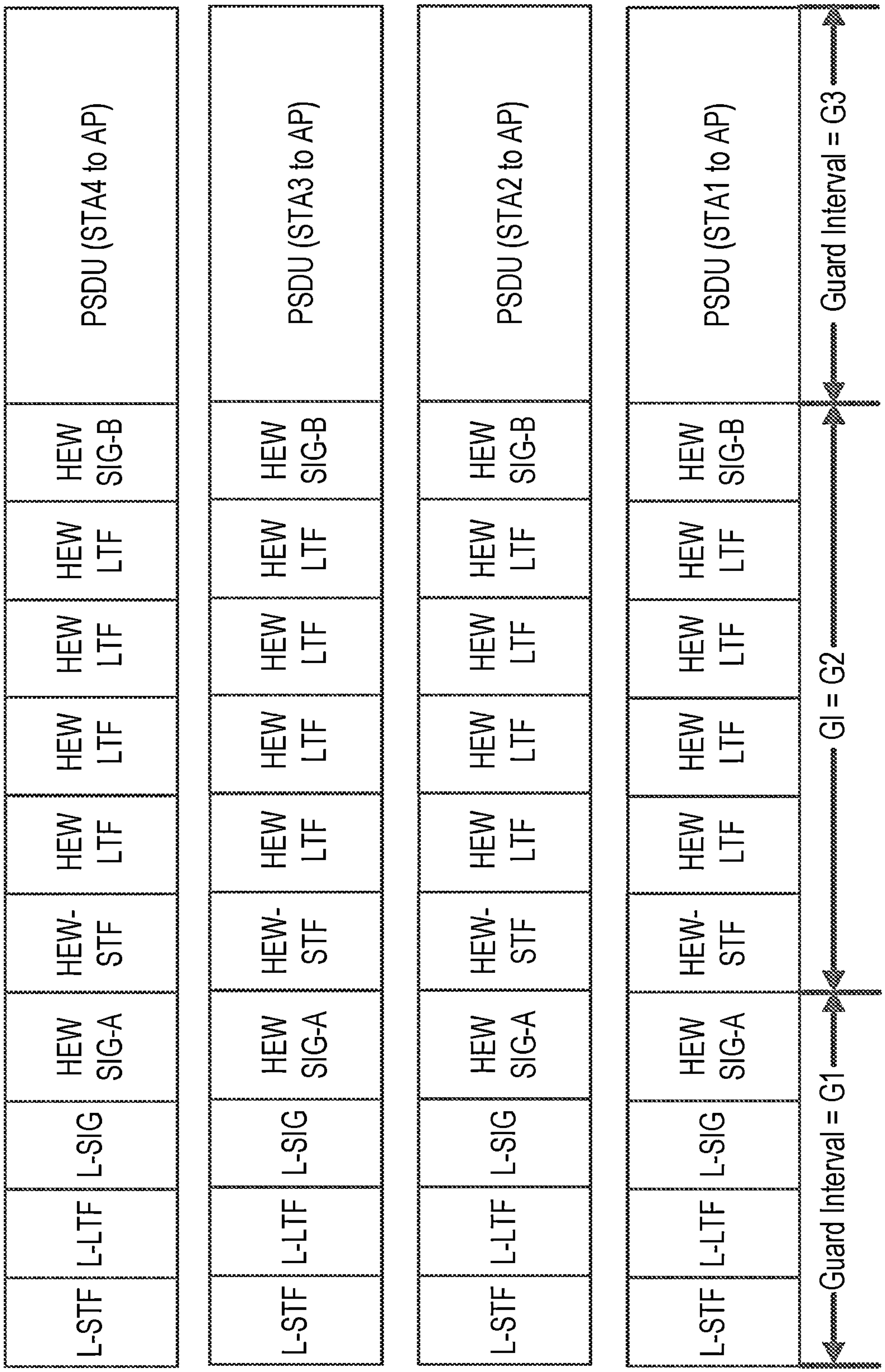
FIGS. 20 and 21 illustrate examples in which multiple stations simultaneously transmit uplink data frames to an access point in accordance with embodiments of the present invention.

FIG. 20 illustrates an example in which STA1, STA2, STA3, and STA4 simultaneously transmit uplink data frames to the AP. In an aspect, in a procedure for performing simultaneous transmission via uplink MU-MIMO technology, a signaling procedure may be conducted in advance (e.g., prior to the simultaneous transmission of uplink data frames) in which the AP determines the terminals that are sources of uplink data frame transmission and designates the numbers of spatial streams transmittable by the corresponding terminals and the guard intervals to be used for PSDU transmission. FIG. 20 illustrates the case where the AP determines STA1, STA2, STA3, and STA4 to be the terminals that are sources of uplink data frame transmission, and designates the numbers of spatial streams transmittable by the corresponding stations as 4, 2, 1, and 1, respectively.

In an aspect, the L-STF, L-LTF, L-SIG, and HEW SIG-A fields may have common values when STA1, STA2, STA3, and STA4 simultaneously transmit uplink data frames to the AP. In an aspect, if these fields do not have common values, the AP may be incapable of correctly receiving the corresponding fields. The HEW SIG-A fields may include information about STA1, STA2, STA3, and STA4 and the numbers of spatial streams transmittable by the corresponding stations, thus allowing the stations to correctly receive the HEW-STF, HEW-LTF, HEW SIG-B, and PSDU.

In FIG. 20, the AP designated the numbers of transmittable spatial streams of STA1, STA2, STA3, and STA4 as 4, 2, 1, and 1, respectively. If STA1, STA2, STA3, and STA4 transmit PSDUs in conformity with the numbers of transmittable spatial streams designated by the AP, spatial stream information such as 4 spatial streams, 2 spatial streams, 1 spatial stream, and 1 spatial stream may be included in the HEW SIG-A fields (e.g., only in the HEW SIG-A fields). In an aspect, STA1, STA2, STA3, and STA4 may randomly select the numbers of spatial streams to be transmitted (e.g., under the condition that the randomly selected number does not exceed the number of transmittable spatial streams designated by the AP). For instance, if 2 spatial streams, 1 spatial stream, 1 spatial stream, and 1 spatial stream are respectively used for actual PSDU transmission, such information about the corresponding spatial streams may need to be included in the HEW SIG-B fields for indicating user-specific information. In other words, pieces of information about the numbers of spatial streams (e.g., 4, 2, 1, and 1) are included in the HEW SIG-A fields, and function to indicate the HEW-STF and the numbers of HEW-LTFs. As shown in FIG. 20, when the numbers of HEW-LTFs transmitted by the terminals are identical to each other, information about the total number of HEW-LTFs actually transmitted (e.g., 4) may be included in each HEW SIG-A field without individually indicating 4 spatial streams, 2 spatial streams, 1 spatial stream, and 1 spatial stream. Further, pieces of information about the 2 spatial streams, 1 spatial stream, 1 spatial stream, and 1 spatial stream may be included in respective HEW SIG-B fields, thus indicating the numbers of spatial streams that are actually used for PSDU transmission.

Even in uplink MU-MIMO transmission, when the starting times of PSDU transmission are different from each other, the problem of misalignment between OFDM symbols may arise. To solve this problem, a method may be utilized to cause the numbers of HEW-LTFs transmitted in uplink MU-MIMO for all terminals to be identical to each other. In FIG. 20, the terminals require the transmission of 4, 2, 1, and 1 HEW-LTFs, respectively, in uplink data frame transmission. To adjust the numbers of HEW-LTFs that are transmitted to be identical to each other for the different terminals, 0, 2, 3, and 3 HEW-LTFs may be additionally transmitted, respectively.

In FIG. 20, the L-STF, L-LTF, L-SIG, and HEW SIG-A fields are transmitted using guard interval G1, the HEW-STF, HEW-LTF, and HEW SIG-B fields are transmitted using guard interval G2, and the PSDU is transmitted using guard interval G3. The guard intervals G2 and G3 may be implemented using fixed values or variable values. If the guard intervals G2 and G3 are variable, information indicating the values of the guard intervals G2 and G3 may be included in the HEW SIG-A field.

In uplink MU-MIMO transmission, multiple STAs may apply a beamforming mechanism to their transmission PPDUs. Information indicating whether beamforming is applied may be included in an HEW SIG-A field and/or an HEW SIG-B field. In an aspect, if the information indicating whether beamforming is applied is included in the HEW SIG-A, all STAs should perform beamforming application in unison. In this case, a same beamforming mechanism (e.g., a beamforming steering matrix) may be applied to waveforms in the HEW-STFs, HEW-LTFs, HEW SIG-Bs, and PSDUs of all PPDUs transmitted by the STAs in the uplink MU-MIMO transmission. In an aspect, if the information indicating whether beamforming is applied is included in the HEW SIG-B, each STA may perform beamforming differently. In this case, such information included in the HEW SIG-B may indicate whether one STA participating in the uplink MU-MIMO transmission is to perform the beamforming mechanism. Each of the STAs participating in the uplink MU-MIMO transmission may apply the beamforming steering matrix only to waveforms of the HEW-STF, HEW-LTF, HEW SIG-B, and PSDU of a PPDU that the station transmits, according to the value of the corresponding field.

Figure 21:
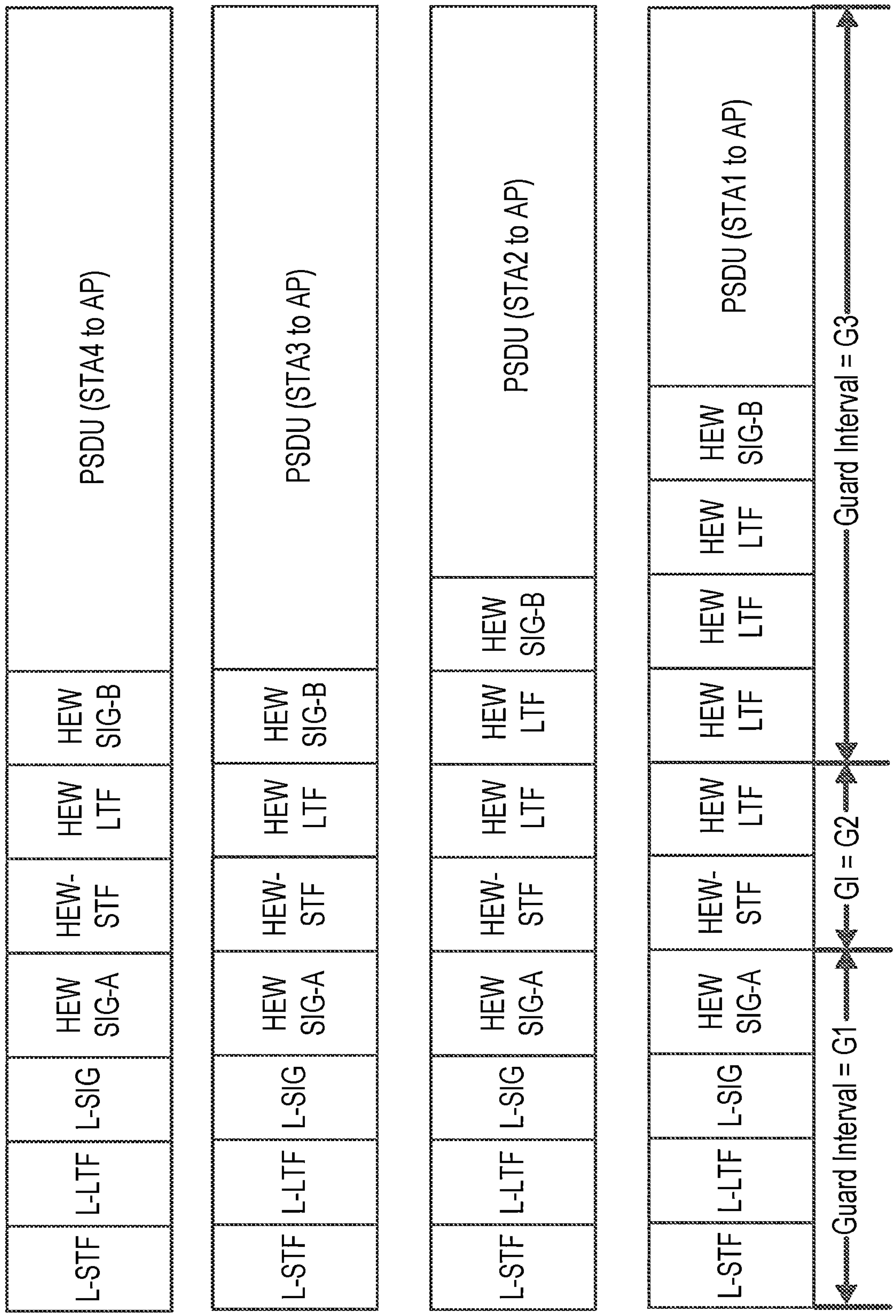

FIG. 21 illustrates another example in which STA1, STA2, STA3, and STA4 simultaneously transmit uplink data frames to the AP. The description from FIG. 20 generally applies to FIG. 21, with examples of differences between FIG. 20 and FIG. 21 and other description provided herein for purposes of clarity and simplicity.

In an aspect, the HEW-LTFs are transmitted such that the number of HEW-LTFs is adjusted to be identical to the number of transmittable spatial streams designated by the AP even if the number of spatial streams that are actually transmitted by each of STA1, STA2, STA3, and STA4 is less than the number of transmittable spatial streams designated by the AP. For instance, even if 2, 1, 1, and 1 spatial streams have been respectively used for actual PSDU transmission, the numbers of HEW-LTFs to be transmitted by the STA1, STA2, STA3, and STA4 are 4, 2, 1, and 1, respectively.

Even in uplink MU-MIMO transmission, when the starting times of PSDU transmission are different from each other, a problem of misalignment between OFDM symbols may arise. To solve this problem, the interval to which the guard interval G2 of the HEW PPDU format is applied may be fixed at HEW-STF and HEW-LTF. Depending on the implementation, the interval to which the guard interval G2 is applied may be limited only to the HEW-STF. Further, depending on the implementation, the interval may be limited to the range above the HEW-STF. Furthermore, depending on the implementation, the interval to which guard interval G2 is applied may be limited to 0. After the interval to which guard interval G2 is applied, guard interval G3 may equally be applied to all terminals for 0 or one or more HEW-LTFs, the HEW-SIG-B, and the PSDU depending on the uplink MU-MIMO transmission vectors transmitted by the respective terminals. Depending on the implementation, the interval to which guard interval G2 is applied may extend to the HEW SIG-B field. In this case, guard interval G2 may be used for some of the PSDUs transmitted by STA2, STA3, and STA4, and guard interval G3 is used for the remaining PSDU s.

In one or more aspects, an acknowledgement policy (Ack Policy) mechanism for uplink MU-MIMO transmission may be utilized in an HEW PPDU.

Figure 22:
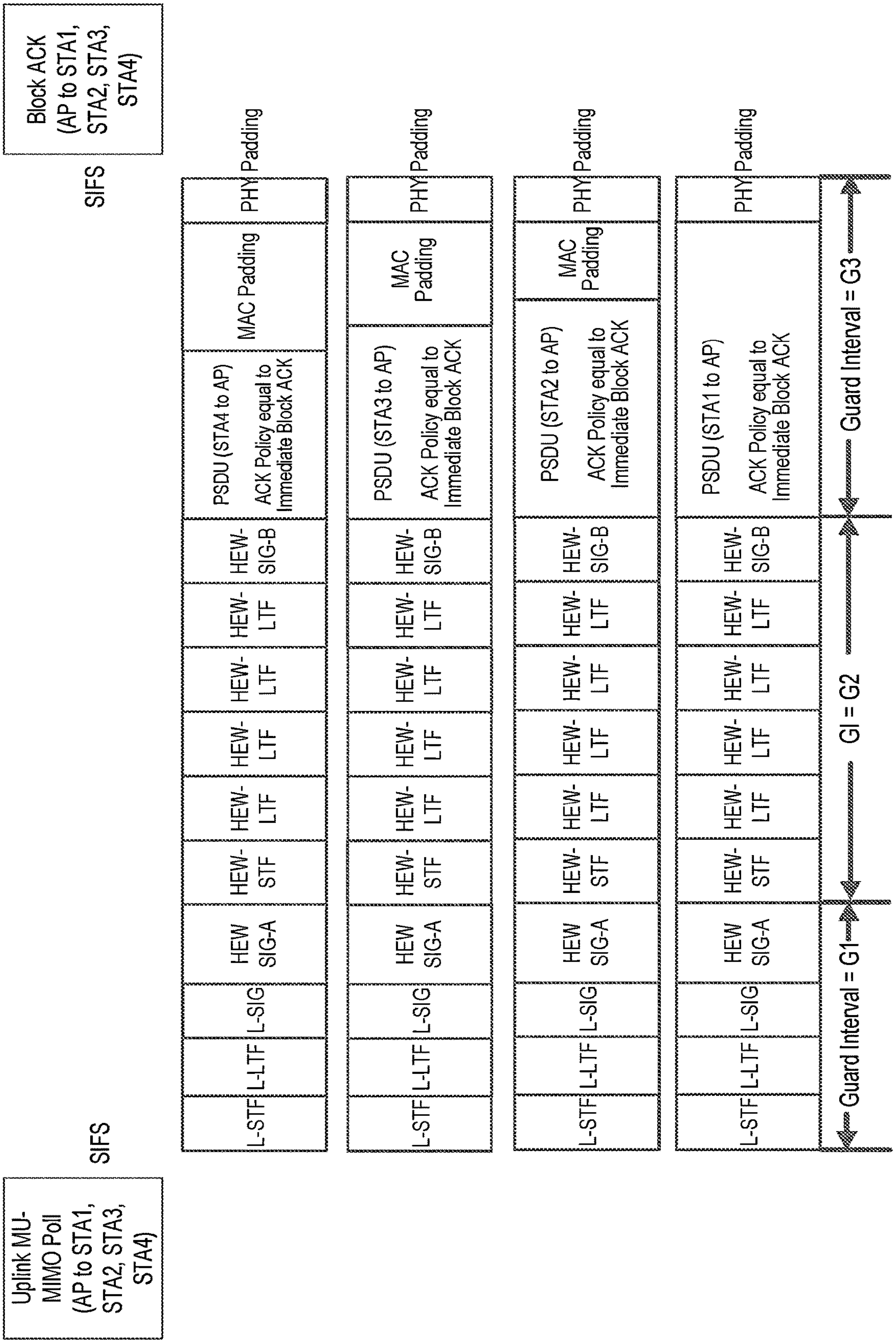
FIGS. 22 and 23 illustrate examples of a frame exchange sequence used for uplink multi-user multiple-input-multiple-output (MU-MIMO) transmission in accordance with embodiments of the present invention.

FIG. 22 illustrates an example of a frame exchange sequence used for uplink MU-MIMO transmission. An AP may transmit an uplink MU-MIMO Poll frame to STAs granting/requesting uplink MU-MIMO transmission. In FIG. 22, to request uplink MU-MIMO transmission to STA1, STA2, STA3, and STA4, the AP may transmit an uplink MU-MIMO Poll frame to STA1, STA2, STA3, and STA4. The uplink MU-MIMO Poll frame directed to the STAs may include a receiver address (e.g., address 1 field in the MAC Header) set to a broadcast address, a transmitter address (e.g., address 2 field in the MAC Header) to a BSSID, and the AIDs of the STAs requesting uplink MU-MIMO transmission in a payload.

In an aspect, upon receipt of the uplink MU-MIMO Poll frame, the STAs may determine, based on the uplink MU-MIMO Poll frame, whether they are requested to perform uplink MU-MIMO transmission. If the STAs are destination STAs, they may transmit an uplink MU-MIMO PPDU to the AP during a time period indicated by the uplink MU-MIMO Poll frame. To make the transmission times of the uplink MU-MIMO PPDU transmitted by the STAs equal, MAC padding and PHY padding may be performed. In an aspect, MAC padding may refer to support of padding by aggregating 4 octets of null MPDUs in the form of an aggregated MPDU (A-MPDU) at the MAC layer. In an aspect, PHY padding may refer to filling a last OFDM symbol with bits. The number of bits added by PHY padding may be equal to or smaller than 1 octet.

In FIG. 22, STA1 has DATA (e.g., HE-DATA) to be transmitted during a time period indicated by an uplink MU-MIMO Poll frame. Therefore, STA1 may transmit an uplink MU-MIMO PPDU during the given time and thus may transmit an uplink MU-MIMO PPDU during the given time without MAC padding. On the other hand, STA2, STA3, and STA4 may have no data to be transmitted during the time period indicated by the uplink MU-MIMO Poll frame and thus align their transmission times of the uplink MU-MIMO PPDU with the transmission times of the uplink MU-MIMO PPDU of the other STAs by MAC padding. The Ack Policy of the MAC header of each uplink MU-MIMO PPDU may indicate Immediate Block ACK (e.g., the Ack Policy may be set to a value associated with Immediate Block ACK).

In an aspect, upon receipt of and in response to the uplink MU-MIMO PPDU, the AP may transmit block ACK frames to the STAs transmitting the uplink MU-MIMO PPDU. In an aspect, the AP may transmit an uplink MU-MIMO Poll frame requesting a next uplink MU-MIMO PPDU transmission along with the Block ACK frames.

Figure 23:
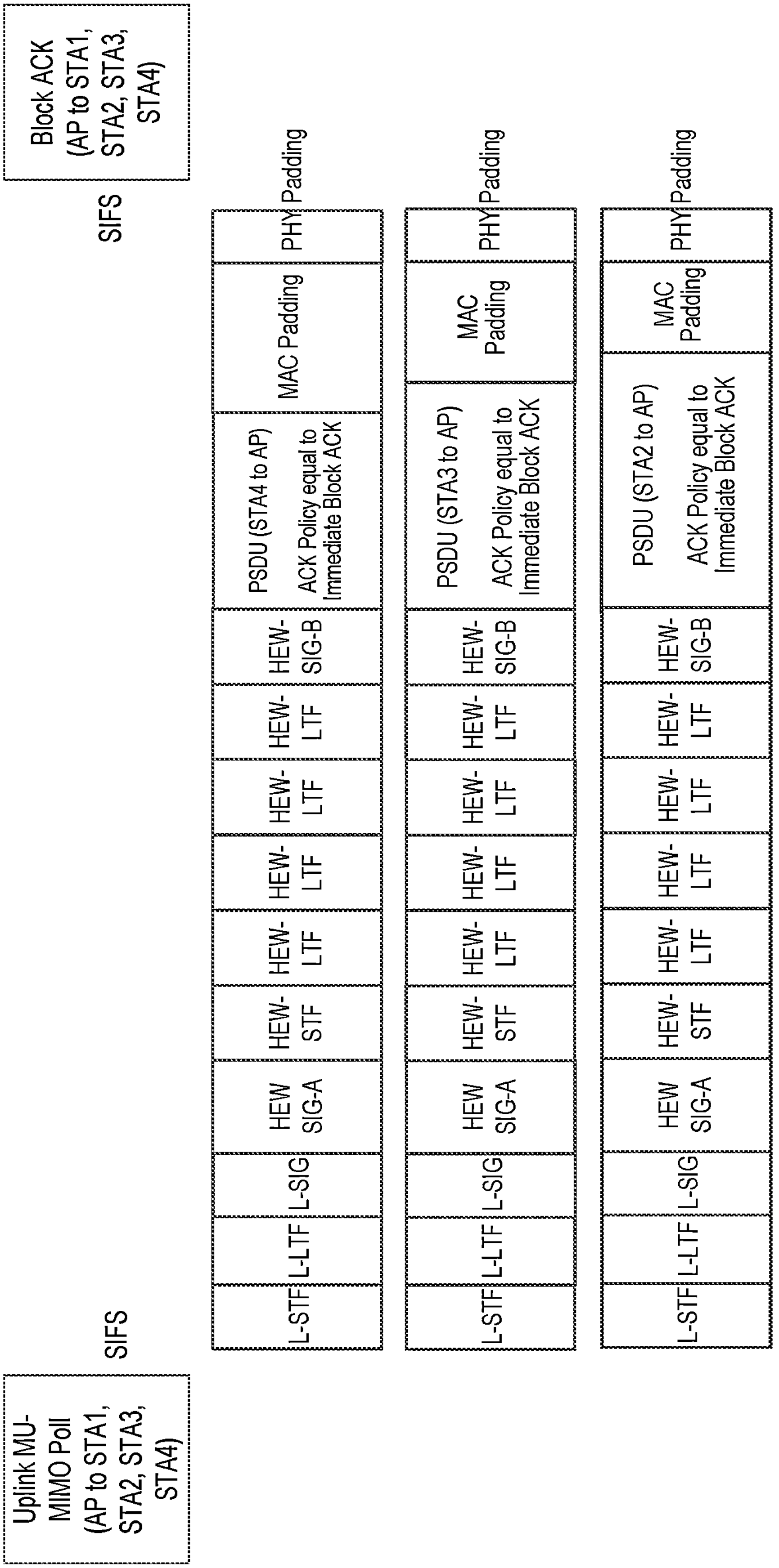

FIG. 23 illustrates an example of a frame exchange sequence used for uplink MU-MIMO transmission. In FIG. 23, STA1 may fail to receive an uplink MU-MIMO Poll frame. As illustrated in FIG. 23, there is no meaningful DATA transmission in an uplink MU-MIMO PPDU transmitted only by STA2, STA3, and STA4. In this regard, MAC padding may degrade system performance in a situation where a STA (e.g., STA1 in FIG. 23) that has a DATA frame enough to be transmitted during a time indicated by the uplink MU-MIMO Poll frame does not participate in the uplink MU-MIMO PPDU transmission.

In an aspect, to address such performance degradation caused by MAC padding, the Ack Policy of an uplink MU-MIMO PPDU may be set to Delayed Block ACK and a different uplink MU-MIMO PPDU transmission time may be set for each transmitting STA.

In an aspect, upon receipt of an uplink MU-MIMO Poll frame, STAs may determine, based on the uplink MU-MIMO Poll frame, whether they are requested to perform an uplink MU-MIMO transmission. If the STAs are destination STAs, they may transmit an uplink MU-MIMO PPDU to the AP during a time period given/indicated by the uplink MU-MIMO Poll frame. The transmission times of the uplink MU-MIMO PPDU for the STAs may be different, given that their respective transmission times do not exceed the time given/indicated by the uplink MU-MIMO Poll frame. In an aspect of such a case, MAC padding is not necessary for an uplink MU-MIMO PPDU transmission and only PHY padding is utilized (e.g., to fill a last OFDM symbol with bits at the PHY layer).

In an aspect, the AP, which has transmitted the uplink MU-MIMO Poll frame, may activate an uplink MU-MIMO Poll timer as an error recovery procedure for an uplink MU-MIMO Poll procedure. If a PHY-RXSTART indication primitive is not invoked during an uplink MU-MIMO Poll timeout after transmission of the uplink MU-MIMO Poll frame, the AP may perform a recovery procedure, since an error may have occurred in the uplink MU-MIMO Poll procedure. On the other hand, if the PHY-RXSTART indication primitive is invoked, the AP may consider (e.g., assume) that at least one of the STAs requested for uplink MU-MIMO PPDU transmission has started to transmit an uplink MU-MIMO PPDU. In the situation that different uplink MU-MIMO PPDU transmission times are set for different STAs, the AP may use the invocation of the PHY-RXEND indication primitive in determining termination of the uplink MU-MIMO PPDU transmission. The AP may then transmit a Block ACK to the STAs in response to the received uplink MU-MIMO PPDU after an SIFS from the invocation time of the PHY-RXEND indication primitive. The PHY-RXSTART indication primitive and PHY-RXEND indication primitive are described later in the present disclosure.

during an uplink MU-MIMO Poll timeout after transmitting an uplink MU-MIMO Poll frame. After the uplink MU-MIMO Poll timeout, the AP may determine the clear channel assessment (CCA) state of a channel during a PIFS. If the channel is idle, the AP may transmit an uplink MU-MIMO Poll frame again to the STAs.

In an aspect, the partial association identifier (AID) is a non-unique STA identifier that may be defined as shown in the table below. The partial AID may be carried in the TXVECTOR parameter PARTIAL_AID of an HEW single user (SU) PPDU. In an aspect, the partial AID may be limited to 9 bits. For instance, the partial AID may include a portion (e.g., 9 bits) of a basic service set identifier (BSSID) or a portion of a receiver address (RA).

| Condition | GROUP_ID | PARTIAL_AID |
| --- | --- | --- |
| Addressed to AP | 0 | BSSID[39:47] |
| Addressed to Mesh STA | 0 | RA[39:47] |
| Sent by an AP and addressed to a STA associated with that AP or Sent by a DLS or TDLS STA in a direct path to a DLS or TDLS peer STA | 63 | (dec(AID[0:8]) + dec(BSSID[44:47] XOR BSSID[40:43]) × $2^5$)mod$2^9$ where XOR is a bitwise exclusive OR operation mod X indicates the X-modulo operation dec(A[b:c]) is the cast to decimal operator where b is scaled by $2^0$ and c by $2^{c-b}$ |
| Otherwise (see NOTE) | 63 | 0 |

Figure 24:
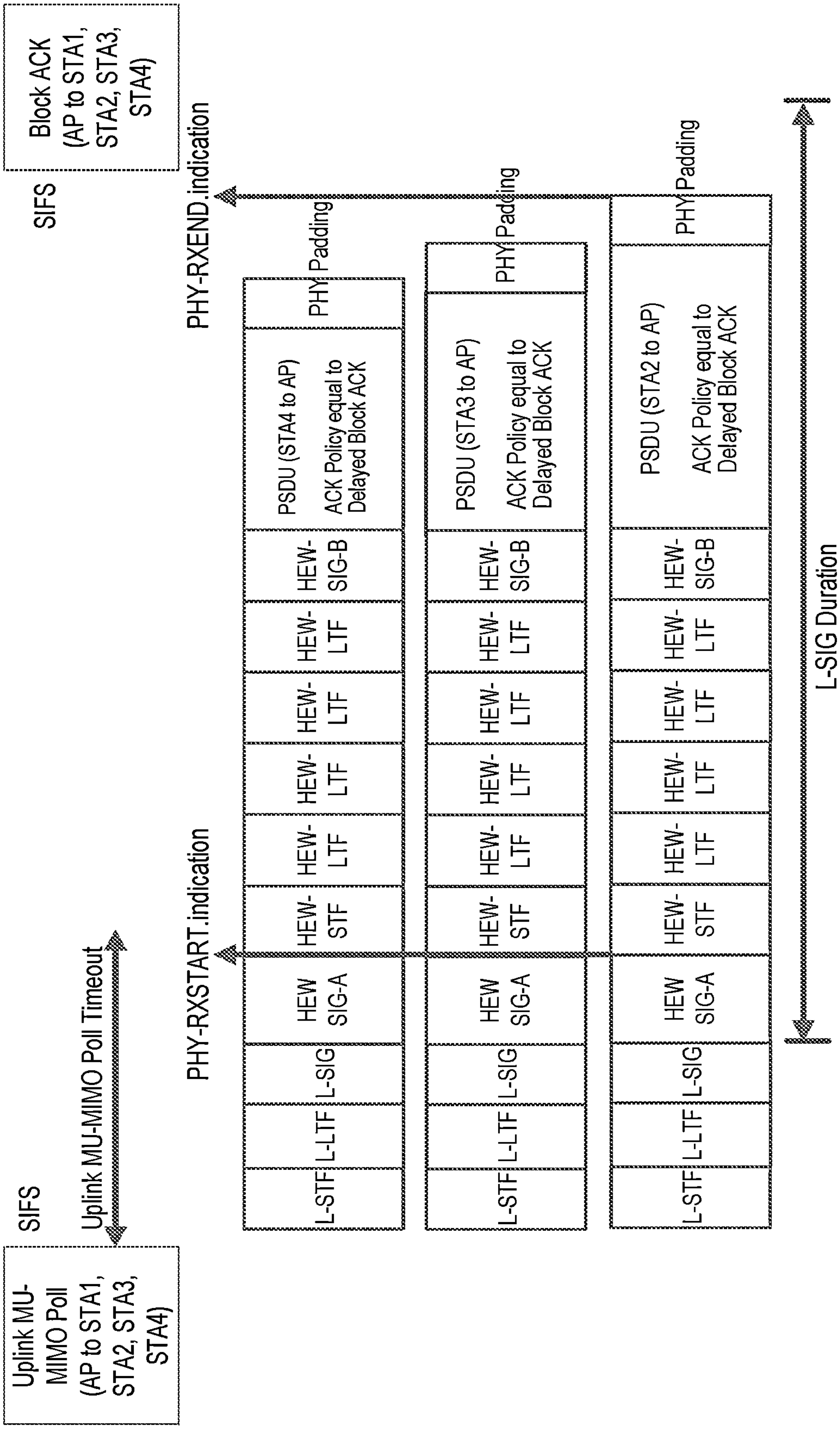
FIG. 24 illustrates an example of a frame exchange sequence between an access point and multiple stations in accordance with embodiments of the present invention.

NOTE
The last row covers the following cases:
A PPDU sent by an IBSS STA
A PPDU sent by an AP to a non associated ST A
Any other condition not explicitly listed elsewhere in the table FIG. 24 illustrates an example of a frame exchange sequence between an AP and multiple stations. In FIG. 24, the PHY-RXSTART indication primitive and the PHYRX-END indication primitive may be invoked as only one primitive without distinction made between transmitting STAs from the PHY layer to the MAC layer. In some cases, the PHYRXSTART indication primitive and the PHY-RX-END indication primitive may be individually invoked for individual uplink MU-MIMO PPDUs transmitted by the STAs, depending on implementation. In these cases, the time at which the PHY-RXEND indication primitive may be invoked from all STAs of the uplink MU-MIMO PPDU (that the AP is receiving during determination of the completion of the uplink MU-MIMO PPDU transmission) becomes the ending time of the transmission and the uplink MU-MIMO PPDU reception.

In an aspect, if each STA has a different uplink MU-MIMO PPDU transmission time, neither the STAs requested for the uplink MU-MIMO PPDU transmission (e.g., via the uplink MU-MIMO Poll frame) nor the AP have prior knowledge about when the uplink MU-MIMO PPDU is completely transmitted. In such an aspect, each STA does not expect any immediate control response after transmitting an uplink MU-MIMO PPDU, and a timer and timeout procedure for a control response frame are not defined. As illustrated in FIG. 24, each STA may set the Ack Policy of the uplink MU-MIMO PPDU to Delayed Block ACK, instead of Immediate Block ACK.

Figure 25:
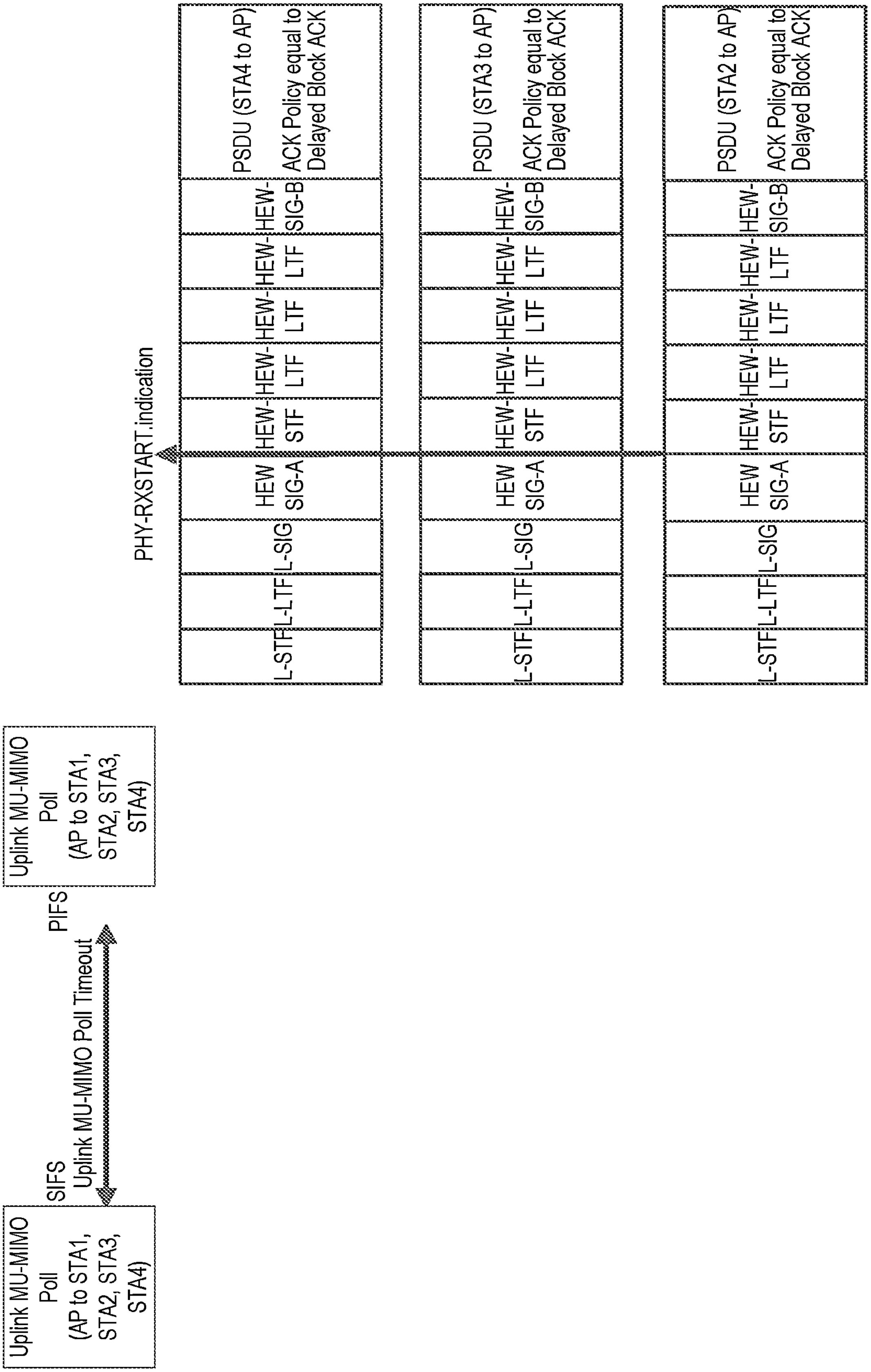
FIG. 25 illustrates an example of a recovery procedure of an uplink MU-MIMO Poll procedure in accordance with embodiments of the present invention.

FIG. 25 illustrates an example of a recovery procedure of the uplink MU-MIMO Poll procedure. In an aspect, in FIG. 25, the PHY-RXSTART indication primitive is not invoked In an aspect, a STA transmitting an HEW SU PPDU carrying one or more group addressed MPDUs or transmitting an HEW non-data packet (NDP) intended for multiple recipients shall set the TXVECTOR parameters GROUP_ID to 63 and PARTIAL_AID to 0. In an aspect, a STA transmitting an HEW SU PPDU carrying one or more individually addressed MPDUs or an HEW NDP intended for a single recipient sets the TXVECTOR parameters GROUP_ID and PARTIAL AID associated with a group ID and a partial AID, respectively, as shown in the table above.

In an aspect, in the above table:

AID[b:c] represents bits b to c inclusive of the AID of the recipient STA with bit 0 being the first transmitted.

BSSID[b:c] represents bits b to c inclusive of the BSSID, with bit 0 being the Individual/Group bit. In this representation, the Individual/Group bit is BSSID[0] and BSSID[47] is the last transmitted bit.

RA[b:c] represents bits b to c inclusive of the RA field, with bit 0 being the Individual/Group bit. In this representation, the Individual/Group bit is RA[0] and RA[47] is the last transmitted bit.

In an aspect, a STA shall include the values computed in the above table in the PHYCONFIG_VECTOR parameters PARTIAL_AID_LIST_GID00 and PARTIAL AID_LIST_GID63. In an aspect, a STA that transmits an HEW PPDU to a direct link setup (DLS) or tunneled direct link setup (TDLS) peer STA obtains the AID for the peer STA from the DLS Setup Request, DLS Setup Response, TDLS Setup Request, or TDLS Setup Response frame.

In an aspect, an AP should not assign an AID to a STA that results in a 0 value PARTIAL_AID. In an aspect, a STA transmitting an HEW MU PPDU sets the TXVECTOR parameter GROUP_ID as described in the following procedure.

In an aspect, a value in the Group ID field in HEW-SIG-B in the range 1 to 62 indicates a HEW MU PPDU. Prior to transmitting an HEW MU PPDU, group assignments have been established by the AP for DL-MU-MIMO capable STAs using the Group ID Management frame. An example of a Group ID Management frame format is provided in the table below:

| Order | Information |
|---|---|
| 1 | Category |
| 2 | VHT Action |
| 3 | Membership Status Array (See Membership status Array field) |
| 4 | User Position Array (See User Position Array field) |

Figure 26:
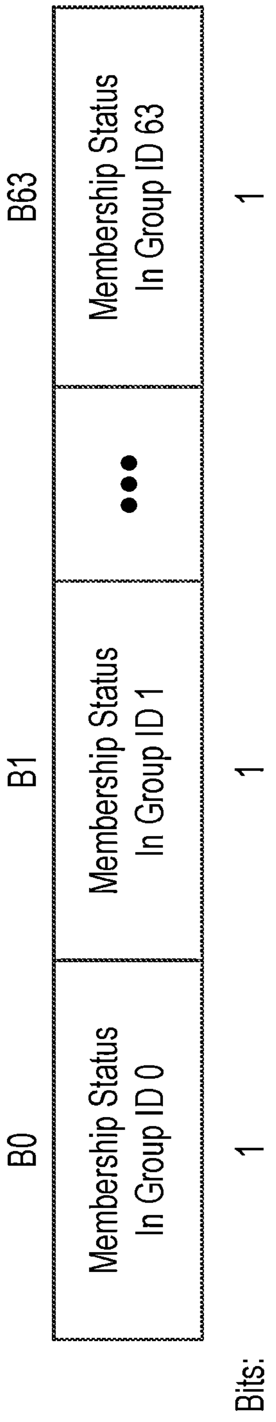
FIG. 26 illustrates an example of a Membership Status Array field format in accordance with embodiments of the present invention.

FIG. 26 illustrates an example of a Membership Status Array field format. In an aspect, the Membership Status Array field may be formed of 8 octets. Within the Membership Status Array field, a 1-bit Membership Status sub-field for each group ID is set as follows:

Set to 0 if the STA is not a member of the group;

Set to 1 if the STA is a member of the group.

Figure 27:
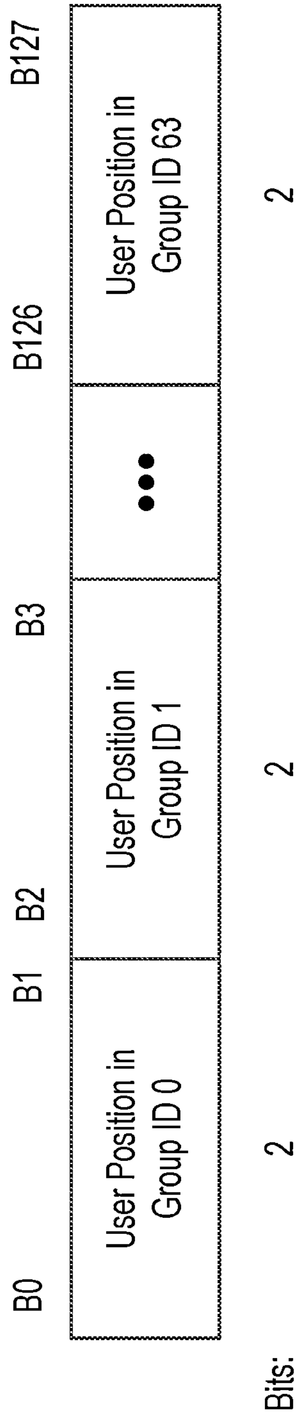
FIG. 27 illustrates an example of a User Position Array field format in accordance with embodiments of the present invention.

FIG. 27 illustrates an example of a User Position Array field format. In an aspect, the User Position Array field may be formed of 16 octets. The User Position Array field may be indexed by a group ID. The User Position Array field (indexed by the group ID) may include a 2-bit User Position sub-field for each of 64 group IDs. In some cases, after a STA's MAC layer management entity (MLME) is configured using the PHYCONFIG_VECTOR parameter GROUP ID_MANAGEMENT, the following lookup tables may be populated:

a) group ID to Membership Status, denoted by MembershipStatusinGroupID[g] for 1<=g<=62;

b) group ID to User Position, denoted by UserPositioninGroupID[g] for 1<=g<=62.

In an aspect, when a STA receives an HEW MU PPDU where the Group ID field in the HEW-SIG-B field has a value k and where MembershipStatusinGroupID[k] is equal to 1, the number of space-time streams for that STA may be indicated m the MU[UserPositioninGroupID[k]] NSTS field in the HEW-SIG-B field. The space-time streams of different users may be ordered in accordance with user position values (e.g., the space-time streams for the user in user position 0 come first, followed by the space-time streams for the user in position 1, followed by the space-time streams for the user in position 2, followed by the space-time streams for the user in position 3, etc.).

In an aspect, a STA may be able to identify the space-time streams intended for other STAs that act as interference. For instance, HEW-LTF symbols in the HEW MU PPDU may be used to measure the channel for the space-time streams intended for the STA and can also be used to measure the channel for the interfering space-time streams. To successfully demodulate the space-time streams intended for the STA, the STA may use the channel state information for all space-time streams to reduce the effect of interfering space-time streams. In some cases, if a STA determines that it is not a member of the group, or the STA is a member of the group but the corresponding MU NSTS field in the HEW-SIG-B field indicates that there are zero space-time streams for the STA in the PPDU, the STA may elect to not process the remainder of the PPDU.

Figure 28:
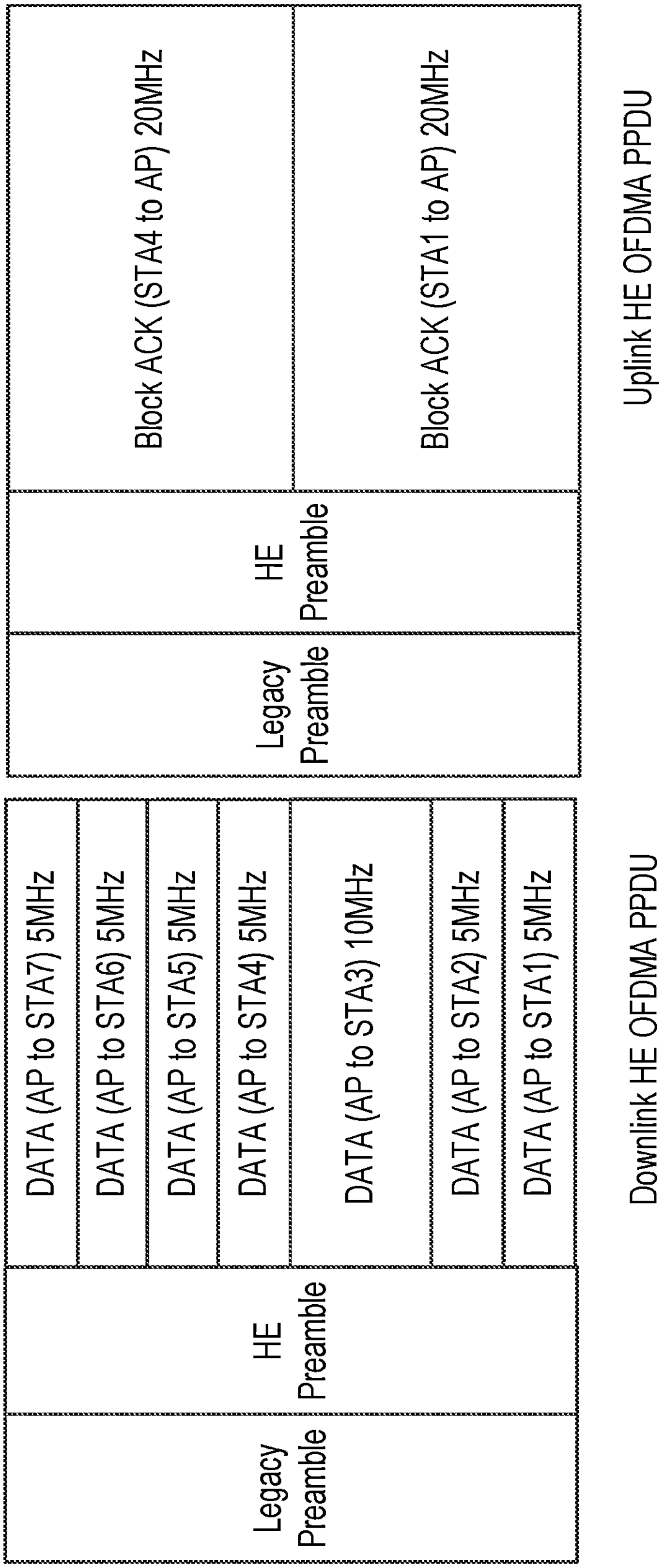
FIGS. 28 and 29 illustrate examples of a frame exchange sequence between an access point and multiple stations in accordance with embodiments of the present invention.

FIG. 28 illustrates an example of a frame exchange sequence between an AP and multiple stations. In an aspect, the downlink (DL) and uplink (UL) frame exchange sequence may be performed using an OFDMA mechanism.

First, the AP may transmit a DL OFDMA PPDU in an HE PPDU format, denoted as Downlink HE OFDMA PPDU in FIG. 28. The HE PPDU format is composed of the legacy preamble (e.g., using 64 FFT over 20 MHz channel), the HE preamble (e.g., using 256 FFT over 20 MHz channel) and the PSDU. The PSDU of the DL HE OFDMA PPDU has DATA (e.g., HE-DATA fields) for multiple STAs, including STA1, STA2, STA3, STA4, STA5, STA6, and STA7. The AP may transmit the DATA to these stations through sub-channels of 5 MHz, 5 MHz, 10 MHz, 5 MHz, 5 MHz, 5 MHz, and 5 MHz, respectively. After the SIFS from receiving the DL HE OFDMA PPDU, STA1 and STA4 may transmit control response frames with (e.g., as part of) the UL OFDMA PPDU in the HE PPDU format, denoted as Uplink HE OFDMA PPDU in FIG. 28.

Figure 29:
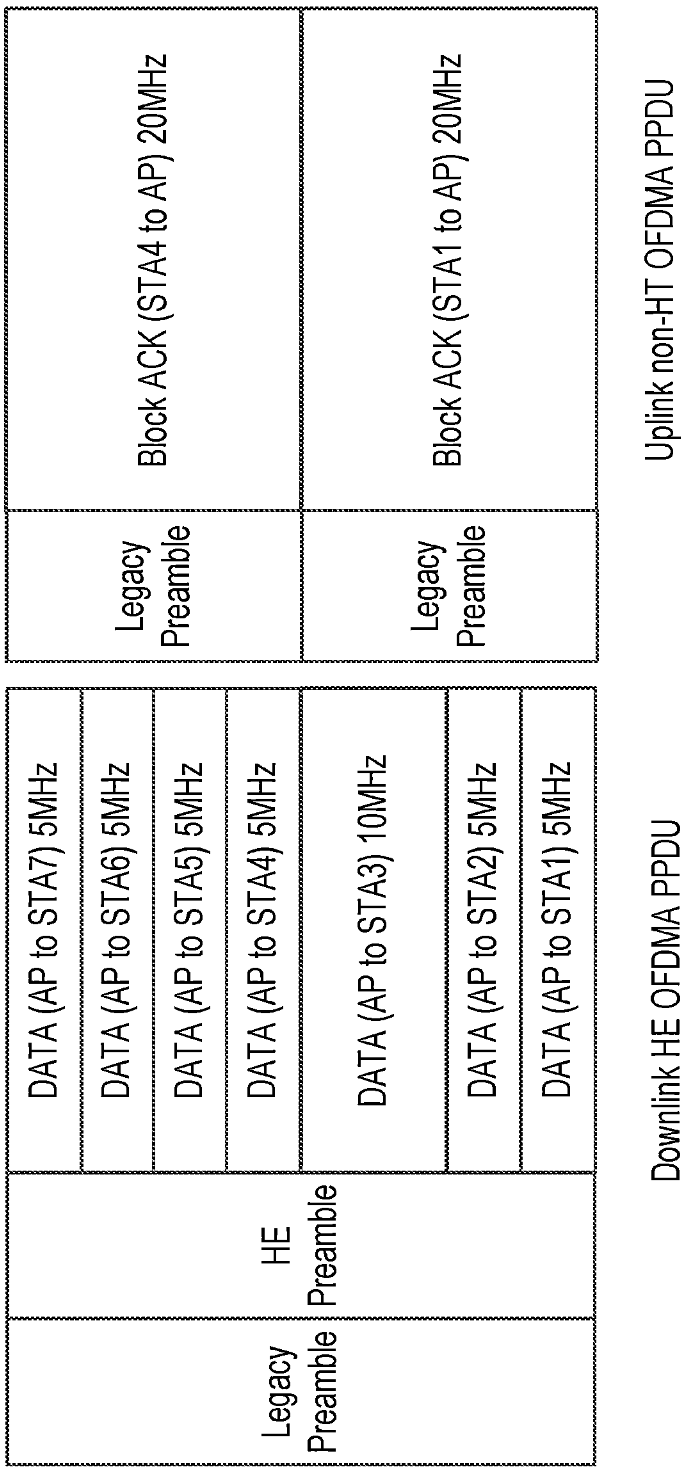

FIG. 29 illustrates another example of a frame exchange sequence between an AP and multiple stations. The description from FIG. 28 generally applies to FIG. 29, with examples of differences between FIG. 28 and FIG. 29 and other description provided herein for purposes of clarity and simplicity. In an aspect, the downlink (DL) and uplink (UL) frame exchange sequence may be performed using an OFDMA mechanism. In an aspect, after the SIFS from receiving the DL OFDMA PPDU, STA1 and STA4 may transmit control response frames with UL OFDMA PPDU in a non-HT PPDU format.

In an aspect, the control response frames transmitted in the UL OFDMA and UL MU-MIMO may use the same PPDU format (e.g., HE PPDU format or non-HT PPDU format). In some cases, a control response frame may be carried in an HE PPDU format as shown in FIG. 28 if an eliciting frame carried in the HE PPDU format contains sub-channel assignment information for each control response frame. In other cases, a control response frame may be carried in a non-HT PPDU format as shown in FIG. 29. In an aspect, the AP can explicitly indicate the PPDU type (e.g., HE PPDU format and non-HT PPDU format) of the control response frame in the frame eliciting response.

A first way to indicate the PPDU type may be to include that information in the High Efficiency (HE) Control field in the MAC header. A second way to indicate the PPDU type may be to include that information in the SIG field in the PHY header. The recipient STAs of the DL OFDMA PPDU containing the PPDU type information of the control response frame may transmit the control response frame in the PPDU format specified by the PPDU type information explicitly signaled in the DL OFDMA PPDU. It is noted that the other STAs that support the OFDM PPDU (e.g., IEEE 802.11a/g/n/ac/ax STA) and receive the control response frame carried in the non-HT PPDU format can update their respective Network Allocation Vector (NAV).

In an aspect, the control response frames transmitted in the UL OFDMA and UL MU-MIMO shall have the transmitter address (TA) field for clarifying the transmitting STA of the control response frames. In that sense, an HE acknowledgement (ACK) frame or a Block Ack frame may be used on behalf of (e.g., in place of) an ACK frame. In an aspect, when a control response frame is an A-MPDU format transmitted in the UL OFDMA and UL MU-MIMO, the A-MPDU shall carry at least one MPDU containing the TA field.

Figures 30, 31:
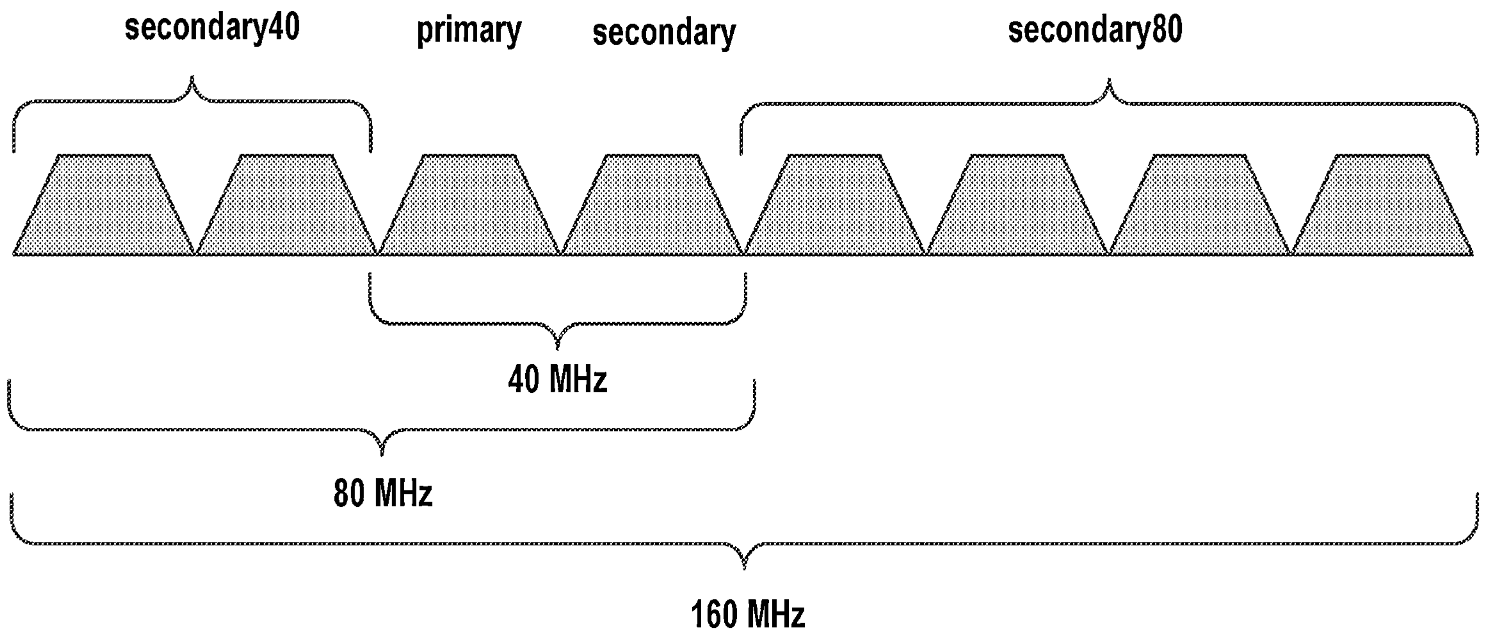
FIG. 30 illustrates an example of an HE acknowledgement (ACK) frame in accordance with embodiments of the present invention.
FIG. 31 illustrates an example of a channel list parameter for a 40 MHz, 80 MHz, and 160 MHz channel width in accordance with embodiments of the present invention.

FIG. 30 illustrates an example of an HE acknowledgement (ACK) frame. The HE ACK frame may be 20 octets.

The HE ACK frame may include a frame control field, a duration field, a receiver address (RA) field, a transmitter address (TA) field, and a frame check sequence (FCS) field.

In an aspect, regarding a TXVECTOR parameter of a control response frame transmitted in the UL OFDMA and UL MU-MIMO, a STA shall set the TXVECTOR parameter GI_TYPE of a control response frame carried in the HE PPDU format to the RXVECTOR parameter GI_TYPE of a frame eliciting the response. Additionally, the STA shall set the TXVECTOR parameter GI_TYPE of a control response frame carried in the non-HT PPDU format to the LONG_GI (0.8 μs).

While receiving control response frames transmitted in a UL OFDMA PPDU or a UL MU-MIMO PPDU, the AP may transfer a payload (e.g., DATA, HE-DATA) from a PHY to a local MAC entity with the below PHY-DATA indication primitive. The primitive provides the following parameters:

```
PHY-DATA indication(
   DATA
   USER INDEX
)
```

In an aspect, the DATA parameter may be an octet of value X'00' to X'FF'. In an aspect, the USER_INDEX parameter (typically identified as u for an HEW STA) may be present for a UL OFDMA PPDU or a UL MU-MIMO PPDU and may indicate the index of the user in the RXVECTOR to which the accompanying DATA octet applies. Otherwise, this parameter is not present.

The PHY-DATA indication primitive may be generated by a receiving PHY entity to transfer the received octet of data to the local MAC entity. The time between receipt of the last bit of the last provided octet from the wireless medium (WM) and the receipt of this primitive by the MAC entity is a RxPHYDelay. In an aspect, the effect of receipt of this primitive by the MAC is unspecified.

In an aspect, the AP may determine a transmission failure of a DL OFDMA PPDU as follows:

After transmitting one or more MPDUs (e.g., A-MPDUs or HE single MPDUs as part of a DL OFDMA PPDU) that require one or more immediate response frames from one or more STAs, the AP shall wait for a timeout interval of duration of a SIFSTime+a SlotTime+a RxPHYStartDelay, starting at the PHY-TXEND confirm primitive. If a PHYRXSTART indication primitive does not occur during the timeout interval, the AP may conclude that the transmission of the DL OFDMA PPDU has failed.

If a PHY-RXSTART indication primitive does occur during the timeout interval, the AP shall wait for the corresponding PHY-RXEND indication primitive to recognize one or more valid response frames sent by the one or more recipient STAs of the DL OFDMA PPDU requiring one or more response frames. The recognitions of the transmission failures of the DL OFDMA PPDU addressed to one or more recipient STAs are individually determined for each recipient STA requiring an individual immediate response frame. The transmission failure event of receiving no valid response frames from one or more primary recipient STAs may be interpreted as a failure of the DL OFDMA PPDU. The AP should invoke a back-off procedure after the failure of the DL OFDMA PPDU.

In an aspect, a primary recipient STA is a recipient STA of which the control response frame occupies a primary channel. In an aspect, a non-primary recipient STA is a recipient STA of which the control response frame occupies a non-primary channel.

Even if a valid response frame is received from a non-primary recipient STA, the transmission of the DL OFDMA PPDU may be interpreted as a failure if the AP receives no valid response frame from a primary recipient STA In an aspect, an aggregate medium access control (MAC) protocol data unit (A-MPDU) may be, or may be defined as, a structure that contains one or more MPDUs and is transported by a physical layer (PHY) as a single PHY service data unit (PSDU).

In an aspect, a high efficiency (HE) single medium access control (MAC) protocol data unit (HE single MPDU) may be, or may be defined as, an MPDU that is the only MPDU in an aggregate MPDU (A-MPDU) carried in an HE physical layer (PHY) protocol data unit (PPDU) and that is carried in an A-MPDU subframe with the end of frame (EOF) sub-field of the MPDU delimiter field equal to 1. In an aspect, the A-MPDU may include a data frame and a control frame (e.g., trigger frame). In an aspect, the A-MPDU may include a trigger frame and any single MPDU.

In an aspect, a PHY-TXEND confirm primitive is described as follows. This primitive may be issued by the PHY to the local MAC entity to confirm the completion of a transmission. In an aspect, this primitive may be issued by the PHY to the MAC entity when the symbol containing the last data octet has been transferred and any Signal Extension has expired. In an aspect, the receipt of this primitive by the MAC entity may provide the time reference for the contention backoff protocol. In an aspect, this primitive does not have any parameters.

In an aspect, the PHYRXSTART indication primitive is described as follows. This primitive may be an indication by the PHY to the local MAC entity that the PHY has received a valid start of a PPDU, including a valid PHY header. The primitive may provide the following parameter:

```
PHY-RXSTART .indication(
   RXVECTOR
)
```

In an aspect, the RXVECTOR represents a list of parameters that the PHY provides the local MAC entity upon receipt of a valid PHY header or upon receipt of the last PSDU data bit in the received frame.

This primitive may be generated by the local PHY entity to the MAC sublayer when the PHY has successfully validated the PHY header at the start of a new PPDU. After generating a PHY-RXSTART indication primitive, the PHY may be expected to maintain physical medium busy status during the period required by that PHY to transfer a frame of an indicated LENGTH at an indicated DATARATE. In an aspect, this physical medium busy condition should be maintained even if a PHY-RXEND indication (CarrierLost) primitive or a PHYRXEND indication (FormatViolation) primitive is generated by the PHY prior to the end of this period.

In an aspect, the PHY-RXEND indication primitive is described as follows. The PHYRXEND indication may be an indication by the PHY to the local MAC entity that the PSDU currently being received is complete. The primitive may provide the following parameters:

```
PHY-RXEND.indication(
   RXERROR,
   RXVECTOR
   )
```

In an aspect, the RXERROR parameter can convey one or more of the following values: NoError, FormatViolation, CarrierLost, or UnsupportedRate. In some cases, a number of error conditions may occur after the PHY's receive state machine has detected what appears to be a valid preamble and state frame delimiter (SFD). The following describes the parameter returned for each of those error conditions:

- NoError. This value may be used to indicate that no error occurred during the receive process in the PHY.
- FormatViolation. This value may be used to indicate that the format of the received PPDU was in error.
- Carrier Lost. This value may be used to indicate that during the reception of the incoming PSDU, the carrier was lost and no further processing of the PSDU can be accomplished.
- UnsupportedRate. This value may be used to indicate that during the reception of the incoming PPDU, a non-supported date rate was detected.
- Filtered. This value may be used to indicate that during the reception of the PPDU, the PPDU was filtered out due to a condition set in the PHYCONFIG VECTOR.

In an aspect, the RXVECTOR may represent a list of parameters that the PHY provides the local MAC entity upon receipt of a valid PHY header or upon receipt of the last PSDU data bit in the received frame.

In an aspect, the PHY-RXEND indication primitive may be generated by the PHY for the local MAC entity to indicate that the received state machine has completed a reception with or without errors. When a Signal Extension is present, the primitive may be generated at the end of the Signal Extension. In the case of an RXERROR value of NoError, the MAC may use the PHYRXEND indication primitive as reference for channel access timing.

In an aspect, the PHY-RXSTART indication primitive and the PHYRXEND indication primitive may be invoked individually for individual uplink MU-MIMO PPDUs transmitted by STAs depending on implementation. In this case, when the PHYRXEND indication primitive is invoked from all STAs of the uplink MU-MIMO PPDUs that the AP is receiving, the AP may transmit a Block ACK to the STAs only when an RXERROR parameter of an uplink MU-MIMO PPDU received from at least one STA is set to NoError. In an aspect, the effect of receipt of this primitive is for the MAC to begin inter-frame space processing.

FIG. 31 illustrates an example of a channel list parameter for a 40 MHz, 80 MHz, and 160 MHz channel width. In an aspect, a WLAN system may support a single channel having a bandwidth of 20 MHz as a basic service set (BSS) operating channel. The WLAN system may also support a BSS operating channel having a bandwidth of 40 MHz, 80 MHz, or 160 MHz by bonding a plurality of contiguous 20-MHz channels. Further, the WLAN system may support a BSS operating channel having a bandwidth of 160 MHZ, including non-contiguous 80-MHz channels (e.g., 80+80 MHz) not shown in FIG. 31.

As shown in FIG. 31, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80 MHz channel and a secondary 80-MHz channel which are contiguous.

A primary channel may be defined as a common channel of operation for all stations (STAs) that are members of the BSS. The primary channel may be used for transmission of a basic signal such as a beacon. The primary channel may also be a basic channel used for transmission of a data unit (e.g., a PPDU). If a STA uses a channel width larger than the channel width of the primary channel, for data transmission, the STA may use another channel within a corresponding channel, in addition to the primary channel. This additional channel is referred to as a secondary channel.

In an aspect, in a UL OFDMA and a UL MU-MIMO, a STA may need to respond to an AP uplink start indication with a timing accuracy on the order of 100 ns. In addition, the STA may need to correct uplink transmissions for frequency offset relative to the AP. For this purpose, the eliciting frame of a UL OFDMA and a UL MU-MIMO may be used as the reference frame. For example, in an aspect, in FIG. 28 and FIG. 29, because a Downlink HE OFDMA PPDU elicited the control response frames carried in the Uplink HE OFDMA PPDU, the Downlink HE OFDMA PPDU may be used as a reference frame for compensating the frequency offset relative to the AP. After receiving the Downlink HE OFDMA PPDU, the STAs (e.g., STA1 and STA4) transmitting an elicited control response frame may adjust their frequency offset such that their adjusted frequency offset is identical (or substantially identical) with the frequency offset of the received Downlink HE OFDMA PPDU. In that sense, the STA may measure the frequency offset of the received frame and store the measured frequency offset in a dot 1HighEfficiencyFrequencyOffset MIB variable.

In an aspect, an enhancement of the accuracy of the frequency offset compensation may allow enhancement of UL OFDMA and/or UL MU-MIMO performance. For example, when a UL OFDMA or a UL MU-MIMO PPDU is transmitted in 256 FFT, the reference frame should be transmitted in 256 FFT. Otherwise, if a UL OFDMA or a UL MU-MIMO PPDU compensates its frequency offset from a more coarse granularity signal transmitted in 64 FFT, the frequency offset difference between multiple uplink transmissions may adversely affect performance.

Figure 32:
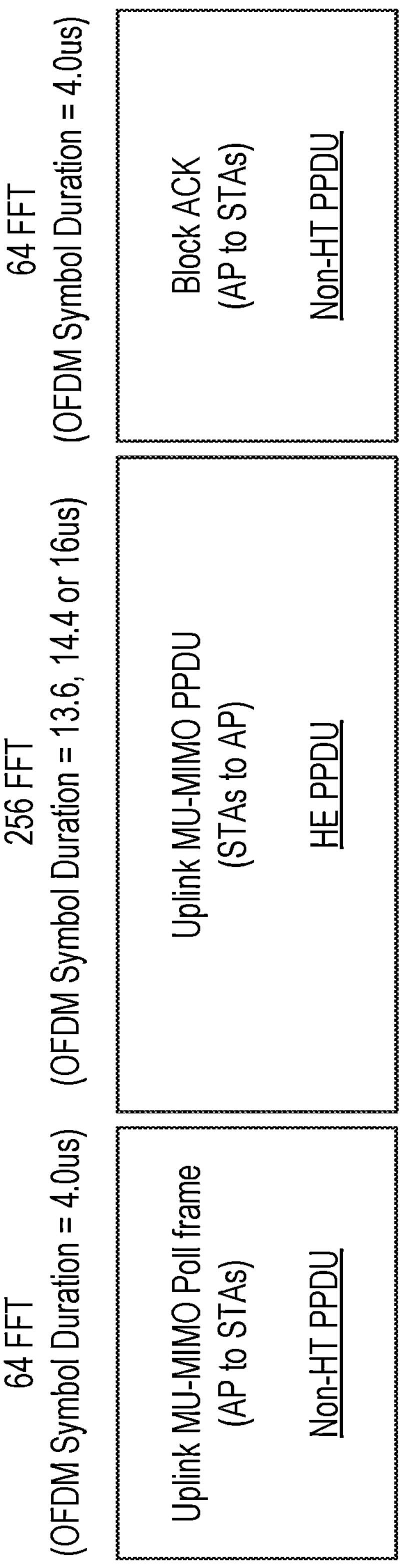
FIGS. 32, 33, and 34 illustrate examples of a frame exchange sequence between an access point and multiple stations in accordance with embodiments of the present invention.

In an aspect, a UL OFDMA and/or a UL MU-MIMO can be initiated by receiving a polling frame from the AP. FIG. 32 illustrates an example of an exchange of frames between an AP and multiple stations. In an aspect, the exchange of frames may be associated with a UL MU polling procedure.

First, the AP may transmit an uplink MU-MIMO Poll frame to one or more granted STAs of uplink MU-MIMO PPDU transmissions. The uplink MU-MIMO Poll frame may be (and, in FIG. 32, is denoted as) a non-HT PPDU. The granted STAs may be included in an Uplink Multi-User Polled STA field of the uplink MU-MIMO Poll frame. After receiving the uplink MU-MIMO Poll frame, the granted STAs may transmit uplink MU-MIMO PPDUs at an SIFS after receiving the uplink MU-MIMO Poll frame. As shown in FIG. 32, the uplink MU-MIMO PPDUs are, or are included as part of, a HE PPDU. Then, the AP may transmit a Block ACK frame containing an acknowledgement status of the uplink MU-MIMO PPDUs transmitted from the granted STAs. In an aspect, the uplink MU-MIMO Poll frame, uplink MU-MIMO PPDUs, and Block ACK frame may be transmitted in 64 FFT, 256 FFT, and 64 FFT, respectively.

As previously mentioned, in an aspect, an enhancement of the accuracy of the frequency offset compensation may allow enhancement of UL OFDMA and/or UL MU-MIMO performance. In FIG. 32, the UL MU-MIMO PPDUs is transmitted in 256 FFT but the uplink MU-MIMO Poll frame (which can be considered a reference frame) is transmitted in 64 FFT. In such a case, a frequency offset inaccuracy may adversely affect performance.

Figure 33:
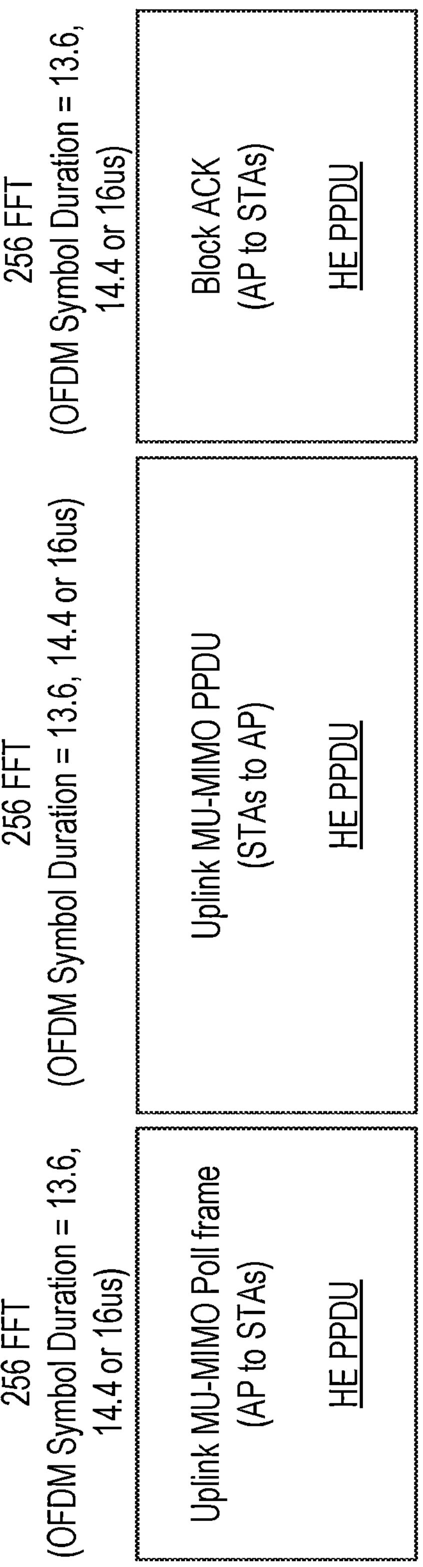

In an aspect, 256 FFT may be utilized for the reference signal. FIG. 33 illustrates an example of an exchange of frames between an AP and multiple stations. The description from FIG. 32 generally applies to FIG. 33, with examples of differences between FIG. 32 and FIG. 33 and other description provided herein for purposes of clarity and simplicity.

First, the AP may transmit an uplink MU-MIMO Poll frame to one or more granted STAs of uplink MU-MIMO PPDU transmissions. Rather than a non-HT PPDU of 64 FFT, a HE PPDU of 256 FFT may be used for the uplink MU-MIMO Poll frame. After receiving the uplink MU-MIMO Poll frame, the granted STAs may transmit uplink MU-MIMO PPDUs at an SIFS after receiving the uplink MU-MIMO Poll frame. Because the uplink MU-MIMO Poll frame transmitted in 256 FFT (e.g., a finer granularity signal compared to being transmitted in 64 FFT) is used as the reference signal, the performance of the uplink MU-MIMO can be enhanced. Then, the AP may transmit a Block ACK frame containing an acknowledgement status of the uplink MU-MIMO PPDUs transmitted from the granted STAs. In an aspect, the Block ACK frame may be (and, in FIG. 33, is denoted as) an HE PPDU.

In an aspect, by using 256 FFT for the reference signal, the performance of the uplink MU-MIMO can be enhanced. An issue may be that a legacy STA cannot decode the reference signal that is an uplink MU-MIMO Poll frame when the uplink MU-MIMO Poll frame is transmitted in 256 FFT. In such a case, protection performance may be degraded because the legacy STA cannot set the NAV for the follow-up uplink MU-MIMO PPDU.

Figure 34:
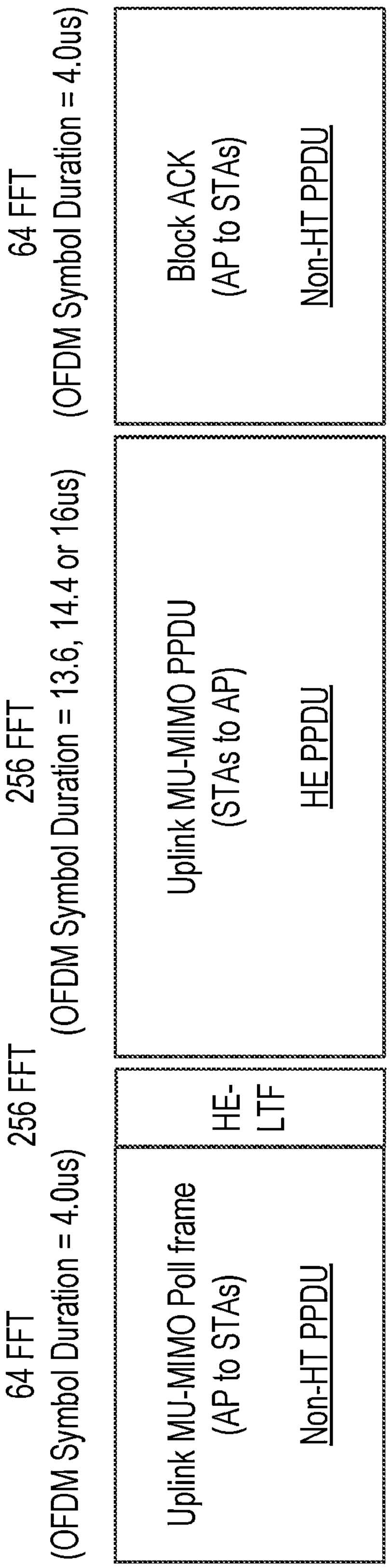

In an aspect, a manner by which to address this issue may be to use a non-HT PPDU of 64 FFT for the reference signal. In order to provide finer granularity for the frequency offset compensation, an additional signal of 256 FFT can be appended after the non-HT PPDU reference signal. FIG. 34 illustrates an example of an exchange of frames between an AP and multiple stations. The description from FIG. 32 generally applies to FIG. 34, with examples of differences between FIG. 32 and FIG. 34 and other description provided herein for purposes of clarity and simplicity.

First, the AP may transmit an uplink MU-MIMO Poll frame to one or more granted STAs of uplink MU-MIMO PPDU transmissions. The uplink MU-MIMO Poll frame may be a non-HT PPDU of 64 FFT and may be used for the reference signal. In order to enhance granularity of the frequency offset compensation, an additional signal of 256 FFT is appended after (e.g., immediately after) the non-HT PPDU. In FIG. 34, the additional signal is an HE-LTF field. After receiving the uplink MU-MIMO Poll frame, the granted STAs may transmit uplink MU-MIMO PPDUs SIFS (e.g., at the end of SIFS) after receiving the uplink MU-MIMO Poll frame. In an aspect, because the finer granularity signal transmitted in 256 FFT is appended to the reference signal, the performance of the uplink MU-MIMO can be enhanced by compensating the frequency offset based on the appended signal of 256 FFT. Also, because the legacy STA can decode the reference signal, the protection performance can be enhanced. Then, the AP may transmit a Block ACK frame containing an acknowledgement status of the uplink MU-MIMO PPDUs transmitted from the granted STAs. The uplink MU-MIMO Poll frame may be (and, in FIG. 34, is denoted as) a non-HT PPDU. In an aspect, the Block ACK frame may be transmitted in 64 FFT.

In an aspect, an uplink MU-MIMO Poll frame may contain a list of granted STAs, a list of a number of space-time streams, and a list of frequency allocations for uplink MU-MIMO PPDU transmissions. The uplink MU-MIMO Poll frame may also contain Traffic Identifier (TID) and/or Access Category (AC) information for uplink MU-MIMO PPDU transmissions. In some aspects, the ACs may include a voice (VO) access category, a video (VI) access category, a best effort (BE) access category, and a background (BK) access category, denoted as AC-VO, AC-VI, AC-BE, and AC-BK, respectively. In an aspect, the ACs may be in order of priority, from highest to lowest priority: AC-VO, AC-VI, AC-BE, and AC-BK. In an aspect, when the TID or AC information for uplink MU-MIMO PPDU transmissions is not contained in the uplink MU-MIMO Poll frame, any MSDU, regardless of its TID or AC, can be transmitted in the uplink MU-MIMO PPDU. Otherwise, in this aspect, when the TID and/or AC information is contained, only MSDUs matched with the TID and/or AC specified in the uplink MU-MIMO Poll frame can be transmitted in the uplink MU-MIMO PPDU.

After receiving the uplink MU-MIMO PPDU(s) transmitted from the granted STA(s), the AP may transmit a Block ACK frame containing an acknowledgement status of the corresponding uplink MU-MIMO PPDU(s).

Figure 35:
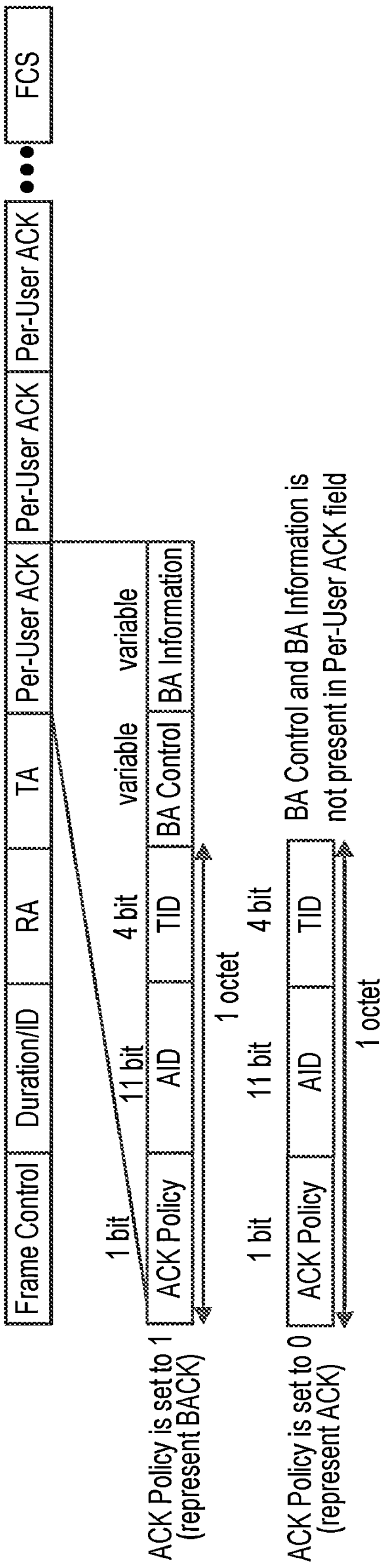
FIG. 35 illustrates an example of a block acknowledgement (Block ACK or BA) frame in accordance with embodiments of the present invention.

FIG. 35 illustrates an example of a Block ACK (BA) frame format. In an aspect, the Block ACK frame may be transmitted by the AP in a DL MU PPDU (e.g., as a broadcast frame) in response to received uplink MU-MIMO PPDU(s) from the granted STAs. The Block ACK frame may include a frame control field, a duration/ID field, an RA field, a TA field, a Per-User ACK fields, and an FCS field. In FIG. 35, a first, second, and third Per-User ACK field may be for STA1, STA2, and STA3, respectively. In an aspect, a Per-User ACK field may be referred to as a Per Station Information (Per STA Info) field. It is noted that the ellipses between the third Per-User ACK field and the FCS field indicate that one or more additional Per-User ACK fields or no Per-User ACK field are present between the third Per-User ACK field and the FCS field.

In an aspect, each Per-User ACK field may represent acknowledgement information for a respective AID and TID associated with the received uplink MU-MIMO PPDUs. In this regard, a Per-User ACK field may represent acknowledgement information of an uplink MU-MIMO PPDU (among the uplink MU-MIMO PPDUs from the granted STAs) that is identified with or otherwise associated with the respective AID and TID. In an aspect, the partial AID may indicate a STA's local address.

Each Per-User ACK field may include an Ack Policy sub-field, an AID sub-field, and a TID sub-field. In an aspect, the Ack Policy sub-field, AID sub-field, and TID sub-field may be 1 bit, 11 bits, and 4 bits, respectively. In an aspect, the term sub-field may be referred to as a field, and/or vice versa. In an aspect, the Ack Policy sub-field may be referred to as an Ack Type subfield. In an aspect, the Ack Policy sub-field, AID sub-field, and TID sub-field form a Per AID TID Information (Per AID TID Info) sub-field. Thus, in this aspect, the Per-User ACK field includes the Per AID TID Info sub-field. The AID sub-field in the Per-User ACK field may be set to the AID of the granted STA from which the AP receives the uplink MU-MIMO PPDU. It is noted that in infrastructure BSS operation, the AID sub-field may contain a value assigned by an AP during association. In some cases, the AID sub-field may represent a 16-bit ID of a STA.

In an aspect, the TID sub-field in the Per-User ACK field may be set to the TID or AC of the uplink MU-MIMO PPDU received from the granted STA that is specified in the AID subfield. In some cases, when there is no Block ACK agreement (e.g., Per-User ACK field represents the ACK), the TID sub-field may be reserved (e.g., set) to 0.

In an aspect, when the Ack Policy sub-field of the Per-User ACK field is equal to a first value (e.g., 1), a Block Acknowledgement (BA) Control field and a BA Information field may be present in the Per-User ACK field. In an aspect, when the Ack Policy sub-field is equal to a second value (e.g., 0), the BA Control and BA Information fields are not present in the Per-User ACK field. In an aspect, the BA Control and BA Information sub-fields may have a Block ACK bitmap and Block Ack Starting Sequence Control. In an aspect, the BA Information sub-field includes a Block Ack Starting Sequence Control sub-field and a Block Ack Bitmap sub-field. Thus, in this aspect, when the Ack Policy sub-field is equal to the first value, the Block Ack Starting Sequence Control and Block Ack bitmap are present in the Per-User ACK field, and when the Ack Policy sub-field is equal to the second value, the Block Ack Starting Sequence Control and Block Ack bitmap are not present in the Per-User ACK field. The Ack Policy sub-field being equal to the second value may indicate an ACK of either a single MPDU or all MPDUs carried in the eliciting PPDU that was transmitted by the STA whose AID is indicated in the AID sub-field of the Per-User ACK field. In the foregoing, the first value and second value are 1 and 0, respectively, by way of non-limiting example. In other words, in some aspects, the first value may be 0 and the second value may be 1.

In an aspect, when the TID or AC information for the uplink MU-MIMO PPDU transmissions is contained in the uplink MU-MIMO Poll frame, the TID sub-field in the Per-User ACK field (for acknowledging the uplink MU-MIMO PPDUs) may be set to the same TID or AC information indicated in the uplink MU-MIMO Poll frame. In an aspect, when the TID or AC information for the uplink MU-MIMO PPDU transmissions is not contained in the uplink MU-MIMO Poll frame, the TID sub-field in the Per-User ACK field may be set to the TID or AC of the received uplink MU-MIMO PPDU.

The Per-User ACK fields are listed for each AID. For example, when the AP receives MPDUs having different TIDs from a single granted STA, the Block ACK frame may include multiple Per-User ACK fields for the single granted STA. In such a case, a first instance of the Per-User ACK fields having the same AID may correspond to a lowest TID value, with subsequent instances ordered by increasing value of the TID field.

In an aspect, the AP can determine one or more target poll transmission times (TPTTs). In a TPTT, the AP shall schedule an uplink MU-MIMO Poll frame (or uplink OFDMA Poll frame) transmission. In some cases, a TPTT information element may be included in a beacon frame. In such cases, a STA that receives a beacon frame with a TPTT information element may listen for the uplink MU-MIMO Poll frame (or uplink OFDMA Poll frame) transmitted at the TPTT. In an aspect, an uplink multi-user poll frame may refer to an uplink MU-MIMO Poll frame or an uplink OFDMA Poll frame. In an aspect, description pertaining to an uplink MU-MIMO Poll frame may also apply to an uplink OFDMA Poll frame, and/or vice versa.

In some cases, an uplink MU-MIMO Poll frame (or uplink OFDMA Poll frame) can be used for an anonymous user. In such cases, the uplink MU-MIMO Poll frame (or uplink OFDMA Poll frame) may have an empty list of the granted STAs. In order to choose the group of candidate STAs among anonymous users, the uplink MU-MIMO Poll frame (or uplink OFDMA Poll frame) may have a condition(s) associated with participating in an uplink MU-MIMO transmission or an uplink OFDMA transmission.

In an aspect, each STA performing an enhanced distributed channel access (EDCA) may suspend an operation of its enhanced distributed channel access function (EDCAF) at the TPTT or at a reception time of an uplink MU-MIMO Poll frame (or uplink OFDMA Poll frame), and may store the value of a backoff counter, CW[AC], QSRC[AC], and QLRC[AC]. In an aspect, CW, QSRC, and QLRC denote contention window, QoS long retry counter, and QoS short retry counter, respectively, and their values may be dependent on the access category. At an end of a transmission opportunity (TXOP) controlled by an uplink MU-MIMO Poll frame (or uplink OFDMA Poll frame), the stored backoff function state may be restored and an operation of the EDCAF may be resumed. In an aspect, if the previously stored backoff function state is empty, the EDCAF of a STA may invoke a backoff procedure, even if no additional transmissions are currently queued.

In some aspects, if traffic load is not heavy, after a successful transmission of an uplink MU-MIMO PPDU or an uplink OFDMA PPDU, each STA performing an EDCA access may reset a backoff counter, CW[AC], QSRC[AC], and QLRC[AC] (e.g., on behalf of unchanging its backoff function state). If the traffic load is heavy, after a transmission failure of an uplink MU-MIMO PPDU or an uplink OFDMA PPDU, each STA performing an EDCA access may increment a backoff counter, CW[AC], QSRC[AC], and QLRC[AC], on behalf of unchanging its backoff function state.

In an aspect, when one or more granted STAs transmit uplink MU-MIMO PPDUs, all PSDU transmission time (TXTIME) is identical. For this purpose, MAC padding (e.g., null AMPDU end of frame (EOF) padding) mechanism may be used. In an aspect, MAC padding may refer to support of padding by aggregating 4 octets of null MPDUs in the form of an aggregated MPDU (A-MPDU) at the MAC layer. In some cases, fragmentation of A-MPDU subframe can be used for increasing resource utilization.

Figure 36:
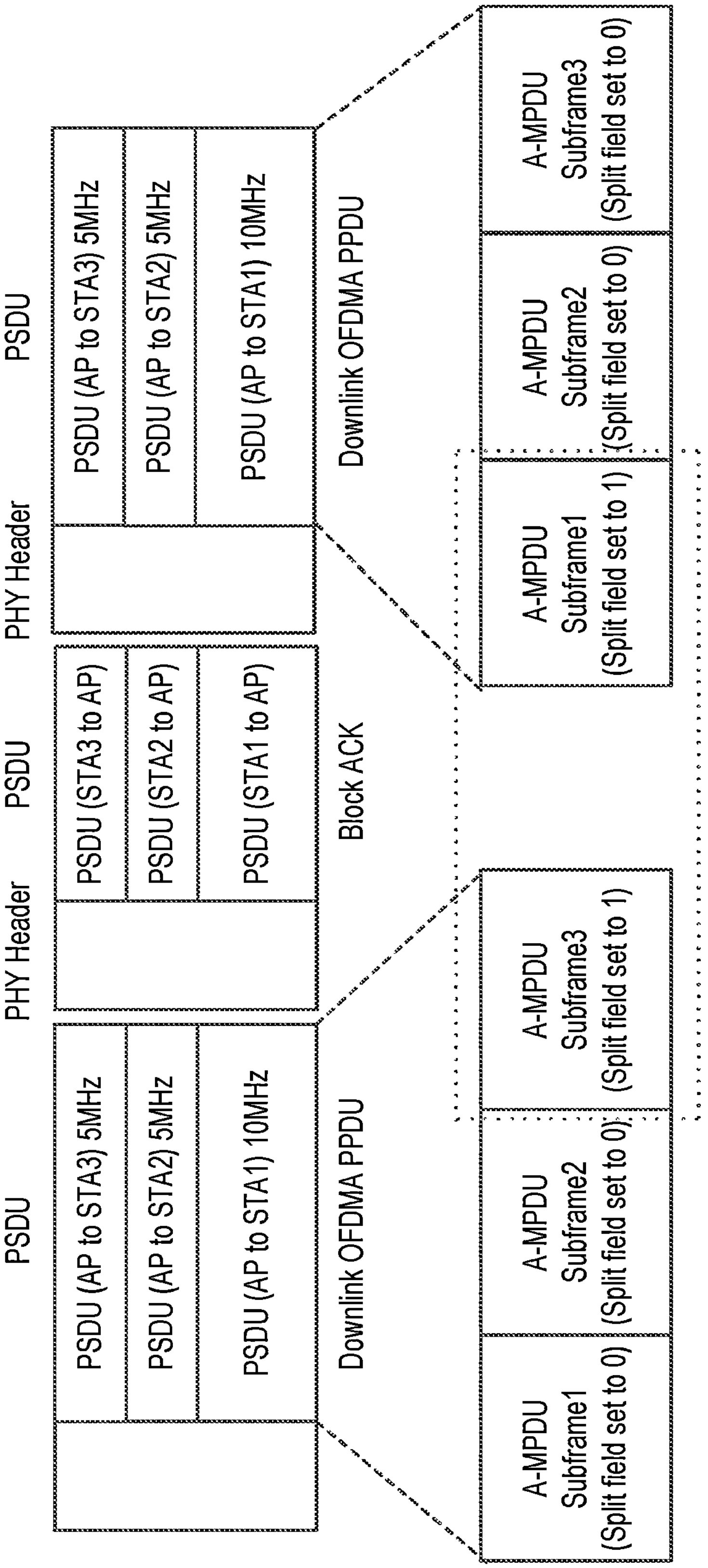
FIGS. 36-41 illustrate examples of an exchange of frames between an access point and multiple stations in accordance with embodiments of the present invention.

FIG. 36 illustrates an example of an exchange of frames between an AP and multiple stations. The exchange of frames may be associated with a fragmentation mechanism of an AMPDU subframe. In an aspect, when a last A-MPDU subframe of an A-MPDU causes a TXTIME of the A-MPDU to exceed a granted TXTIME for a multi-user PPDU, the last A-MPDU subframe of the A-MPDU can be fragmented into two parts. For example, in FIG. 36, the last A-MPDU subframe of the PSDU addressed to STA1 is fragmented into two parts, denoted as "A-MPDU Subframe3 (Split field set to 1)" and "A-MPDU Subframe1 (Split field set to 1)" because a TXTIME of the A-MPDU would exceed the granted TXTIME without the fragmentation. These two parts may be referred to as a first fragmented A-MPDU subframe and a second fragmented AMPDU subframe. In an aspect, the first and second fragmented A-MPDU subframes may be consecutively transmitted with an immediate acknowledgement. In this regard, multi-user PPDUs, including the fragmented MPDUs (e.g., fragmented A-MPDU subframes), may be consecutively transmitted with an immediate acknowledgement in an SIFS interval, as the following:

$$[\text{Multi-User PPDU including the fragmented MPDU}] + SIFS + [\text{Acknowledgement } PPDU] + SIFS + [\mathit{Multi}\text{-User } PPDUs \text{ including the fragmented } MPDU] + SIFS + [\text{Acknowledgement } PPDU]$$

In some cases, a multi-user PPDU exchange sequence, including the fragmented MPDU (e.g., fragmented A-MPDU subframe), may be limited to a single TXOP. In these cases, when all fragmented MPDUs are not exchanged within a single TXOP, the multi-user PPDU exchange sequence does not include any fragmented MPDU.

In some cases, multiple fragmented MPDUs of the same MPDU cannot be transmitted together in a single HE PPDU. For instance, multiple fragmented A-MPDU subframes of the same A-MPDU subframe cannot be transmitted together in a single HE PPDU. On the other hand, different A-MPDU subframes can be transmitted together in a single HE PPDU.

In an aspect, in order to support the fragmentation of an A-MPDU subframe, an MPDU delimiter field in A-MPDU subframe may have a fragmentation sub-field. The fragmentation subfield may be set to 1 when the corresponding A-MPDU subframe is fragmented. The fragmentation sub-field may be set to 0 when the corresponding A-MPDU subframe is not fragmented.

In an aspect, in the fragmentation of an A-MPDU subframe, after receiving an A-MPDU subframe with the fragmentation sub-field equal to 1, if a STA does not successfully receive the immediately following (e.g., within a single TXOP) A-MPDU subframe with the fragmentation sub-field equal to 1, the STA may discard that fragmented A-MDPU subframe. Else if a STA successfully receives the immediately following (e.g., within a single TXOP) A-MPDU subframe with the fragmentation sub-field equal to 1, the AP may merge the two fragmented A-MPDU subframes.

In an aspect, when a STA determines that a medium is idle following reception of a frame for which the PHY-RXEND indication primitive contained an error or a frame for which the MAC FCS value was not correct, a channel access mechanism of a STA may use an extended inter frame space (EIFS) for distributed coordination function (DCF) or the EIFS-DIFS+AIFS[AC] interval for the EDCA before transmission.

The EIFS or EIFS-DIFS+AIFS[AC] interval may begin following an indication by the PHY that the medium is idle after detection of an erroneous frame, without regard to the virtual carrier sense (CS) mechanism. In an aspect, the STA does not begin a transmission until the expiration of the later of the NAV and EIFS or EIFS-DIFS+AIFS[AC]. The EIFS and EIFS-DIFS+AIFS[AC] may be defined to provide enough time for another STA to acknowledge what was, to this STA, an incorrectly received frame before this STA commences transmission. Reception of an error-free frame during the EIFS or EIFS-DIFS+AIFS[AC] may resynchronize the STA to the actual busy/idle state of the medium, so the EIFS or EIFS-DIFS+AIFS[AC] may be terminated and medium access (e.g., using DIFS or AIFS as appropriate and, if necessary, backoff) may continue following reception of the error-free frame. At the expiration or termination of the EIFS or EIFS-DIFS+AIFS[AC], the STA may revert to the NAV and physical CS to control access to the medium.

In an aspect, EIFS shall not be invoked if the NAV is updated by the frame that would have caused an EIFS, such as when the MAC FCS fails and the L-SIG TXOP function employs L-SIG information to update the NAV. In an aspect, EIFS shall not be invoked for an A-MPDU if one or more of its frames are received correctly.

In an aspect, when dot 1DynamicEIFSActivated is false or not defined, the EIFS is derived from the SIFS and the DIFS and the length of time it takes to transmit an Ack frame at the lowest PHY mandatory rate may be provided by the following equation:

$$EIFS = aSIFSTime + ACKTxTime + DIFS,$$

where ACKTxTime is the time (e.g., expressed in microseconds) required to transmit an Ack frame, including the preamble, PHY header, and any additional PHY dependent information, at the lowest PHY mandatory rate.

In an aspect, when dot 1DynamicEIFSActivated is true, EIFS may be based on an estimated duration of the PPDU that is a possible response to the PPDU that causes the EIFS. In an aspect, when dot 11DynamicEIFSActivated is true and the PPDU that causes the EIFS does not contain a single MPDU with a length equal to a predetermined length (e.g., 14 or 32 octets), EIFS may be determined as shown in the following equation:

$$EIFS = aSIFSTime + EstimatedAcKTxTime + DIFS,$$

where EstimatedAckTxTime may be based on an estimated duration of the PPDU that is a possible response to the PPDU that causes the EIFS, as specified in the following table:

| Modulation of PPDU causing EIFS | Rate/MCS of PPDU Causing EIFS | Other Properties of PPDU Causing EIFS | Presumed Response | Presumed Response Rate | Estimated Ack TxTime (μs) |
|---|---|---|---|---|---|
| (HR−)DSSS | 1 Mbps | | Ack | 1 Mbps | 304 |
| (HR−)DSSS | ≥2 Mbps (long preamble) | | Ack | 2 Mbps | 248 |
| (HR−)DSSS | ≥2 Mbps (short preamble) | | Ack | 2 Mbps | 152 |
| (ERP−)OFDM | BPSK | | Ack | 6 Mbps | 44 |
| (ERP−)OFDM | QPSK | | Ack | 12 Mbps | 32 |
| (ERP−)OFDM | ≥16-QAM | | Ack | 24 Mbps | 28 |
| HT | BPSK | Aggregation = 0 | Ack | 6 Mbps | 44 |
| HT | QPSK | Aggregation = 0 | Ack | 12 Mbps | 32 |

-continued

| Modulation of PPDU causing EIFS | Rate/MCS of PPDU Causing EIFS | Other Properties of PPDU Causing EIFS | Presumed Response | Presumed Response Rate | Estimated Ack TxTime (μs) |
|---|---|---|---|---|---|
| HT | ≥16-QAM | Aggregation = 0 | Ack | 24 Mbps | 28 |
| HT | BPSK | Aggregation = 1 | BlockAck | 6 Mbps | 68 |
| HT | QPSK | Aggregation = 1 | BlockAck | 12 Mbps | 44 |
| HT | ≥16-QAM | Aggregation = 1 | BlockAck | 24 Mbps | 32 |

Figure 37:
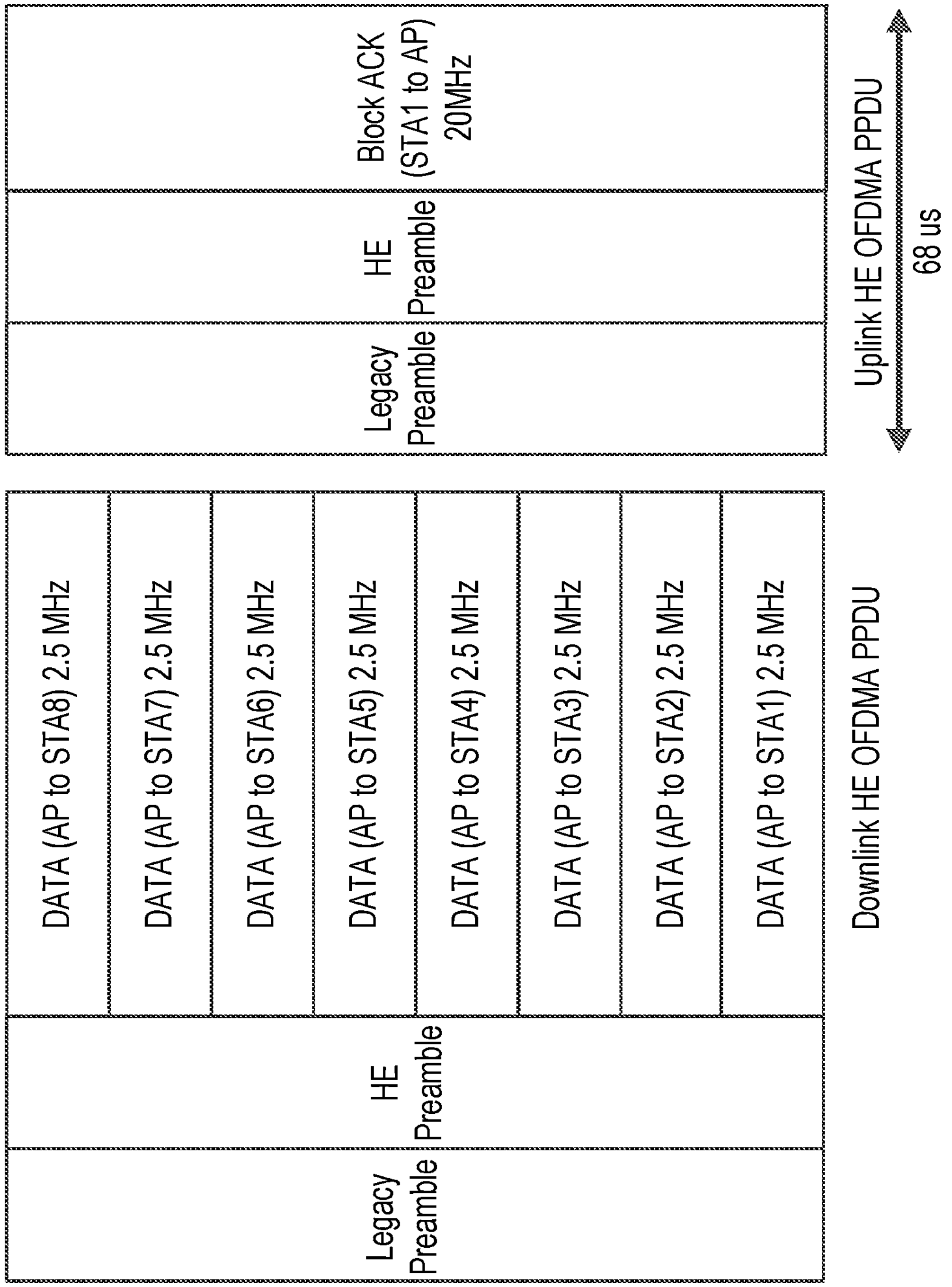

FIG. 37 illustrates an example of an exchange of frames between an AP and multiple stations. In this regard, FIG. 37 shows an example of the AckTx Time for considering the EIFS. First, the AP may transmit a DL OFDMA PPDU in an HE PPDU format. The PSDU of the DL OFDMA PPDU may have the DATA (e.g., HE-DATA) for multiple STAs, STA1, STA2, STA3, STA4, STAS, STA6, STA7 and STA8. The AP may transmit the DATA for these STAs through sub-channels of 2.5 MHz each. After an SIFS from receiving the DL OFDMA PPDU, STA1 may transmit control response frame with or as part of a UL OFDMA PPDU in the HE PPDU format. In an aspect, because a single control response frame occupies the 20 MHz channel, the AckTx-Time is about 68 μs.

Figure 38:
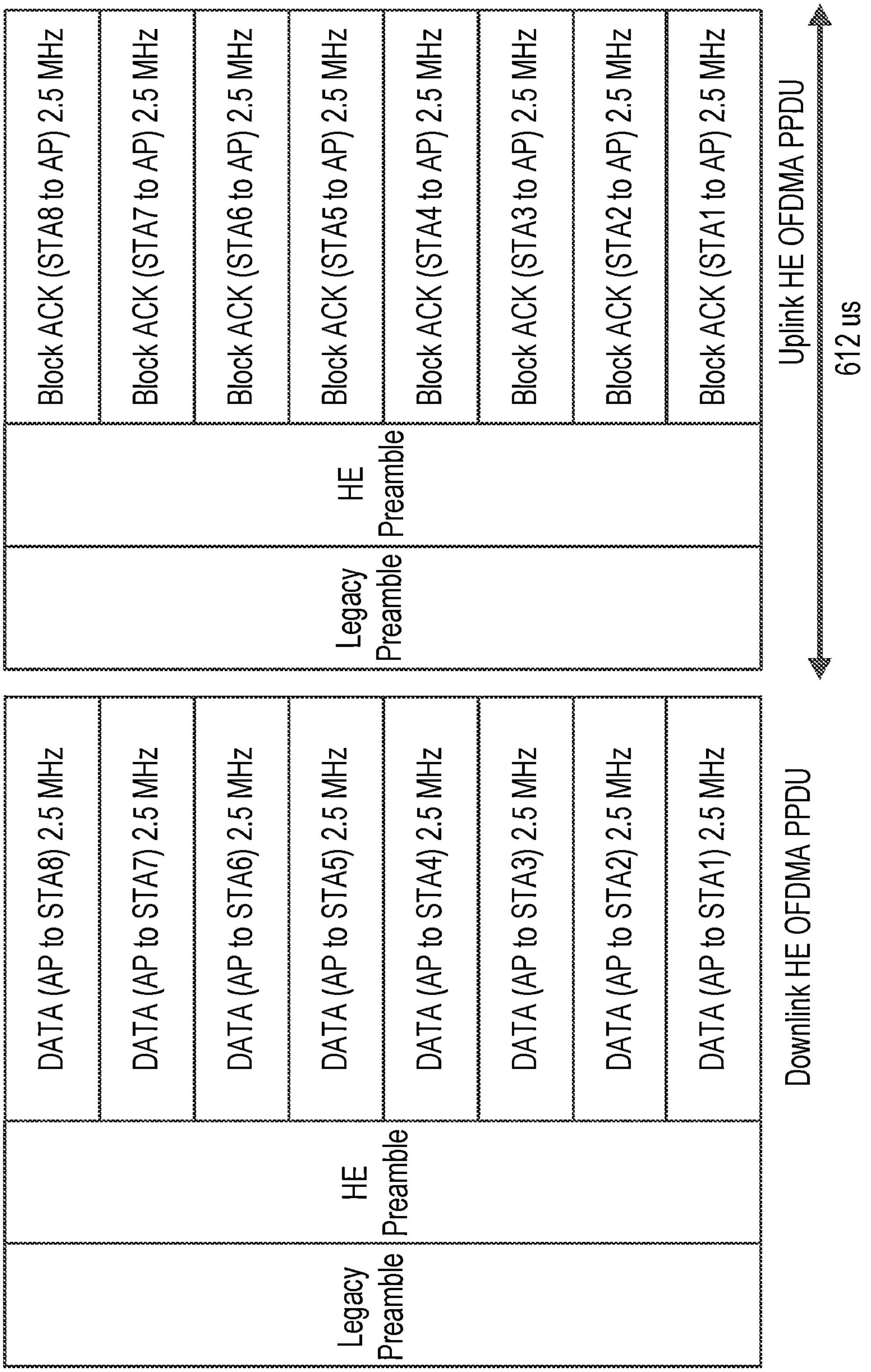

FIG. 38 illustrates an example of an exchange of frames between an AP and multiple stations. In this regard, FIG. 38 shows an example of the AckTx Time for considering the EIFS. First, the AP may transmit a DL OFDMA PPDU in an HE PPDU format. The PSDU of the DL OFDMA PPDU has the DATA (e.g., HE-DATA) for multiple STAs, STA1, STA2, STA3, STA4, STA5, STA6, STA7, and STA8. The AP may transmit the DATA for these stations through sub-channels of 2.5 MHz each. After an SIFS from receiving the DL OFDMA PPDU, STA1, STA2, STA3, STA4, STA5, STA6, STA7, and STA8 may each transmit a control response frame with or as part of a UL OFDMA PPDU in the HE PPDU format. In an aspect, because the control response frame from each STA occupies a 2.5 MHz channel, the AckTxTime may be about 612 μs (e.g., increased from that shown in FIG. 37). As shown in FIGS. 37 and 38, according to the channel bandwidth of the control response frame, the AckTxTime may vary from 68 μs to 612 μs.

In an aspect, after receiving an OFDMA HE PPDU, the EIFS of a third party HE STA may be varied depending on a channel bandwidth of a control response frame. In some cases, when the control response frame uses the same channel bandwidth as the received OFDMA HE PPDU, the channel bandwidth of the control response frame can be implicitly determined by a sub-channel assignment structure of the received OFDMA HE PPDU.

In some cases, the HE preamble of the OFDMA HE PPDU may indicate the channel bandwidth of the control response frame. When one or more control response frames are simultaneously transmitted with different channel bandwidth, the minimum channel bandwidth of the control response frames may be included in the HE preamble. Alternatively, in other cases, rather than indicating the channel bandwidth information of the control response frame in the HE preamble, the HE preamble may include transmission time information of the control response frame, which may vary depending on the channel bandwidth of the control response frame.

In an aspect, when dot1DynamicEIFSActivated is true and the PPDU that causes the EIFS contains either a single MPDU of which the LENGTH field in L-SIG of the PHY header indicates a predetermined length (e.g., 14 or 32 octets) or a VHT/HE single MPDU of which the MPDU Length field in the MPDU delimiter of the A-MPDU subframe indicates a predetermined length (e.g., 14 or 32 octets), the EIFS is equal to DIFS. In this aspect, this may reflect the fact that an MPDU of the predetermined length (e.g., 14 or 32 octet MPDU) is likely an Ack frame or a BlockAck frame, which does not cause a response PPDU to be transmitted.

In an aspect, a very high throughput (VHT)/High Efficiency (HE) single medium access control (MAC) protocol data unit (VHT/HE single MPDU) may be an MPDU that is the only MPDU in an aggregate MPDU (A-MPDU) carried in either a VHT physical layer (PHY) protocol data unit (PPDU) or an HE physical layer (PHY) protocol data unit (PPDU) and that is carried in an A-MPDU subframe with the EOF sub-field of the MPDU delimiter field equal to 1.

In an aspect, the duration of a TXOP is the time a STA obtaining a TXOP (e.g., the TXOP holder) maintains uninterrupted control of the medium, and it includes the time required to transmit frames sent as an immediate response to transmissions by the TXOP holder.

Figure 39:
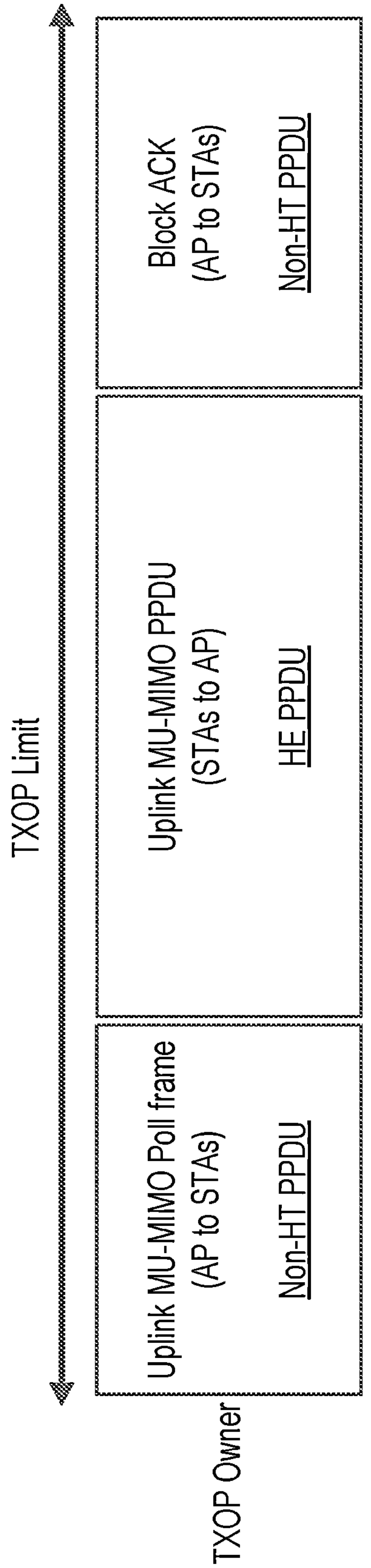

In an aspect, the TXOP holder may be an HE AP. The TXOP holder shall not transmit an uplink MU-MIMO Poll frame (or an uplink OFDMA Poll frame when the follow-up uplink multi-user PPDU is an OFDMA), where the time required for the transmission of the uplink multiuser PPDUs and the associated multi-user Block Ack frame plus two SIFSs exceeds the TXOP limit. In an aspect, the uplink multi-user PPDU Duration field of a trigger frame that indicates the duration of the follow-up uplink multi-user PPDU transmission follows this constraint. The uplink multi-user PPDU Duration field (which indicates the time required for the transmission of the uplink multi-user PPDUs and the associated multi-user Block Ack frame plus, e.g., two SIFSs) shall not exceed the TXOP limit. In other words, the value contained in the uplink multi-user PPDU Duration field shall not exceed the TXOP limit. In an aspect, a TXOP limit of 0 may indicate that the TXOP holder may transmit or cause to be transmitted (e.g., as responses) one of the following within the current TXOP at any rate:

- One or more SU PPDUs carrying fragments of a single MSDU or MAC management protocol data unit (MMPDU)
- An SU PPDU or a VHT MU PPDU or an HE MU PPDU carrying a single MSDU, a single MMPDU, a single A-MSDU, or a single A-MPDU
- A VHT MU PPDU carrying A-MPDUs to different users (a single A-MPDU to each user) or an HE MU PPDU carrying A-MPDUs to/from different users (a single A-MPDU to/from each user)
- A QoS Null frame or PS-Poll frame In an aspect, the TXOP holder may exceed the TXOP limit only if it does not transmit more than one data or management frame in the TXOP, and only for:

- Retransmission of an MPDU, not in an A-MPDU consisting of more than one MPDU
- Initial transmission of an MSDU under a block acknowledgement agreement, where the MSDU is not in an A-MPDU consisting of more than one MPDU and the MSDU is not in an A-MSDU
- Transmission of an uplink multi-user Control MPDU or a QoS Null MPDU, not in an A-MPDU consisting of more than one MPDU
- Initial transmission of a fragment of an MSDU or MMPDU, if a previous fragment of that MSDU or MMPDU was retransmitted
- Transmission of a fragment of an MSDU or MMPDU fragmented into 16 fragments
- Transmission of an A-MPDU consisting of the initial transmission of a single MPDU not containing an MSDU and that is not an individually addressed management frame
- Transmission of a group addressed MPDU, not in an A-MPDU consisting of more than one MPDU
- Transmission of a Null Data Packet (NDP)
- Transmission of a VHT NDP Announcement frame and NDP or transmission of a Beamforming Report Poll frame that fits within the TXOP limit but the response and the immediately preceding SIFS cause the TXOP limit to be exceeded FIG. 39 illustrates an example of an exchange of frames between an AP and multiple stations. FIG. 39 shows an example of a valid TXOP limit rule for uplink multi-user data transmission. In an aspect, the frame exchange sequence including an uplink MU-MIMO Poll frame, uplink MU-MIMO PPDUs, and a Block ACK frame does not exceed the TXOP limit.

Figure 40:
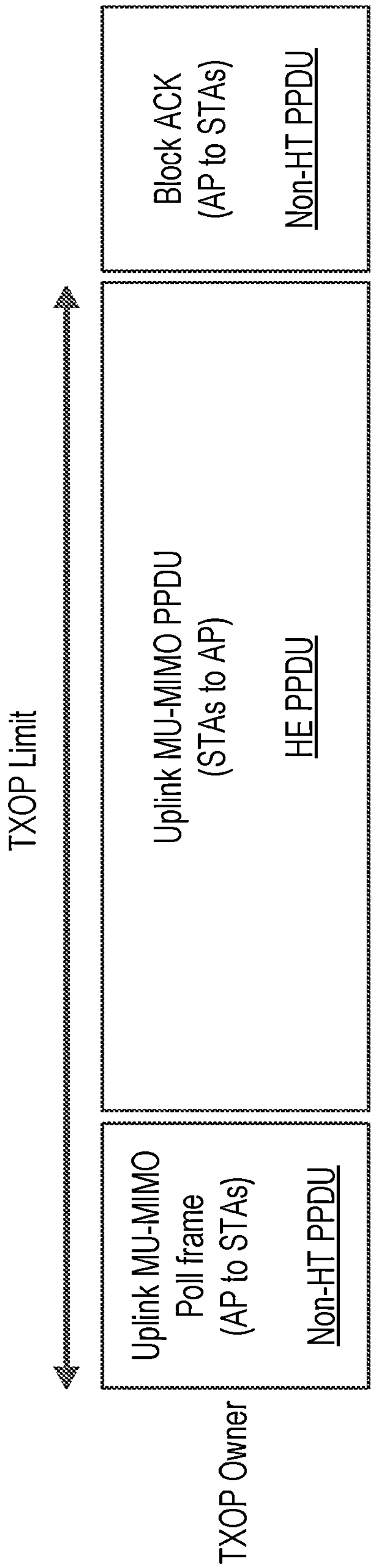

FIG. 40 illustrates an example of an exchange of frames between an AP and multiple stations. FIG. 40 shows an example of an invalid TXOP limit rule for uplink multi-user data transmission. In this regard, the frame exchange sequence including an uplink MU-MIMO Poll frame, uplink MU-MIMO PPDUs, and a Block ACK frame exceeds the TXOP limit in FIG. 40. This is not a valid frame exchange sequence for the uplink multi-user transmission. Accordingly, in an aspect, the uplink MU-MIMO Poll frame may adjust the duration of the uplink MU-MIMO PPDU transmission to allow meeting of the TXOP limit.

Figures 41, 42:
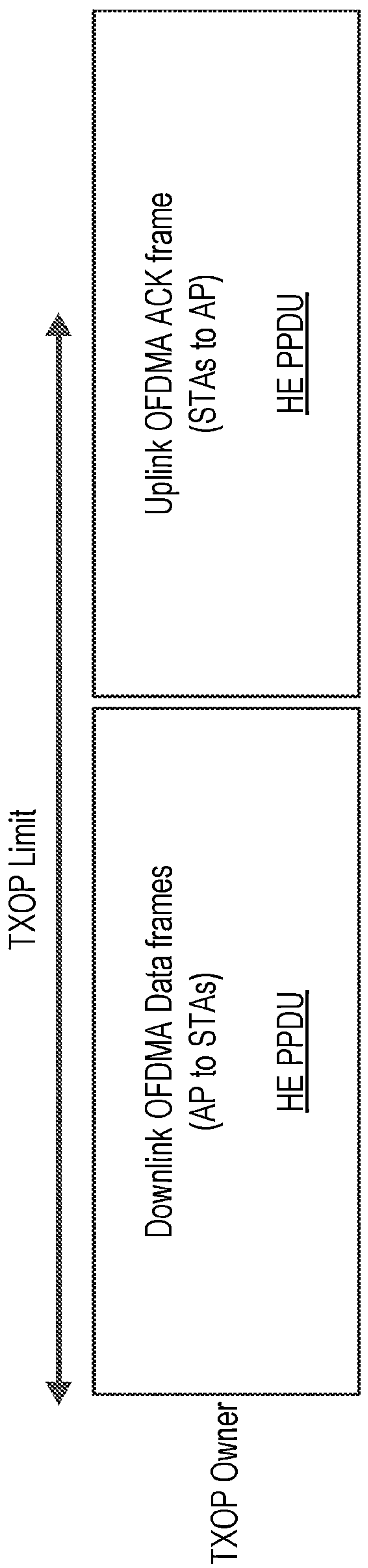
FIG. 42 illustrates an example of a Multi-User Block ACK Request (MU-BAR) frame in accordance with embodiments of the present invention.

FIG. 41 illustrates an example of an exchange of frames between an AP and multiple stations. FIG. 41 illustrates an example of a valid TXOP limit rule for uplink multi-user ACK transmission. The frame exchange sequence of Downlink OFDMA Data frames and an Uplink OFDMA ACK frame exceeds the TXOP limit. Even though the frame exchange sequence exceeds the TXOP limit, this is a valid frame exchange sequence because only the control response frame (e.g., the Uplink OFDMA ACK frame) is exceeding the TXOP limit.

In an aspect, when the UL OFDMA is used for multiplexing the BA/ACK response to the DL OFDMA PPDU and DL MU-MIMO PPDU, the sub-channel assignment information may be included in the DL OFDMA PPDU and DL MU-MIMO PPDU.

In an aspect, an A-MPDU may include the sub-channel assignment information. A frame having the sub-channel assignment information may be aggregated with other MPDUs and the frame transmitted to each receiver of the DL OFDMA PPDU and DL MU-MIMO PPDU. Alternatively or in addition, in an aspect, a MAC header of the DL OFDMA PPDU and DL MU-MIMO PPDU has the sub-channel assignment information.

In an aspect, regarding an A-MPDU mechanism of the sub-channel assignment information, the following rules may be implemented. In some cases, at most one frame having the sub-channel assignment information can be included in the A-MPDU. The frame shall be the first or last MPDU in the A-MPDU. The Ack Policy of other QOS DATA MPDU in the A-MPDU shall not be set to Normal Ack, Implicit Block Ack Request, or Block ACK. The Ack Policy behavior of receivers of the DL OFDMA PPDU and DL MU-MIMO PPDU should be differently interpreted according to the reception of the MPDU having the sub-channel assignment information in the DL OFDMA PPDU and DL MU-MIMO PPDU.

For example, the Ack Policy of the QOS DATA MPDU in the DL OFDMA PPDU and DL MU-MIMO PPDU may be set to a reserved value for indicating the UL OFDMA-based ACK. If the reserved value is set to 01, the Ack Policy behavior of receivers of the DL OFDMA and DL MU-MIMO PPDU can be provided as follows:

Ack Policy set to 01:[PSMP context] or [UL OFDMA context]

In a frame that is the power save multi-poll (PSMP) context:

i) When bit 6 of the Frame Control field is set to 1:

There may be a response frame to the frame that is received, but it is neither the Ack frame nor any data frame of subtype+CF-Ack. The Ack Policy sub-field for QoS CF-Poll and QoS CF-Ack+CF-Poll Data frames is set to this value.

ii) When bit 6 of the Frame Control field is set to 0:

The acknowledgement for a frame indicating PSMP Ack when it appears in a PSMP downlink transmission time (PSMP-DTT) is to be received in a later PSMP uplink transmission time (PSMP-UTT). The acknowledgement for a frame indicating PSMP Ack when it appears in a PSMP-UTT is to be received in a later PSMP-DTT.

In a frame that is the UL OFDMA context:

i) The addressed recipient that receives a frame having the sub-channel assignment information returns an Ack/Block Ack frame, either individually or as part of an A-MPDU starting a SIFS after the PPDU carrying the frame, according to the sub-channel assignment information specified in the received frame.

ii) The addressed recipient that does not receive a frame having the sub-channel assignment information takes no action upon the receipt of the frame except for recording the state. The recipient can expect a BlockAckReq frame in the future to which it responds using the procedure described in a block acknowledgement mechanism.

In an aspect, regarding an indication of the sub-channel assignment information in the MAC header of the DL OFDMA PPDU and DL MU-MIMO PPDU, the following rules may be implemented. The Ack Policy of a QOS DATA MPDU in the A-MPDU may be set to Normal Ack or Implicit Block Ack Request. The sub-channel assignment information in the MAC header of all MPDUs in an A-MPDU may carry the same value. When the Ack Policy of a QoS DATA MPDU in the A-MPDU is set to No Ack, the sub-channel assignment information is not carried in the DL OFDMA PPDU and DL MU-MIMO PPDU.

In an aspect, when the UL OFDMA is used for multiplexing the BA/ACK response to the DL OFDMA PPDU and DL MU-MIMO PPDU, the Block ACK Request frame may be utilized as well by including the Block ACK Request in the DL OFDMA PPDU and DL MU-MIMO PPDU.

FIG. 42 illustrates an example of a Multi-User Block ACK Request (MU-BAR) frame. The MU-BAR frame may include a Frame Control field, a Duration/ID field, an RA field, a TA field, a BAR Control field, Per-User Block ACK Request field(s), and Per-User Sub-channel Assignment field(s). In an aspect, the MU-BAR frame may be utilized to solicit BA/ACKs from multiple STAs in UL MU transmissions. In an aspect, the BAR Control field may include the number of users for requesting the BA/ACK response. To obtain a BA/ACK response from each user, the Per-User Block Request information and Per-User Sub-channel Assignment information (e.g., in the corresponding Per-User Block Request field and Per-User Sub-channel Assignment field) may be repeated in the MU-BAR frame.

The addressed recipient that receives the MU-BAR frame may return an Ack/Block Ack frame that is carried in the UL OFDMA PPDU (e.g., according to the sub-channel assignment information specified in the Per-User Sub-channel Assignment field of the MU-BAR frame).

In an aspect, one or more MU-BAR frames can be included in the DL OFDMA PPDU and DL MU-MIMO PPDU. Because a normal Block ACK Request frame may still be used for requesting an Ack/Block Ack frame, the normal Block ACK Request frame may be carried in the SU PPDU. In an aspect, a normal Block ACK Request may refer to an unmodified legacy Block ACK Request, and it solicits the Block ACK frame from the single receiver. In an aspect, the MU-BAR frame and the normal Block ACK Request frame shall not be present together in the same PPDU. In other words, when the normal Block ACK Request frame is present in the DL OFDMA PPDU and DL MU-MIMO PPDU, the MU-BAR frame shall not be present in the same PPDU. When the MU-BAR frame is present in the DL OFDMA and DL MU-MIMO PPDU, the normal Block ACK Request frame shall not be present in the same PPDU.

In an aspect, rather than use the MU-BAR frame of FIG. 42, a normal Block ACK Request frame may be reused. In the DL OFDMA PPDU and DL MU-MIMO PPDU, at most one frame having the sub-channel assignment information can be included in the A-MPDU. That frame shall be the first or last MPDU in the A-MPDU. The Ack Policy of other QoS DATA MPDU in the A-MPDU shall be set to Block ACK because a Block ACK Request frame is also present in the same A-MPDU. The BAR Ack Policy of the Block ACK Request frame in the A-MPDU is not set to 0 (e.g., Normal Acknowledgement) and is set to a reserved value (e.g., 1-No Acknowledgement). The Ack Policy behavior of receivers of the DL OFDMA and DL MU-MIMO PPDU may be differently interpreted according to the reception of the MPDU having the sub-channel assignment information in the DL OFDMA PPDU and DL MU-MIMO PPDU.

For example, the BAR Ack Policy of the Block ACK Request frame in the DL OFDMA PPDU and DL MU-MIMO PPDU may be set to a reserved value for indicating the UL OFDMA-based ACK. If the reserved value is set to 1, the Ack Policy behavior of receivers of the DL OFDMA PPDU and DL MU-MIMO PPDU can be provided as follows:

BAR Ack Policy set to 01:[PSMP context] or [UL OFDMA context]

In a frame that is the power save multi-poll (PSMP) context:

i) When bit 6 of the Frame Control field is set to 1:

There may be a response frame to the frame that is received, but it is neither the Ack frame nor any data frame of subtype+CF-Ack. The Ack Policy sub-field for QoS CF-Poll and QoS CF-Ack+CFPoll Data frames is set to this value.

ii) When bit 6 of the Frame Control field is set to 0:

The acknowledgement for a frame indicating PSMP Ack when it appears in a PSMP downlink transmission time (PSMP-DTT) is to be received in a later PSMP uplink transmission time (PSMP-UTT). The acknowledgement for a frame indicating PSMP Ack when it appears in a PSMP-UTT is to be received in a later PSMP-DTT.

In a frame that is the UL OFDMA context:

i) The addressed recipient that receives a frame having the sub-channel assignment information returns an Ack/Block Ack frame, either individually or as part of an A-MPDU starting a SIFS after the PPDU carrying the frame, according to the sub-channel assignment information specified in the received frame.

ii) The addressed recipient that does not receive a frame having the sub-channel assignment information takes no action upon the receipt of the frame except for recording the state. The recipient can expect a BlockAckReq frame in the future to which it responds using the procedure described in a block acknowledgement mechanism.

FIG. 43 illustrates an example of a frame having sub-channel assignment information. The frame may include a Frame Control field, a Duration/ID field, an RA field, a TA field, a Common Sub-channel Assignment Info field, and Per-User Sub-channel Assignment Info 1 field through Per-User Sub-channel Assignment Info n field. One or more or no Per-User Sub-channel Assignment fields may be present between the Per-User Sub-channel Assignment Info 1 field and Per-User Sub-channel Assignment Info n field.

In an aspect, the Common Sub-channel Assignment Info field has the following fields:

UL MU Duration (e.g., 9 bits) indicates a duration of a UL MU transmission

Figure 44:
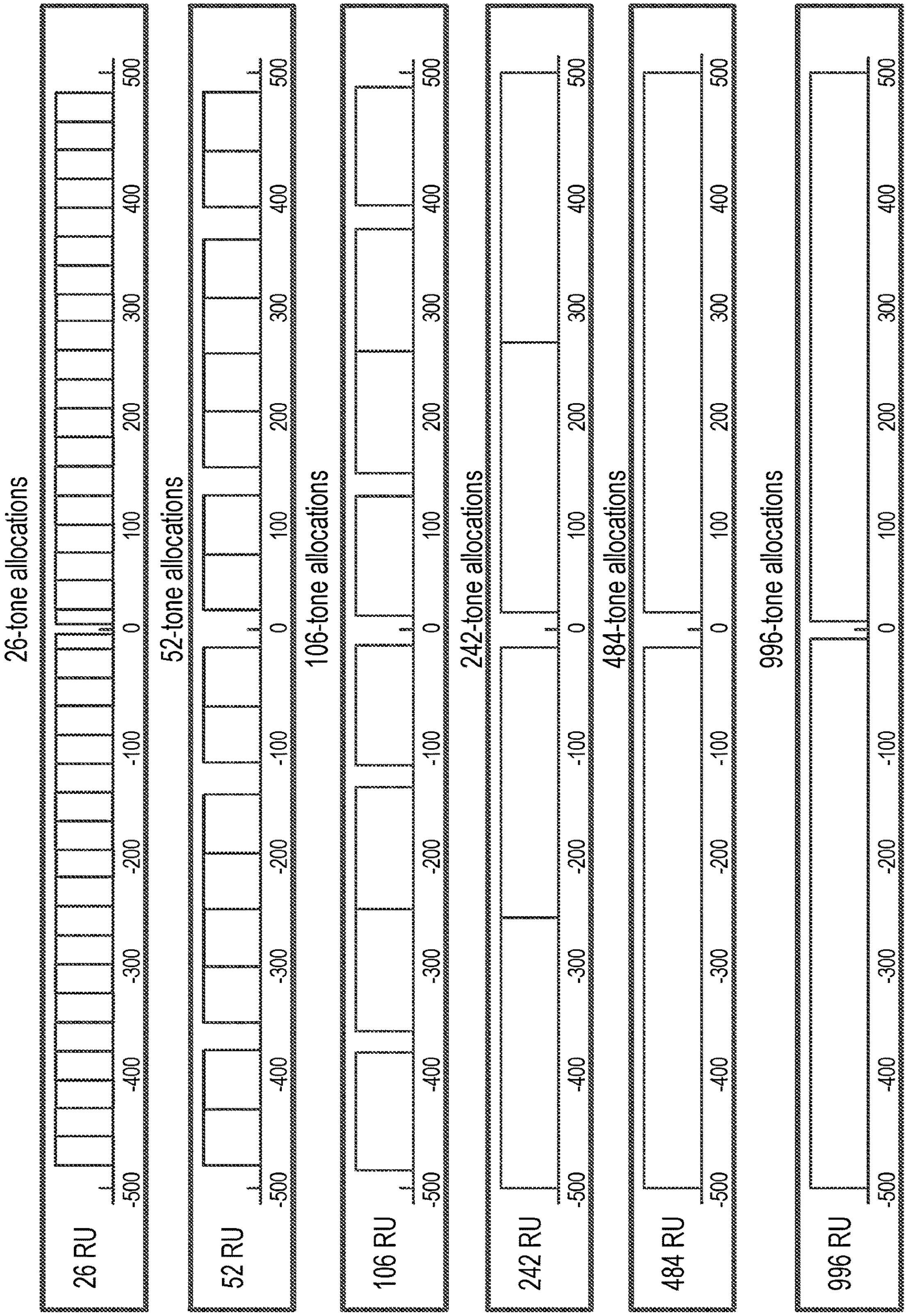
FIG. 44 illustrates an example of a structure of a resource unit (RU) distribution in an orthogonal frequency division multiple access (OFDMA) transmission in accordance with embodiments of the present invention.

Total LTFs (e.g., 3 bits) indicates the number of LTFs transmitted in a UL MU PPDU LTF Duration (e.g., 1 bit) indicates an OFDMA symbol duration of an LTF Guard Interval (e.g., 2 bits) indicates a guard interval of an LTF and a PSDU transmitted in a UL MU PPDU STBC (e.g., 1 bit) indicates whether a STBC is applied for a UL MU transmission In an aspect, each Per-User Sub-channel Assignment Info field has the following fields:

AID (e.g., 12 bits) indicates an association identifier (AID) of an uplink (UL) multi-user (MU) transmitter RU Sub-Channel (e.g., 8 bits) indicates a frequency of a resource unit (RU) assigned for a UL MU transmission RU MCS (e.g., 3 bits) indicates a modulation coding scheme (MCS) of a UL MU transmission RU STS (e.g., 3 bits) indicates the number of space-time streams of a UL MU transmission RU Beamformed (e.g., 1 bit) indicates whether beamforming is applied for a UL MU transmission RU Coding (e.g., 1 bit) indicates a coding type (BCC or LDPC) of a PSDU transmitted in a UL MU PPDU FIG. 44 illustrates an example of a structure (or numerology) of a resource unit (RU) distribution in an OFDMA transmission. In an aspect, FIG. 44 illustrates a numerology for an 80 MHz channel bandwidth. In an aspect, to support all possible RU combinations (e.g., 136 cases) for a 160 MHz channel, the RU Sub-Channel sub-field may need 8 bits. In some cases, 8 bits of the RU Sub-Channel sub-field may have a nested structure. In an aspect, a nested structure of the RU Sub-Channel sub-field may help reduce signaling overhead.

FIG. 45 illustrates an example of a general framework of a nested structure of the RU Sub-Channel sub-field. The RU Sub-Channel sub-field may include an Assigned RU Type subfield, an Assigned RU Position sub-field, and an Assigned RU Tone sub-field. In an aspect, the Assigned RU Type sub-field may specify the set of Assigned RUs. For example, the Assigned RU Type sub-field may be set to 0 for assigning 52 RU, 106 RU, and 242 RU. The Assigned RU Type sub-field may be set to 1 for assigning 26 RU, 484 RU, and 996 RU. In an aspect, the Assigned RU Position sub-field (e.g., 3 bits) may specify the frequency position of the assigned RU. In an aspect, the Assigned RU Tone sub-field (e.g., 3 bits or 4 bits) may specify the number of tones of the assigned RU.

For example, when the Assigned RU Type sub-field is set to 0:

- The Assigned RU Position sub-field (e.g., 3 bits) may be set to 000 (e.g., RU is positioned on a first (lowest) 20 MHZ), 001 (e.g., RU is positioned on a second 20 MHz), 010 (e.g., RU is positioned on a third 20 MHz), 011 (e.g., RU is positioned on a fourth 20 MHz), 100 (e.g., RU is positioned on a fifth 20 MHz), 101 (e.g., RU is positioned on a sixth 20 MHz), 110 (e.g., RU is positioned on a seventh 20 MHz), and 111 (e.g., RU is positioned on an eighth (highest) 20 MHz); and
- The Assigned RU Tone sub-field (e.g., 3 bits) may be set to 000 (e.g., assigned RU corresponds to a leftmost (first) 52-RU), 001 (e.g., assigned RU corresponds to a second 52-RU), 010 (e.g., assigned RU corresponds to a third 52-RU), 011 (e.g., assigned RU corresponds to a fourth rightmost 52-RU), 100 (e.g., assigned RU corresponds to a leftmost (first) 106-RU), 101 (e.g., assigned RU corresponds to a second rightmost 106-RU), 110 (e.g., assigned RU corresponds to 242-RU), and 111 (Reserved).

For example, when the Assigned RU Type sub-field is set to 1:

- The Assigned RU Position sub-field (e.g., 3 bits) may be set to 000 (e.g., RU is positioned on a first (lowest) 20 MHz), 001 (e.g., RU is positioned on a second 20 MHz), 010 (e.g., RU is positioned on a third 20 MHZ), 011 (e.g., RU is positioned on a fourth 20 MHz), 100 (e.g., RU is positioned on a fifth 20 MHZ), 101 (e.g., RU is positioned on a sixth 20 MHz), 110 (e.g., RU is positioned on a seventh 20 MHz), and 111 (e.g., RU is positioned on a eighth (highest) 20 MHz);
- The Assigned RU Tone sub-field (e.g., 4 bits) may be set to 0000 (e.g., assigned RU corresponds to a leftmost (first) 26-RU), 0001 (e.g., assigned RU corresponds to a second 26-RU), 0010 (e.g., assigned RU corresponds to a third 26-RU), 0011 (e.g., assigned RU corresponds to a fourth 26-RU), 0100 (e.g., assigned RU corresponds to a fifth 26-RU), 0101 (e.g., assigned RU corresponds to a sixth 26-RU), 0110 (e.g., assigned RU corresponds to a seventh 26-RU), 0111 (e.g., assigned RU corresponds to an eighth 26-RU), 1000 (e.g., assigned RU corresponds to a rightmost (ninth) 26-RU), 1001 (e.g., assigned RU corresponds to a center 26-RU), 1010 (e.g., assigned RU corresponds to a leftmost (first) 484-RU), 1011 (e.g., assigned RU corresponds to a rightmost (second) 484-RU), 1100 (e.g., assigned RU corresponds to 996-RU), 1101 (Reserved), and 1111 (Reserved).

In an aspect, when the Assigned RU Type sub-field is set to 1, the Assigned RU Position sub-field may be set to 000 (e.g., corresponding RU is located on a first 80 MHz) or 111 (e.g., corresponding RU is located on a second 80 MHz) for center 26-RU, 484-RUs, and 996-RU.

In some cases, a DL MU PPDU may contain multiple frames having sub-channel assignment information destined for different STAs. In that case, the RU Sub-Channel sub-field in the sub-channel assignment information may be uniquely assigned to a single STA if a UL MU response from the corresponding RU sub-channel is not designated for UL MU-MIMO. In an aspect, a same RU sub-channel in the multiple frames having the sub-channel assignment information can be assigned to different STAs if a UL MU response from the corresponding RU sub-channel is designated for UL MU-MIMO.

In an aspect, a nested structure of the RU Sub-Channel sub-field may help reduce signaling overhead. FIGS. 46A, 46B and 46C illustrate an example of a sub-channel assignment method. More specifically, FIG. 46A illustrates an example of a Common Sub-Channel Assignment Info field. FIGS. 46B and 46C illustrate examples of a Per-User Sub-Channel Assignment Info field. In an aspect, a description of the various sub-fields illustrated in FIGS. 46A, 46B, and 46C is the same as that previously described.

In an aspect, in the Per-User Sub-channel Assignment Info field, the RU Sub-Channel sub-field can be compressed when the Assigned RUs of each user are positioned on the same channel. For example, an assigned RU for STA1 may be a first (leftmost) 52-RU on a first lowest 20 MHz and an assigned RU for STA2 may be on a second 52-RU on a first lowest 20 MHz. In that case, the RU Sub-Channel sub-fields in the Per-User Sub-channel Assignment Info field (e.g., indicating a frequency of a resource unit (RU) assigned for a UL MU transmission) may be encoded to 0000000 and 0000001, respectively. In contrast, by using the nested structure of the RU Sub-Channel sub-field (e.g., shown in FIGS. 46B and 46C), the Assigned RU Type subfield (e.g., 0) and Assigned RU Position sub-field (e.g., 000) may be commonly encoded for each user and a different part (e.g., the Assigned RU Tone sub-field, 000 for STA1 and 001 for STA2) are separately encoded for each user.

In an aspect, a same RU sub-channel may be assigned to different STAs for a UL MU-MIMO transmission. In the Per-User Sub-channel Assignment Info field, the RU Sub-Channel sub-field can be further compressed. These features are illustrated with reference to FIGS. 47A and 47B. More specifically, FIG. 47A illustrates an example of a Common Sub-Channel Assignment Info field, and FIG. 47B illustrates an example of a Per-User Sub-Channel Assignment Info field. In an aspect, a description of the various sub-fields illustrated in FIGS. 47A and 47B is the same as that previously described with reference to FIGS. 46A, 46B and 46C, but FIG. 47B does not include an Assigned RU Tone field that is shown in FIGS. 46B and 46C. As shown in FIG. 47B, the RU Sub-Channel sub-field may be commonly encoded, but the AID and other transmission parameter for a UL MU transmission may be separately encoded for each user.

In an aspect, a frame having sub-channel assignment information can be utilized for a frame having an HT Control field. FIG. 48 illustrates an example of an HT Control field. In an aspect, sub-channel assignment information may be encoded in the HT Control field. The HT Control field may have a Control Type sub-field (e.g., 2 bits). The Control Type sub-field may be set to 00 when an intended behavior is a MCS Feedback Request (MRQ), set to 01 when an intended behavior is a MCS Feedback Response (MFB), and set to 10 when an intended behavior is a UL MU Trigger (UMT). Depending on a value contained in the Control Type sub-field, the HT Control field may have a different format. For instance, when the Control Type sub-field is set to 10, the HT Control field may consist of a Common Sub-channel Assignment Info field and a Per-User Sub-channel Assignment Info field. In an aspect, the detailed description of each subfield is the same as with previous description.

In one or more aspects, a frame having sub-channel assignment information may be aggregated with other MPDUs and transmitted to each receiver of the DL OFDMA PPDU and DL MU-MIMO PPDU. In an aspect, an example of an A-MPDU format is provided by the table below:

| Name of Context | Definition of Context |
|---|---|
| Data Enabled Immediate Response | The A-MPDU is transmitted outside a PSMP sequence by a TXOP holder or an RD responder or a UL MU responder including potential immediate responses. |
| Data Enabled No Immediate Response | The A-MPDU is transmitted outside a PSMP sequence by a TXOP holder or a UL MU responder that does not include or solicit an immediate response. |
| VHT Single MPDU Context | The A-MPDU is transmitted within a VHT PPDU and contains a VHT single MPDU. The trigger frame is present if it is transmitted by an AP. |
| HE Single MPDU Context | The A-MPDU is transmitted within an HE PPDU and an HE single MPDU with an optional trigger frame. |

In an aspect, as shown in the table above, the frame having the sub-channel assignment information may be, or may be referred to as, a trigger frame. The trigger frame can be included in a Data Enabled Immediate Response, a Data Enabled No Immediate Response, a VHT single MPDU context, and an HE single MPDU context.

In an aspect, A-MPDU contents in the HE single MPDU context are provided as follows:

| MPDU | Conditions |
|---|---|
| Trigger Frame | At most one trigger is optionally present if it is transmitted by an AP |
| Any MPDU except for a Trigger Frame | An HE single MPDU |

In an aspect, generally, the HE single MPDU may include any single MPDU. In such a case, in an aspect, a response to the HE single MPDU is not a UL MU PPDU. In some cases, to allow the use of a UL MU PPDU as a response to the HE single MPDU, the trigger frame can be included in the HE single MPDU. In an aspect, when a trigger frame is present in the HE single MPDU, the trigger frame should be the first MPDU in the A-MPDU. The HE single MPDU may be signaled by setting the EOF sub-field of the MPDU delimiter field of the first (and second) MPDU(s) in the A-MPDU to 1. The Ack Policy behavior of the HE single MPDU may be differently interpreted according to the reception of the trigger frame.

In an aspect, when the addressed recipient receives the trigger frame, the address recipient may return a control response frame (e.g., if the control response frame is needed) according to the sub-channel assignment information specified in the trigger frame. In an aspect, when the addressed recipient does not receive a trigger frame, the addressed recipient takes no action upon the receipt of the A-MPDU. In an aspect, the presence of the trigger frame in the HE single MPDU may be signaled to the destination STA (e.g., an addressed recipient).

Figure 49:
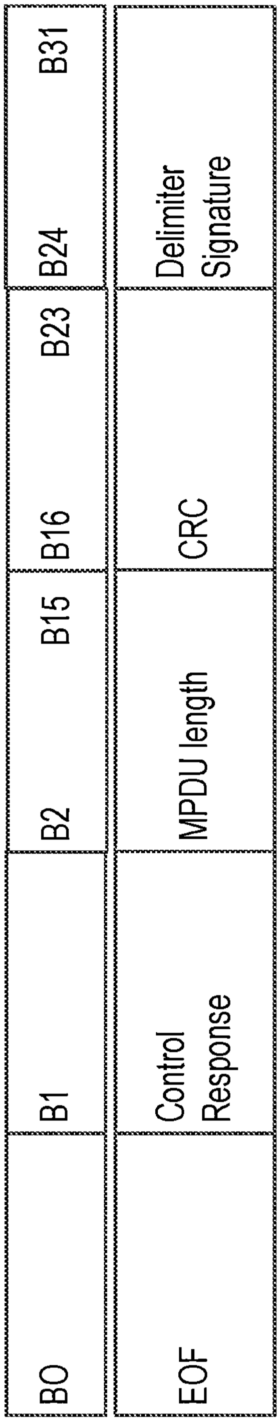
FIG. 49 illustrates an example of an aggregated media access control protocol data unit (A-MPDU) format in accordance with embodiments of the present invention.

FIG. 49 illustrates an example of an A-MPDU format. In FIG. 49, a zeroth bit B0 (denoted as EOF) may be utilized for providing an end of frame (EOF) indication. The EOF indication may be set to 1 in an A-MPDU subframe that has 0 in the MPDU Length field and that is used to pad the A-MPDU in an HE PPDU. The EOF indication may be set to 1 in the MPDU delimiter of an HE single MPDU. Otherwise, the EOF indication may be set to 0.

In this regard, the MPDU Length field may be utilized for indicating a length of the MPDU (e.g., in octets). The MPDU Length may be set to 0 if no MPDU is present. In an aspect, an A-MPDU subframe with 0 in its MPDU Length field may be used to meet the minimum MPDU start spacing requirement and to pad the A-MPDU to fill the available space (e.g., available octets) in an HE PPDU. In an aspect, a cyclic redundancy check (CRC) field may include an 8-bit CRC of a preceding 16 bits. In an aspect, a Delimiter Signature field may include a pattern that may be used to detect an MPDU delimiter when scanning for an MPDU delimiter.

A first bit B1 (denoted as Control Response) in the A-MPDU delimiter may be utilized for indicating a PPDU type of a control response frame. In an aspect, when this bit is set to 0, the PPDU type of the control response is SU. When this bit is set to 1, the PPDU type of the control response is MU. The addressed recipient that receives the trigger frame may return a control response frame (e.g., if the control response frame is needed) according to the sub-channel assignment information specified in the trigger frame. In an aspect, when the addressed recipient does not receive the trigger frame, the addressed recipient takes no action upon the receipt of the A-MPDU.

In some aspects, if the sub-channel assignment information can be implicitly derived from the PHY RX parameter of the transmitted HE single MPDU, the trigger frame, which may be utilized for requesting a UL MU PPDU as a response of an HE single MPDU, may not be present in the HE single MPDU. Even in such a case, a signaling method may still be utilized (e.g., still be needed) for indicating a PPDU type of a control response frame for an HE single MPDU.

In this regard, B1 (Control Response) in the A-MPDU delimiter may still be utilized to indicate a PPDU type of a control response frame with a modification of the receiver behavior compared with the previous description. As described above, when this bit is set to 0 or 1, the PPDU type of the control response is SU or MU, respectively. The addressed recipient may return a control response frame (e.g., if the control response frame is needed) according to the subchannel assignment information implicitly derived from the eliciting frame (e.g., rather than subchannel assignment information specified in the trigger frame).

Figure 50:
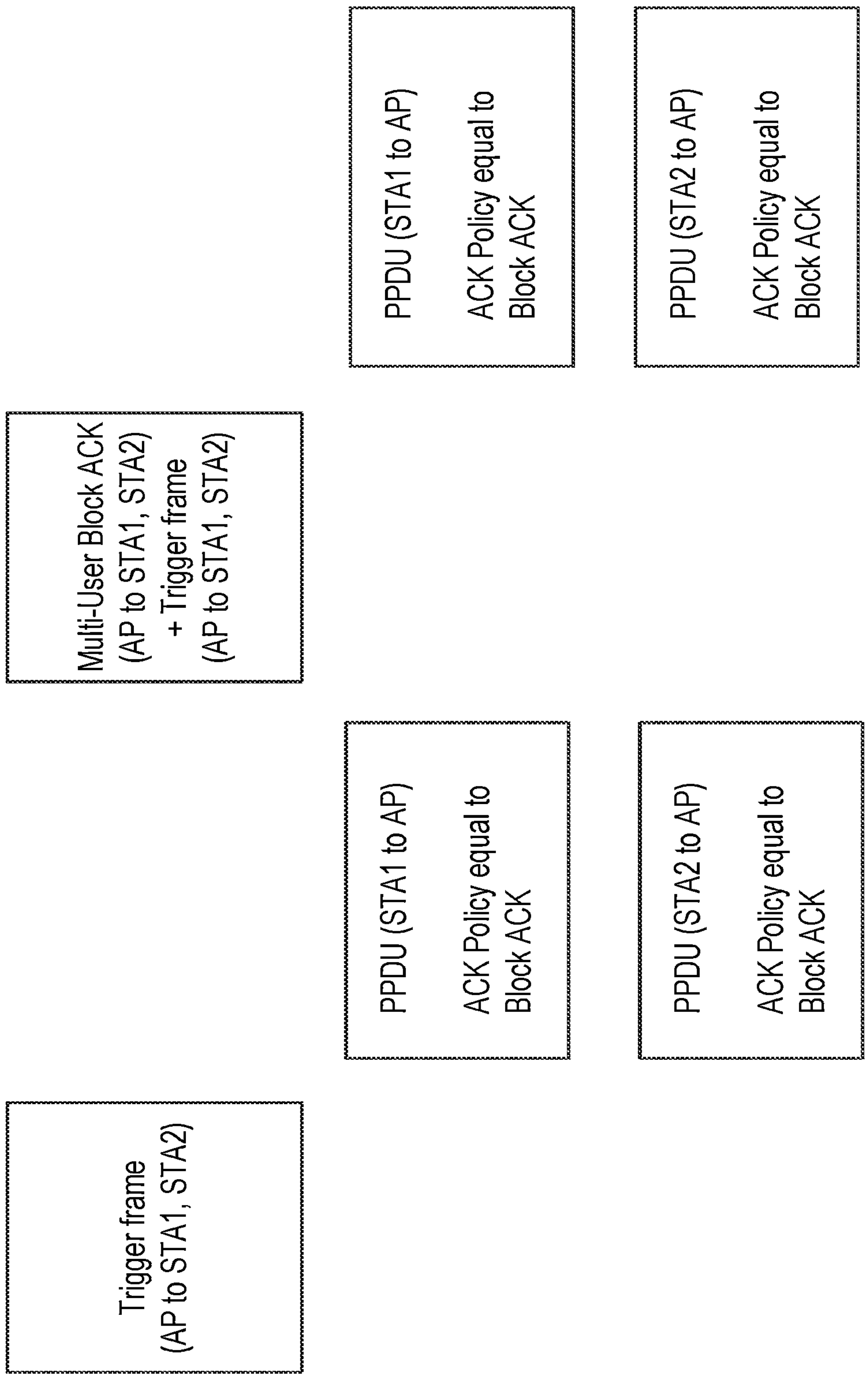
FIGS. 50 and 51 illustrate examples of a frame exchange sequence between an access point and multiple stations in accordance with embodiments of the present invention.

FIG. 50 illustrates an example of a frame exchange sequence between an AP and multiple stations. In FIG. 50, a trigger frame can be included in a Control Response context. First, the AP may initiate a UL MU frame exchange sequence by transmitting a trigger frame. STA1 and STA2 may each transmit a respective UL MU PPDU in response to the trigger frame. After receiving the UL MU PPDUs from STA1 and STA2, the AP may transmit a Multi-User Block ACK (MU-BAR) frame for acknowledging the UL MU PPDUs received from STA1 and STA2. In an aspect, for a follow-up UL MU frame exchange, a second trigger frame may be transmitted in an A-MPDU format with the MU-BAR frame.

In an aspect, to support the frame exchange sequence shown in FIG. 50, a trigger frame can be included in the Control Response context as follows:

| Name of Context | Definition of Context |
|---|---|
| Control Response | The A-MPDU is transmitted by a STA that is neither a TXOP holder nor an RD responder or a UL MU initiator that also needs to transmit one of the following immediate response frames:<br>Ack<br>BlockAck frame with a TID for which an HT-immediate block ack agreement exists |

In an aspect, A-MPDU contents in the Control Response context are provided as follows:

| MPDU | Conditions | |
|---|---|---|
| Ack | Ack frame transmitted in response to an MPDU that requires an Ack frame. | One of these is present at the start of the A-MPDU |
| BlockAck | BlockAck frame with a TID that corresponds to an HT-immediate block ack agreement. | |
| ActionNoAck | +HTC Action No Ack frames carrying a Management Action Body containing an explicit feedback response or BRP frame. | |
| Trigger Frame | At most one trigger is present if it is transmitted by an AP | |

In an aspect, when the AP initiates a UL MU frame exchange sequence by transmitting a trigger frame, UL MU responders may have authority to choose the A-MPDU contents carried in the UL MU response frame. In other words, in an aspect, if UL transmission time is allowed, any frames can be included in the A-MPDU contents carried in the UL MU response frame. An example of A-MPDU contents is provided as follows:

| Name of Context | Definition of Context |
|---|---|
| Data Enabled Immediate Response | The A-MPDU is transmitted outside a PSMP sequence by a TXOP holder or an RD responder or a UL MU responder including potential immediate responses. |
| Data Enabled No Immediate Response | The A-MPDU is transmitted outside a PSMP sequence by a TXOP holder or a UL MU responder that does not include or solicit an immediate response. |
| VHT Single MPDU Context | The A-MPDU is transmitted within a VHT PPDU and contains a VHT single MPDU. The trigger frame is present if it is transmitted by an AP. |
| HE Single MPDU Context | The A-MPDU is transmitted within an HE PPDU and an HE single MPDU with an optional trigger frame. |
| Control Response | The A-MPDU is transmitted by a STA that is neither a TXOP holder nor an RD responder or a UL MU initiator that also needs to transmit one of the following immediate response frames:<br>Ack<br>BlockAck frame with a TID for which an HT-immediate block ack agreement exists |

In an aspect, when a UL MU responder has authority to choose the A-MPDU contents carried in the UL MU response frame, UL MU scheduling at the AP may be affected by the A-MPDU contents. The A-MPDU contents may include a data frame, content frame, and/or management frame. For example, if a UL MU responder transmits a frame of a Data Enabled Immediate Response context, the AP needs to assign one or more sub-channel(s) to the previous UL MU responder in order to reply with the immediate response. In other words, a UL MU scheduling algorithm utilized on the AP side may be affected by the A-MPDU contents carried in the UL MU response frame. In an aspect, the assigning of additional resources to the previous UL MU responder may increase the overhead for the UL MU transmission.

In an aspect, in order to address the effect of the UL MU scheduling algorithm on the A-MPDU contents, a rule is provided as to whether a frame soliciting an immediate response can be included in the A-MPDU contents carried in the UL MU response frame.

In one approach, when a UL MU response of a certain control frame type is solicited by a trigger frame (e.g., Multi-User Block Ack Request or Multi-User Beamforming Report Poll frame), the corresponding UL MU responder shall not include a frame soliciting an immediate response in the A-MPDU contents carried in the UL MU response frame. In other words, if a STA receives the trigger frame for the Multi-User Block Ack Request, the UL MU response frame can include frames (e.g., Block Ack frame, Action No Ack management frame, DATA frame with the Ack Policy set to either No Ack or Block Ack) not soliciting an immediate response in the A-MPDU contents carried in the UL MU response frame.

Figure 51:
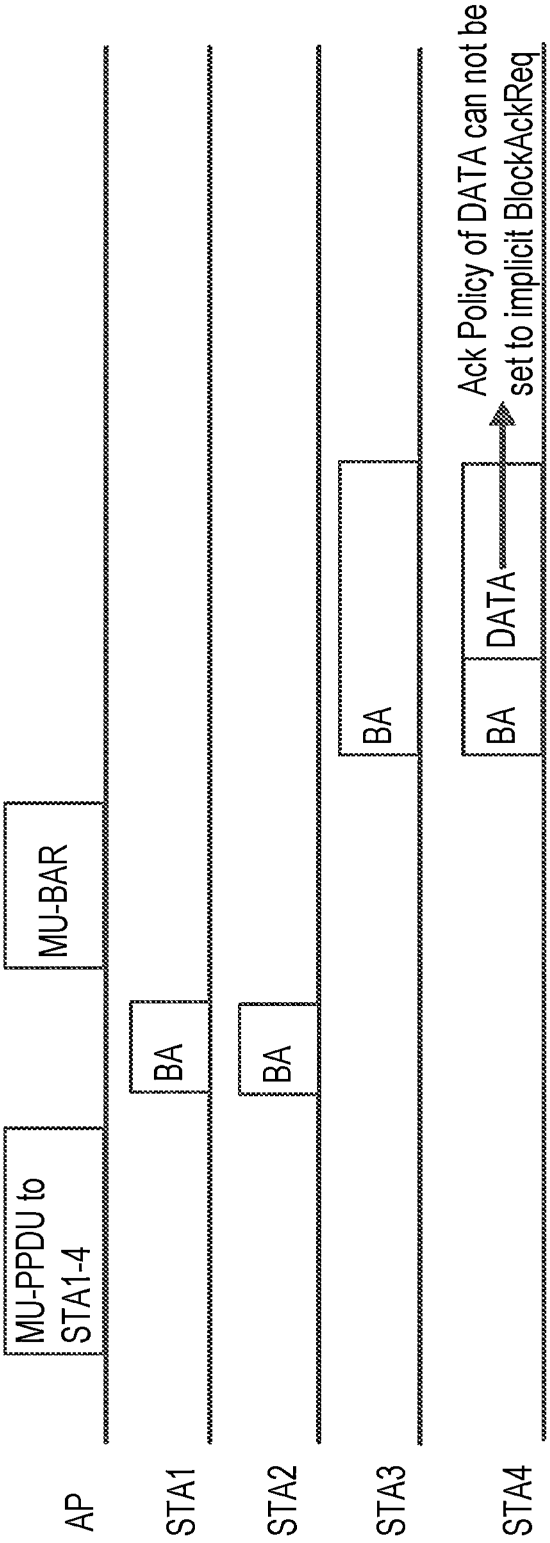

FIG. 51 illustrates an example of the approach described above with reference to a frame exchange sequence between an AP and multiple stations (e.g., STA1, STA2, STA3, and STA4). The AP may transmit a downlink (DL) multi-user PPDU to STA1, STA2, STA3, and STA4. STA1 and STA2 may respond with a Block ACK frame in response to receiving the downlink multi-user PPDU, but STA3 and STA4 do not respond with a frame (e.g., a Block ACK frame). In this example, the AP transmits a trigger frame including a Multi-User Block Ack Request (MU-BAR) frame. When STA3 and STA4 receive the trigger frame for MU-BAR, STA3 and STA4 do not send frames soliciting an immediate response in the A-MPDU contents carried in the UL MU response frame. STA3 transmits only a Block ACK frame, and STA4 transmits a frame having a Block ACK frame and a Data frame (e.g., HE-DATA) with the Ack Policy set to either No Ack or Block Ack (e.g., not set to implicit Block Ack Request).

In one or more aspects, a recipient (e.g., STA3, STA4) of a MU-BAR frame can transmit other data or management frame in addition to BA/ACK frame if it does not exceed the indicated UL MU duration.

It should be noted that the Data frame shown in FIG. 51 is not limited to a data frame, and it can be one or more type(s) of frames (e.g., a data frame, a control frame, and/or a management frame). For example, a recipient (e.g., STA3, STA4) of a frame, such as a DL PPDU from an AP (e.g., a trigger frame having a MU-BAR frame), can generate and transmit a UL PPDU as a response frame having at least one of a data frame, a control frame, or a management frame (or some combination thereof), in addition to a BA or ACK frame, if the UL PPDU does not exceed the indicated UL MU duration (i.e., a duration of a UL MU transmission). In one aspect, a UL MU duration may be a duration indicated (e.g., scheduled or permitted) for a UL MU transmission. For the UL MU transmission, the stations (e.g., STA3 and STA4) may transmit their respective UL PPDUs during the UL MU duration (e.g., as their immediate responses to the frame from the AP). A DL PPDU from the AP (e.g., a trigger frame with a MU-BAR frame) may include information indicating a duration of the UL MU transmission. A UL MU duration does not exceed a TXOP limit. The Ack Policy for the data, control and/or management frame(s) is not set to implicit Block Ack Request. The data, control and/or management frame(s) do not solicit an immediate response from the AP.

In another approach, the trigger frame may indicate whether a frame soliciting an immediate response can be included in the A-MPDU contents carried in the UL MU response frame. For example, the trigger frame may have an A-MPDU contents type field set to 0 if the A-MPDU contents carried in the UL MU response frame is Data Enabled Immediate Response context, set to 1 if the A-MPDU contents carried in the UL MU response frame is Data Enabled No Immediate Response context, set to 2 if the A-MPDU contents carried in the UL MU response frame is HE single MPDU context, and set to 3 if the A-MPDU contents carried in the UL MU response frame is Control Response context.

In an aspect, after receiving a Block ACK frame from the AP, the STA may include a Block ACK Request frame in a following UL MU PPDU for requesting an explicit acknowledgement information based on the Block ACK Request frame. The AP may receive a Block ACK Request from a UL MU PPDU and respond with a Block ACK frame whose Ack Policy is set to 1. Thus, the BA Control and BA Information fields (see, e.g., FIG. 35) are present in the Per-User ACK field of the Block ACK frame.

In an aspect, if AP correctly receives all MPDUs from the Starting Sequence Number specified in the Starting Sequence Control field of the Block ACK Request frame (e.g., sent by a STA of a UL MU PPDU among multiple UL MU PPDUS from multiple STAs), Ack Policy may be set to 0 for indicating the BA Control and BA Information fields are not present in the Per-User ACK field.

In one or more aspects, when a STA transmits a UL MU PPDU, MPDUs having multiple TIDs can be aggregated in a single PSDU. If AP receives MPDUs having multiple TIDs (e.g., TID1, TID2, etc.), a Block ACK frame is responded with one of the following three frame formats described below. A format may be determined based on a category associated with an MPDU error.

Figure 52:
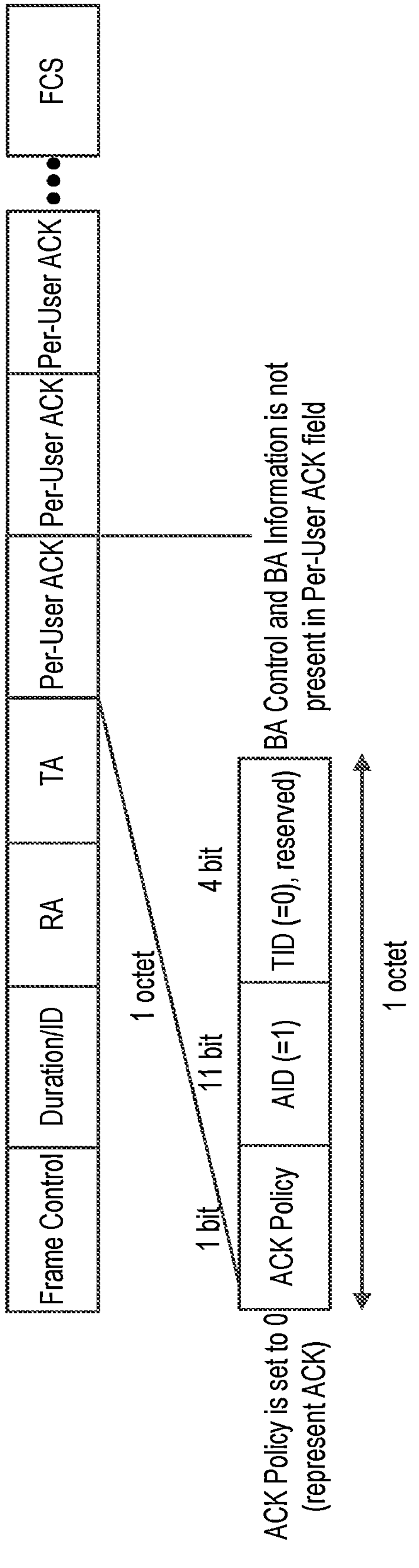
FIG. 52 illustrates an example of a Block ACK frame in accordance with embodiments of the present invention.
Figure 53:
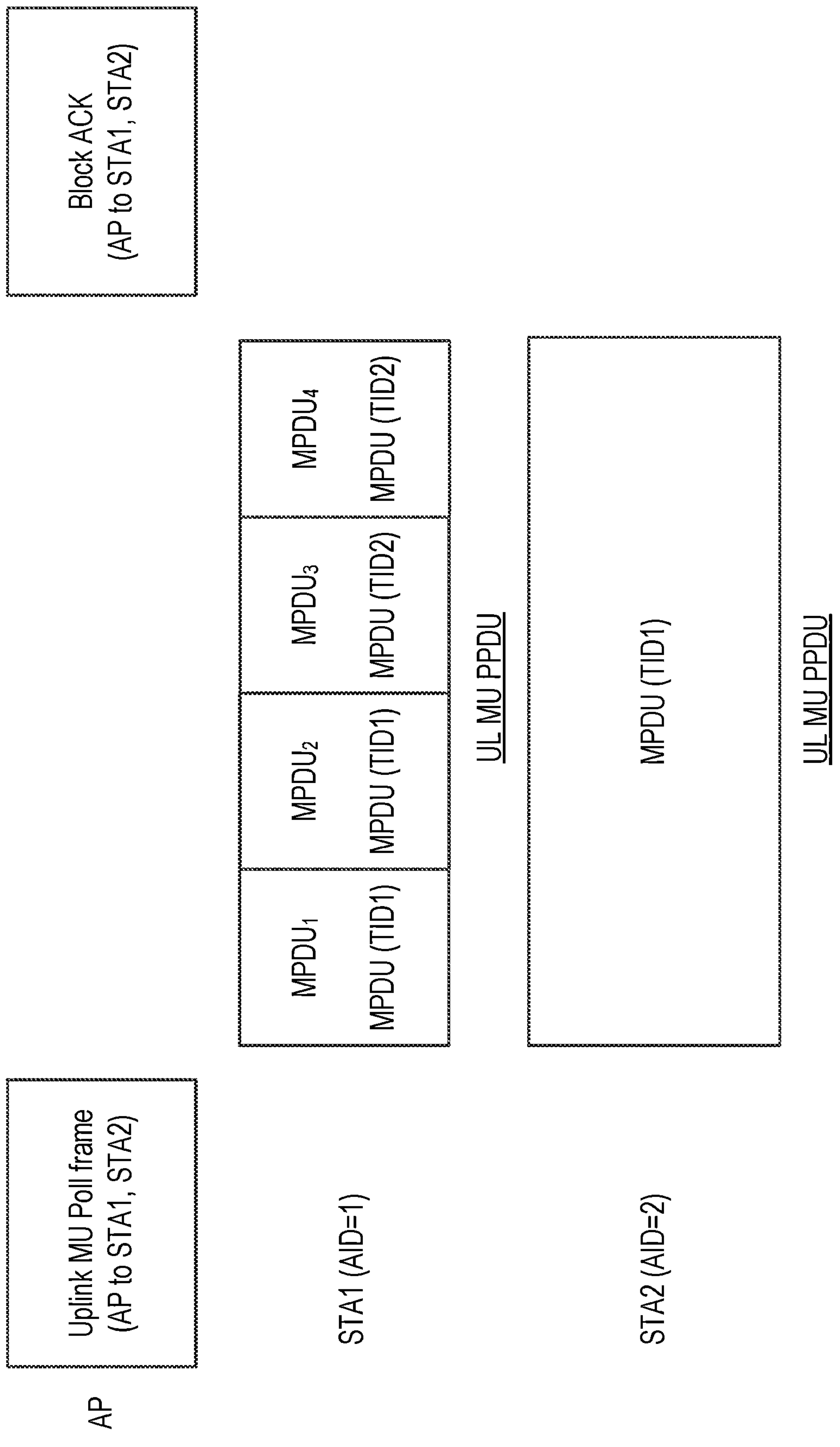
FIG. 53 illustrates an example of a frame exchange sequence between an access point and multiple stations in accordance with embodiments of the present invention.

FIGS. 52 and 53 illustrate examples of a first frame format and its associated frame exchange sequence. In this regard, FIG. 52 illustrates an example of a Block ACK frame format. The Block ACK frame may include a frame control field, a duration/ID field, an RA field, a TA field, Per-User ACK fields, and an FCS field. In an aspect, each Per-User ACK field may include an ACK Policy sub-field, an AID sub-field, and a TID sub-field. In this regard, each Per-User ACK field may be, or may be considered as, a list of an ACK Policy information, AID information, and TID information. In an aspect, the Ack Policy sub-field, AID sub-field, and TID sub-field may be 1 bit, 11 bits, and 4 bits, respectively.

In an aspect, when the Ack Policy sub-field is set to a first value (e.g., 0), the BA Control and BA Information fields are not present in the Per-User ACK field. This indicates an ACK of all MPDUs (e.g., independent of TID) carried in the eliciting PPDU that was transmitted by the STA whose AID is indicated in the AID sub-field of Per-User ACK field. In an aspect, the TID sub-field is set to a reserved value for indicating that all MPDUs, having different Tills (e.g., two or more different TIDs), are received by the AP. In an aspect, the reserved value is different from TID1, TID2, and any other TID associated with the MPDUs. In an aspect, the reserved value is a predetermined value (e.g., 14). In another case in which all MPDUs have the same TID and all the MPDUs are received by the AP, the Ack Policy sub-field may be set to 0 and the TID set to the TID of all the MPDUs. In an aspect, when the Ack Policy sub-field is set to a second value (e.g., 1), the BA Control and BA Information fields are present in the Per-User ACK field. In the foregoing, the first value and second value are 0 and 1, respectively, by way of non-limiting example. In other words, in some aspects, the first value may be 1 and the second value may be 0.

In an aspect, the BA Information sub-field includes a Block Ack Starting Sequence Control sub-field and a Block Ack Bitmap sub-field. Thus, in this aspect, when the Ack Policy sub-field is equal to the first value, the Block Ack Starting Sequence Control and Block Ack bitmap are not present in the Per-User ACK field, and when the Ack Policy sub-field is equal to the second value, the Block Ack Starting Sequence Control and Block Ack bitmap are not present in the Per-User ACK field.

In an aspect, a Per-User ACK field may be referred to as a Per STA Info field. In an aspect, the Ack Policy sub-field may be referred to as an Ack Type sub-field. In an aspect, the Ack Policy sub-field, AID sub-field, and TID sub-field form a Per AID TID Info sub-field. Thus, in this aspect, the Per-User ACK field includes the Per AID TID Info sub-field.

FIG. 53 illustrates an example of a frame exchange sequence between an AP and multiple stations. In this example, the AP may request/elicit a UL MU PPDU from STA1 and STA2. The AP may transmit an uplink MU Poll frame to STA1 and STA2. STA1 may transmit a UL MU PPDU by aggregating MPDUs having different TIDs (e.g., TID1 and TID2). The UL MU PPDU transmitted by STA1 may include four MPDUs, denoted as MPDU1, MPDU2, MPDU3, and MPDU4, respectively, and each of these four MPDUs may have a separate sequence number. For instance, in a case that the AP determines (e.g., based on a sequence number in the MPDUs), that MPDU1, MPDU3, and MPDU4 are successfully received by the AP, the AP may indicate in the acknowledgement bitmap that MPDU1, MPDU3, and MPDU4 are successfully received and that MPDU2 was not received. In a case that all MPDUs (e.g., MPDU1, MPDU2, MPDU3, and MPDU4) are successfully received, the Ack Policy sub-field may be set to 0 in the Block ACK frame. In an aspect, the Ack Policy sub-field being set to 0 is indicative of the Block Ack Starting Sequence Control and Block Ack bitmap not being present in the Per-User ACK field of the Block ACK frame. When the AP receives all MPDUs, in which the MPDUs may have one or more different TIDs (e.g., TID1 and TID2), the AP may transmit a Block ACK frame (e.g., containing an acknowledgement bitmap) of the format shown in FIG. 52.

Figure 54:
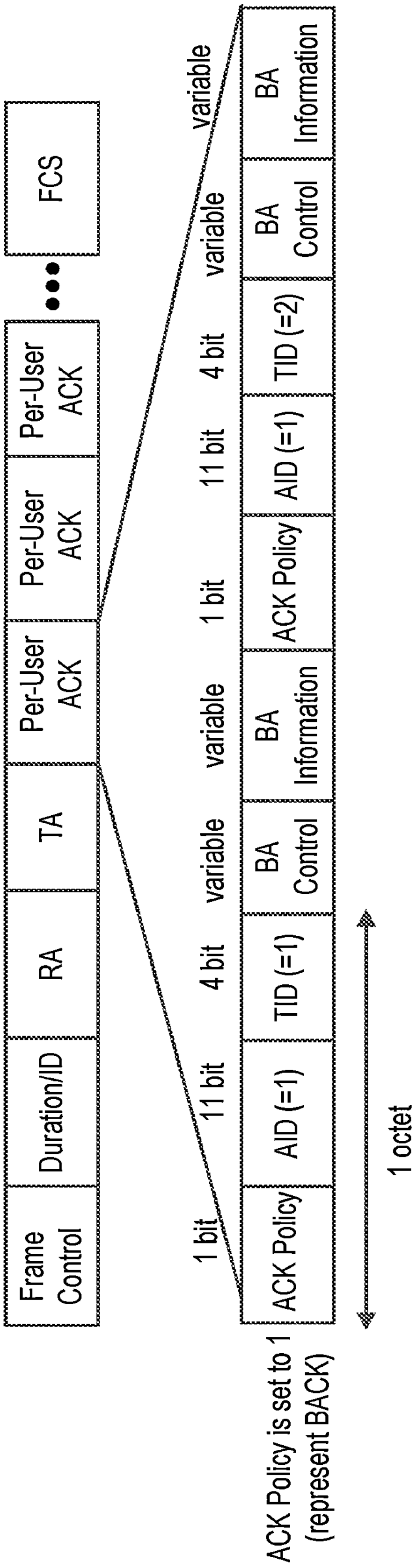
FIG. 54 illustrates an example of a Block ACK frame in accordance with embodiments of the present invention.
Figure 55:
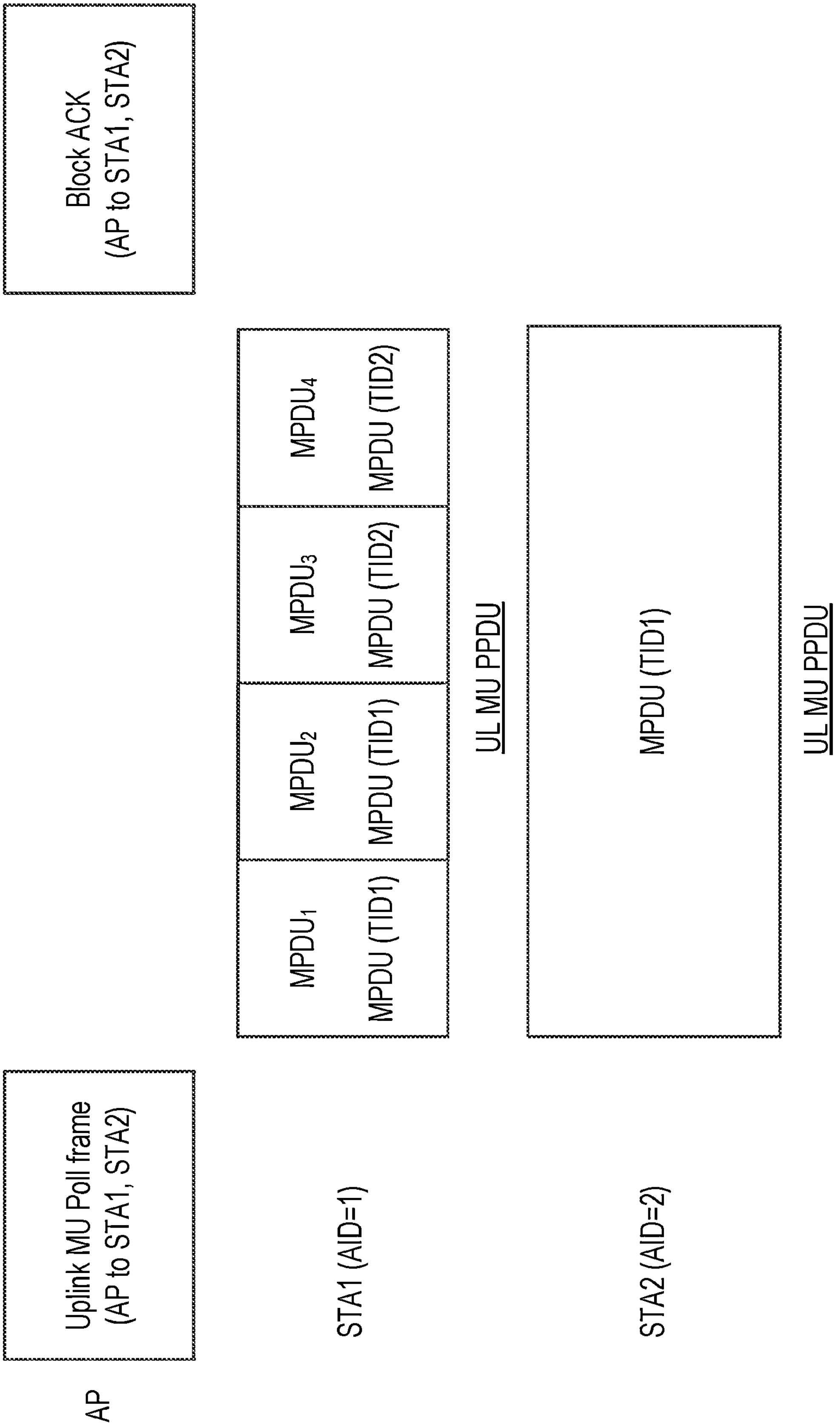
FIG. 55 illustrates an example of a frame exchange sequence between an access point and multiple stations in accordance with embodiments of the present invention.

FIGS. 54 and 55 illustrate examples of a second frame format and its associated frame exchange sequence. In this regard, FIG. 54 illustrates an example of a Block ACK frame format. In an aspect, each Per-User ACK field includes concatenations of a list of an ACK Policy subfield, an AID sub-field, a TID sub-field, a BA Control sub-field, and a BA Information sub-field. In each list of the Per-User ACK field, when the Ack Policy sub-field is set to 1, the BA Control and BA Information fields are present for all Tills from which at least one MPDU (e.g., carried in the eliciting PPDU that was transmitted by the STA whose AID is indicated in the AID sub-field of the Per-User ACK field) is not received by the AP. The TID sub-field may be set to a TID of MPDUs that are acknowledged by the BA Control and BA Information fields in each list of the Per-User ACK field.

FIG. 55 illustrates an example of a frame exchange sequence between an AP and multiple stations. In this example, the AP may request/elicit a UL MU PPDU from STA1 and STA2. The AP may transmit an uplink MU Poll frame to STA1 and STA2. STA1 may transmit a UL MU PPDU by aggregating MPDUs having different Tills (e.g., TID1 and TID2) in FIG. 55. When the AP does not receive some or all of the MPDUs having TID1 and TID2, the AP may transmit a Block ACK frame of the format shown in FIG. 54.

Figure 56:
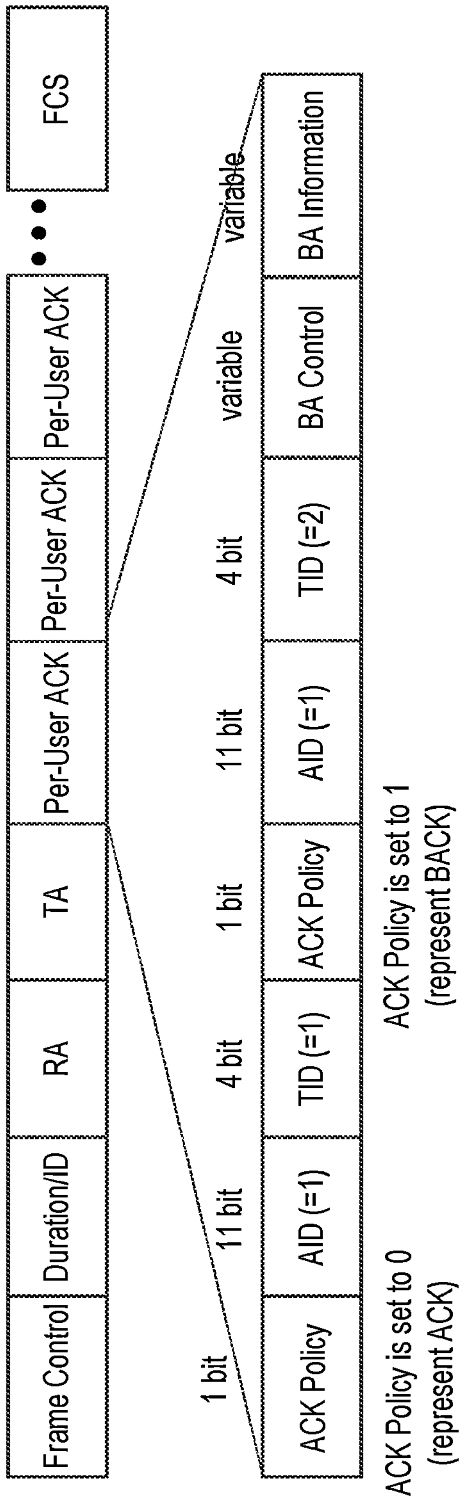
FIG. 56 illustrates an example of a Block ACK frame in accordance with embodiments of the present invention.
Figure 57:
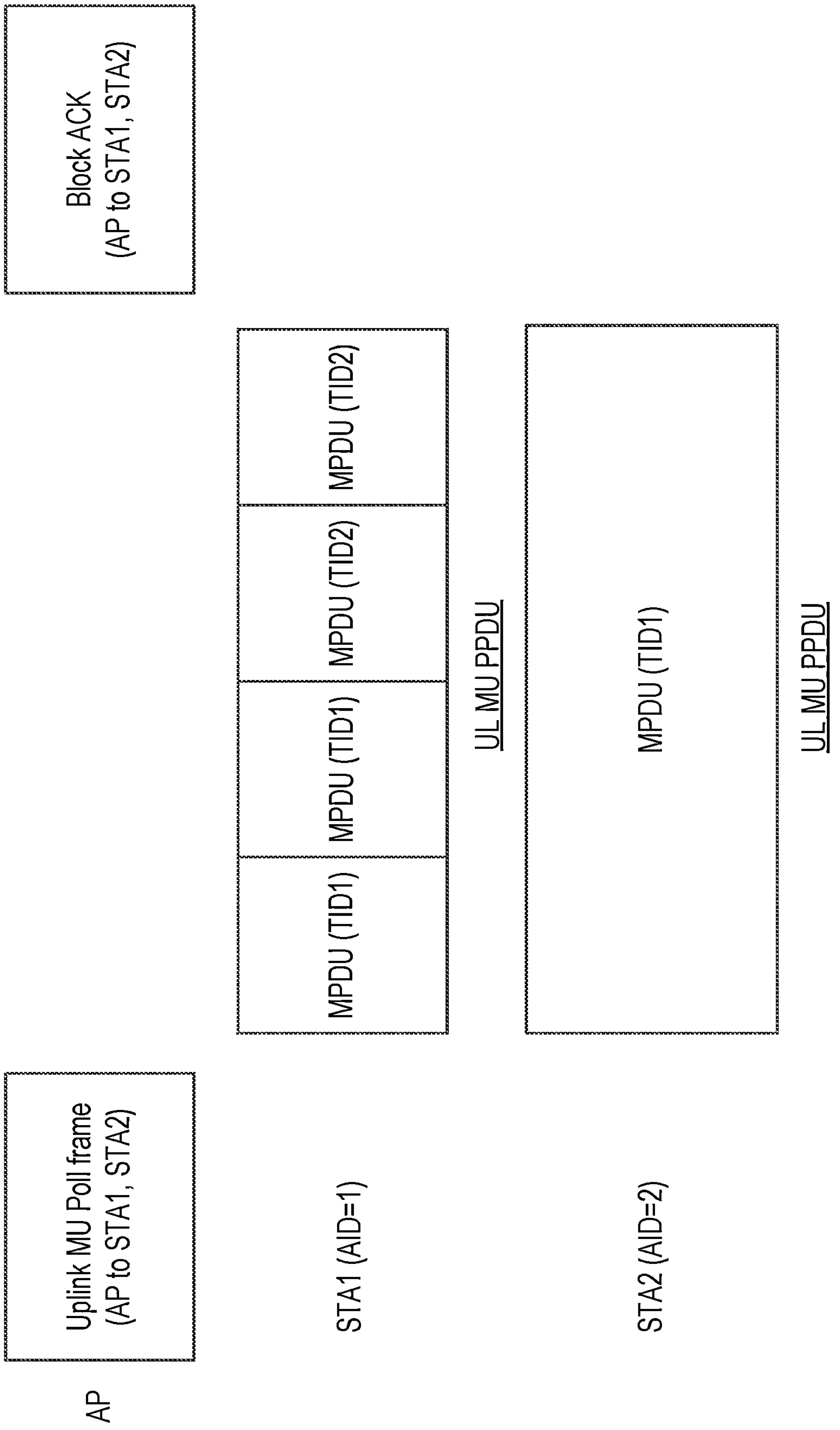
FIG. 57 illustrates an example of a frame exchange sequence between an access point and multiple stations in accordance with embodiments of the present invention.

FIGS. 56 and 57 illustrate examples of a third frame format and its associated frame exchange sequence. In this regard, FIG. 56 illustrates an example of a format of a Block ACK frame. In an aspect, each Per-User ACK field may include a combination of two lists. A first list includes an ACK Policy sub-field, an AID sub-field, and a TID sub-field. A second list includes an ACK Policy sub-field, an AID sub-field, a TID sub-field, a BA Control sub-field, and a BA Information sub-field.

In the first list, since the Ack Policy sub-field is set to 0, the BA Control and BA Information fields are not present in that list for a TID (e.g., referred to as an ACK TID) from which all MPDUs (e.g., carried in the eliciting PPDU that was transmitted by the STA whose AID is indicated in the AID sub-field of Per-User ACK field) are received by the AP.

In the second list, since the Ack Policy sub-field is set to 1, the BA Control and BA Information fields are present in that for a TID (e.g., referred to as BACK TID) from which at least one MPDU (e.g., carried in the eliciting PPDU that was transmitted by the STA whose AID is indicated in the AID sub-field of Per-User ACK field) is not received by AP.

The TID sub-field may be set to an ACK TID if the TID sub-field is present in the first list and/or may be set to a BACK TID if the TID sub-field is present in the second list.

FIG. 57 illustrates an example of a frame exchange sequence between an AP and multiple stations. In this example, the AP may request/elicit a UL MU PPDU from STA1 and STA2. The AP may transmit an uplink MU Poll frame to STA1 and STA2. STA1 may transmit a UL MU PPDU by aggregating MPDUs having different Tills (e.g., TID1 and TID2) in FIG. 57. When the AP receives all MPDUs having TID1 but the AP does not receive some MPDUs having TID2, the AP may transmit a Block ACK frame of the format shown in FIG. 56. The first list is used for acknowledgement information of MPDU having TID1, since all MPDUs having TID1 is received by the AP. In this case, TID1 corresponds to an ACK TID. The second list is used for acknowledgement information of MPDU having TID2, since at least some MPDUs having TID2 is not received by the AP. In this case, TID2 corresponds to a BACK TID.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 58A:
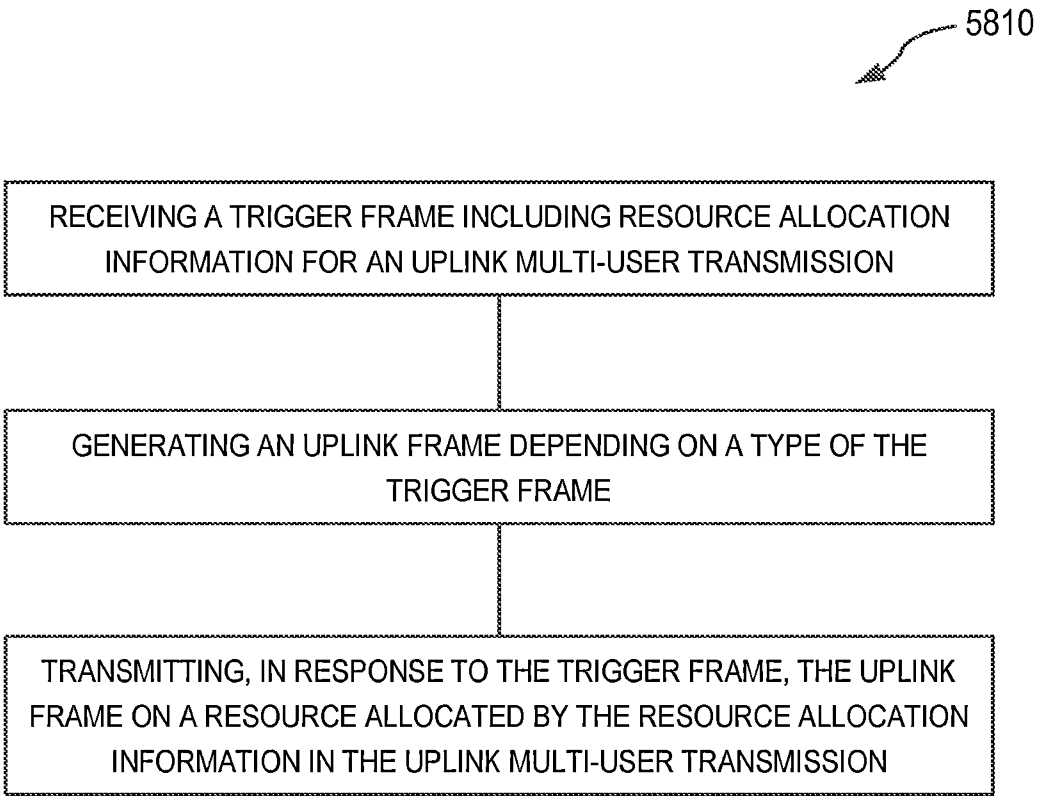
FIGS. 58A and 58B illustrate flow charts of examples of methods for facilitating wireless communication for uplink transmission in accordance with embodiments of the present invention.
Figure 58B:
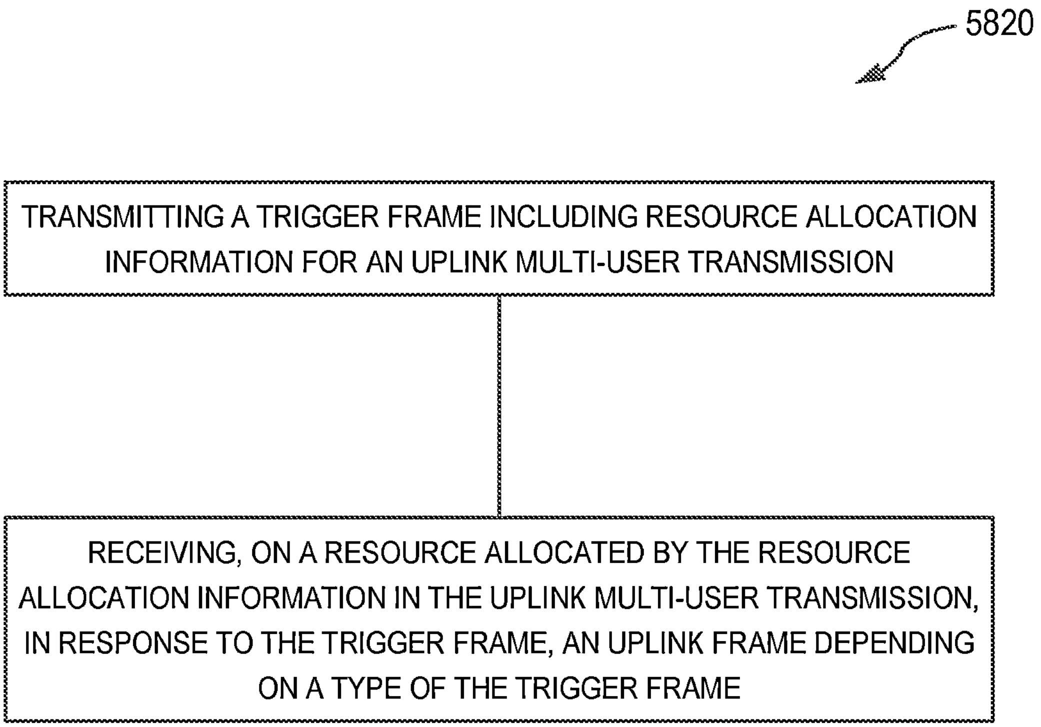

FIGS. 58A and 58B illustrate flow charts of examples of methods for facilitating wireless communication. For explanatory and illustration purposes, the example processes 5810 and 5820 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 5810 and 5820 are not limited to the wireless communication devices 111-115 of FIG. 1 or their components, and the example processes 5810 and 5820 may be performed by some of the devices shown in FIG. 1, or other devices or components. Further for explanatory and illustration purposes, the blocks of the example processes 5810 and 5820 are described herein as occurring in serial or linearly. However, multiple blocks of the example processes 5810 and 5820 may occur in parallel. In addition, the blocks of the example processes 5810 and 5820 need not be performed in the order shown and/or one or more of the blocks/actions of the example processes 5810 and 5820 need not be performed.

Figure 59:
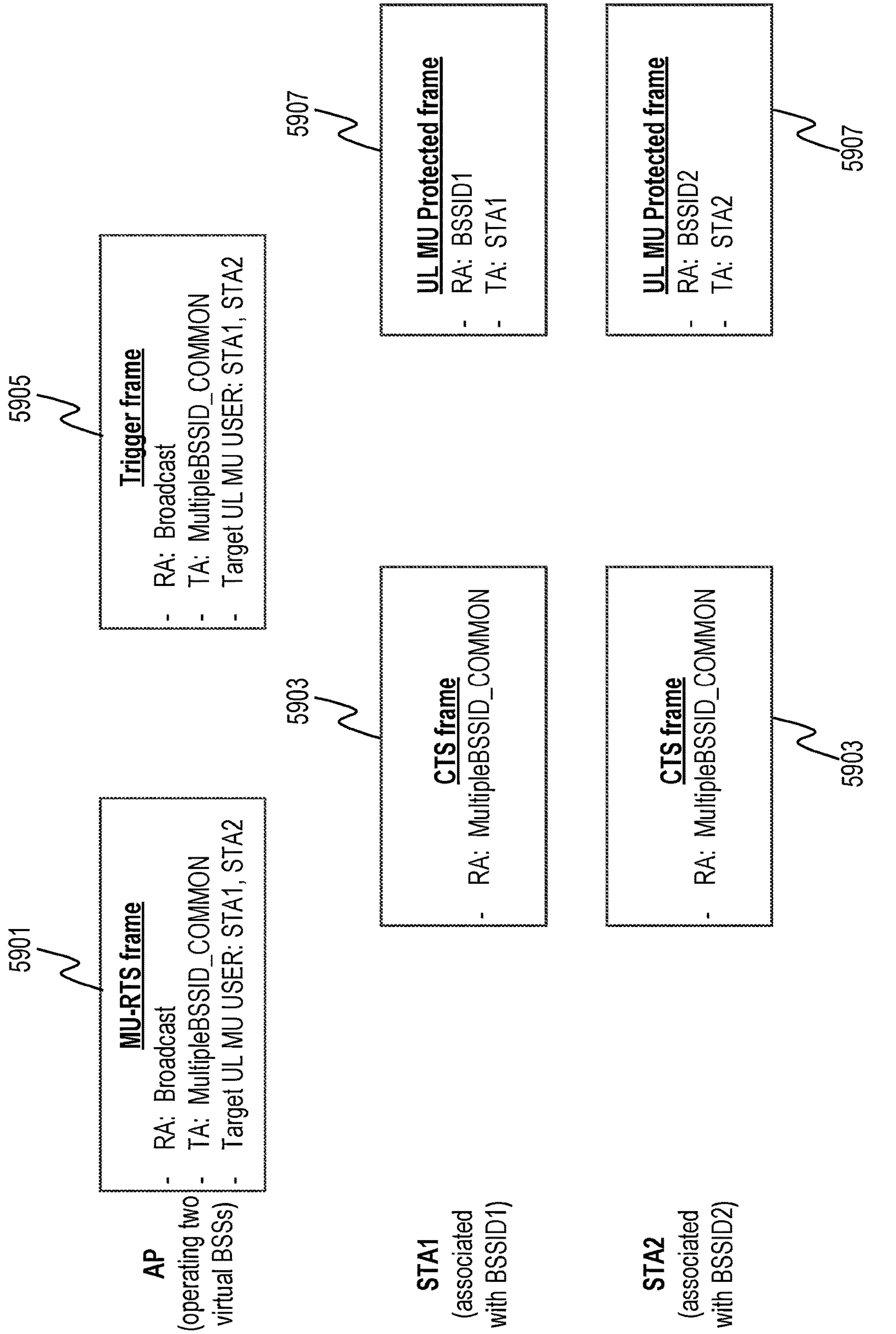
FIG. 59 illustrates an example of a frame exchange sequence between an access point and multiple stations in accordance with embodiments of the present invention.

FIG. 59 illustrates an example of a frame exchange sequence between an access point and multiple stations. The AP transmits a trigger frame 5901 corresponding to a multi-user request-to-send (MU-RTS) frame. The MU-RTS frame elicits clear-to-send (CTS) frames from a plurality of stations. The MU-RTS frame includes a receiver address (RA) field and a transmitter address (TA) field. In FIG. 59, the RA field of the MU-RTS frame can be set to a broadcast address, and the TA field of the MU-RTS frame can be set to MultipleBSSID_COMMON corresponding to a common address for a plurality of virtual BSS identifiers that are operated by the AP.

A plurality of stations (e.g., STA1 and STA2 that have received the MU-RTS frame) simultaneously transmit CTS frames 5903 in response to the MU-RTS frame. The CTS frames may be RF-combined. Each of the CTS frames has an RA field. In FIG. 59, the RA field of the MU-RTS frame can be set to the TA field of the MU-RTS frame.

The AP transmits a trigger frame 5905 eliciting data frames from a plurality of stations. The trigger frame 5905 can include resource allocation information for an uplink multi-user (UL MU) transmission following the trigger frame 5905. The trigger frame includes an RA field and a TA field. In the embodiment of FIG. 59, the RA field of the trigger frame 5905 can be set to a broadcast address, and the TA field of the trigger frame 5905 can be set to MultipleBSSID_COMMON corresponding to the common address for a plurality of virtual BSS identifiers that are operated by the AP.

A plurality of stations (e.g., STA1 and STA2 that have received the trigger frame 5905) simultaneously transmit data frames 5907. The plurality of stations can transmit data frames 5907 according to the resource allocation information of the trigger frame 5905. Each data frame 5907 has an RA field and a TA field. In FIG. 59, the RA field of each data frame 5907 can be set to a destination address irrespective of the TA field of the trigger frame 5905, and the TA field of each data frame 5907 can be set to an address of a station transmitting each data frame 5905. In particular, the destination address can be a BSS identifier which the station transmitting each data frame 5907 is associated with.

Various examples of aspects of the disclosure are described below as clauses for convenience. These are provided as examples, and do not limit the subject technology. As an example, some of the clauses described below are illustrated in FIGS. 58A and 58B.

Clause A. A wireless device, comprising: one or more memories; and one or more processors coupled to the one or more memories, the one or more processors configured to cause:

receiving a trigger frame including resource allocation information for an uplink multi-user transmission;

generating an uplink frame depending on a type of the trigger frame; and transmitting, in response to the trigger frame, the uplink frame on a resource allocated by the resource allocation information in the uplink multi-user transmission.

Clause B. A wireless device, comprising: one or more memories; and one or more processors coupled to the one or more memories, the one or more processors configured to cause:

transmitting a trigger frame including resource allocation information for an uplink multi-user transmission; and receiving, on a resource allocated by the resource allocation information in the uplink multi-user transmission, in response to the trigger frame, an uplink frame depending on a type of the trigger frame.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method performed by an access point (AP), comprising:

transmitting a downlink frame that is eliciting a response from a plurality of stations, the downlink frame including a first address field;

receiving an uplink frame in response to the downlink frame, the uplink frame including a second address field, wherein the second address field is set to a value of the first address field when the downlink frame is of a first type, or a value of an address associated with a station (STA) when the downlink frame is of a second type; and receiving the uplink frame on a resource allocated by resource allocation information included in the downlink frame for an uplink multi-user transmission, wherein the AP simultaneously receives uplink frames in response to the first type of downlink frame, wherein the AP simultaneously receives uplink data frames.

2. The method of claim 1, wherein the first address field corresponds to a receiver address field and the second address field corresponds to a transmitter address field.

3. The method of claim 1, wherein the first type of the downlink frame is a multi-user request-to-send (MU-RTS) frame eliciting clear-to-send (CTS) frames from the plurality of stations.

4. The method of claim 3, wherein in response to the downlink frame is the first type, the uplink frame is a CTS frame, such that the transmitter address field of the CTS frame is set equal to the receiver address field of the MU-RTS frame.

5. The method of claim 1, wherein the second type of the downlink frame is a trigger frame eliciting data frames from the plurality of stations.

6. The method of claim 1, wherein the downlink frame is the second type, and in response the uplink frame is a data frame, such that the transmitter address field of the data frame is set equal to a basic service set (BSS) identifier associated with the plurality of stations.

7. A non-transitory machine readable medium that stores instructions, which when executed by a processor of an access point (AP), cause the AP to:

transmit a downlink frame that is eliciting a response from a plurality of stations, the downlink frame including a first address field;

receive an uplink frame in response to the downlink frame, the uplink frame including a second address field, wherein the second address field is set to a value of the first address field when the downlink frame is of a first type, or a value of an address associated with a station (STA) when the downlink frame is of a second type; and receive the uplink frame on a resource allocated by resource allocation information included in the downlink frame for an uplink multi-user transmission, wherein the AP simultaneously receives uplink frames in response to the first type of downlink frame, wherein the AP simultaneously receives uplink data frames.

8. The non-transitory machine readable medium of claim 7, wherein the first address field corresponds to a receiver address field and the second address field corresponds to a transmitter address field.

9. The non-transitory machine readable medium of claim 8, wherein the first type of the downlink frame is a multi-user request-to-send (MU-RTS) frame eliciting clear-to-send (CTS) frames from the plurality of stations; and in response to the downlink frame is the first type, the uplink frame is a CTS frame, such that the transmitter address field of the CTS frame is set equal to the receiver address field of the MU-RTS frame.

10. The non-transitory machine readable medium of claim 8, wherein the second type of the downlink frame is a trigger frame eliciting data frames from the plurality of stations; and in response to the downlink frame is the second type, the uplink frame is a data frame, such that the transmitter address field of the data frame is set equal to a basic service set (BSS) identifier associated with the plurality of stations.

11. The non-transitory machine readable medium of claim 7, wherein the uplink frame includes an indication on whether one or more frames in an aggregated media access control protocol data unit (A-MPDU) of the uplink frame are disallowed to solicit an immediate response.

* * * * *